US012633964B2

(12) United States Patent
Guo et al.

(10) Patent No.: US 12,633,964 B2
(45) Date of Patent: May 19, 2026

(54) FREQUENCY HOPPING FOR PUSCH REPETITIONS IN NR-U

(71) Applicant: QUALCOMM Incorporated, San Diego, CA (US)

(72) Inventors: Shaozhen Guo, Beijing (CN); Jing Sun, San Diego, CA (US); Changlong Xu, Beijing (CN); Xiaoxia Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 118 days.

(21) Appl. No.: 18/005,486

(22) PCT Filed: Sep. 9, 2020

(86) PCT No.: PCT/CN2020/114237
§ 371 (c)(1),
(2) Date: Jan. 13, 2023

(87) PCT Pub. No.: WO2022/051939
PCT Pub. Date: Mar. 17, 2022

(65) Prior Publication Data
US 2023/0261694 A1     Aug. 17, 2023

(51) Int. Cl.
*H04B 1/7143*     (2011.01)
*H04L 5/00*     (2006.01)
(Continued)

(52) U.S. Cl.
CPC ......... *H04B 1/7143* (2013.01); *H04L 5/0078* (2013.01); *H04L 27/2607* (2013.01); *H04W 74/0808* (2013.01)

(58) Field of Classification Search
CPC . H04B 1/7143; H04B 2001/7154; H04L 1/08; H04L 27/2607; H04L 5/0005;
(Continued)

(56) References Cited

U.S. PATENT DOCUMENTS

2018/0070243 A1*  3/2018  Liu ................... H04W 74/0808
2019/0149365 A1   5/2019  Chatterjee et al.
(Continued)

FOREIGN PATENT DOCUMENTS

CN        111656840 A     9/2020
WO     2020067815 A1     4/2020
(Continued)

OTHER PUBLICATIONS

3rd Generation Partnership Project ("Technical Specification Group Radio Access Network; Study on physical layer enhancements for NR ultra-reliable and low latency case (URLLC)"; 3GPP TR 38.824 V16.0.0) (Year: 2019).*
(Continued)

*Primary Examiner* — Asad M Nawaz
*Assistant Examiner* — Natali Pascual Peguero
(74) *Attorney, Agent, or Firm* — Harrity & Harrity, LLP

(57) ABSTRACT

Wireless communications systems and methods related to frequency hopping in uplink transmission. A UE may be configured to transmit a first subset of data on a first frequency band to a BS over a first set of symbols. The UE may perform a listen-before-talk (LBT) during an LBT gap comprising a second set of symbols between the first set of symbols and a third set of symbols. The UE may use the LBT in the LBT gap to determine availability of a second frequency sub-band for a second subset of data that is a repetition of the first subset of data. The UE may be configured to transmit the second subset of data on the second frequency band to the BS over a third set of symbols if the LBT passes. Thus, embodiments of the present disclosure enable a UE to perform frequency hopping with repetitions across unlicensed frequency sub-bands.

20 Claims, 20 Drawing Sheets

(51) Int. Cl.
    *H04L 27/26*     (2006.01)
    *H04W 74/08*     (2024.01)
    *H04W 74/0808*     (2024.01)

(58) Field of Classification Search
    CPC ... H04L 5/0007; H04L 5/0016; H04L 5/0078;
                                H04W 74/0808
    See application file for complete search history.

(56)            References Cited

U.S. PATENT DOCUMENTS

| | | |
|---|---|---|
| 2019/0289635 A1 | 9/2019 | Wang et al. |
| 2019/0306856 A1 | 10/2019 | Ji et al. |
| 2019/0342921 A1 | 11/2019 | Loehr et al. |

FOREIGN PATENT DOCUMENTS

| | | |
|---|---|---|
| WO | 2020146854 A1 | 7/2020 |
| WO | 2020167794 A1 | 8/2020 |

OTHER PUBLICATIONS

Wilus Inc: "On PUSCH Enhancement for NR URLLC", R1-1905432, 3GPP TSG RAN WG1 #96bis Xi'an, China, Apr. 8-12, 2019, 6 Pages.

Ericsson: "Channel Structure Related Corrections For 2-Step RACH", 3GPP TSG-RAN WG1 Meeting #101, e-Meeting, May 25-Jun. 5, 2020, R1-2004347, the Whole Document, pp. 1-10.

International Search Report and Written Opinion—PCT/CN2020/114237—ISA/EPO—Jun. 8, 2021.

Qualcomm Incorporated: "Uplink Enhancements for URLLC in Unlicensed Controlled Environments", 3GPP TSG-RAN WG1 Meeting #102-e, R1-2006801, 3rd Generation Partnership Project, Mobile Competence Centre, 650, Route Des Lucioles, F-06921 Sophia-Antipolis Cedex, France, vol. RAN WG1, No. e-Meeting, Aug. 17, 2020-Aug. 28, 2020, Aug. 8, 2020, XP051918251, 7 Pages, paragraph [0002], Sec 2 to 2.4, Figure 2-3-1, p. 5, line 21-line 22, p. 5, line 23-line 24.

Supplementary European Search Report—EP20952727—Search Authority—The Hague—May 3, 2024.

* cited by examiner

300

400

1-2-1

1-3b-1
1-3b-2
Inter-Slot Type A

FREQUENCY HOPPING FOR PUSCH REPETITIONS IN NR-U

CROSS-REFERENCE TO RELATED APPLICATIONS

The present application is a 35 U.S.C. 371 National Phase entry of Patent Cooperation Treaty (PCT) Application No. PCT/CN2020/114237, filed Sep. 9, 2020, which is hereby expressly incorporated herein by reference in its entirety.

TECHNICAL FIELD

This application relates generally to wireless communication systems, and more particularly to frequency hopping for uplink data transmission in unlicensed bands.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In systems that implement spectrum sharing, however, frequency hopping is not supported (such as for interlaced and/or non-interlaced waveforms) across unlicensed spectrum, such as may be used for retransmissions (e.g., PUSCH retransmissions). Such hopping may be desirable, however, to introduce frequency hopping in unlicensed sub-bands. Problems arise, however, when addressing listen-before-talk and other unlicensed/spectrum sharing needs.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication according to some embodiments includes transmitting, by a first wireless communications device to a second wireless communications device, a first subset of data on a first frequency sub-band over a first set of symbols in a time domain. The method further includes waiting, by the first wireless communications device, for a time duration corresponding to a length of a second set of symbols in the time domain as a listen-before-talk (LBT) gap on the second frequency sub-band before transmitting a second subset of data. The method further includes transmitting, by the first wireless communications device to the second wireless communications device after the waiting, the second subset of data on a second frequency sub-band over a third set of symbols in the time domain, the first frequency sub-band being different than the second frequency sub-band.

In another aspect of the disclosure, a method of wireless communication according to some embodiments includes receiving, by a first wireless communications device from a second wireless communications device, a first subset of data on a first frequency sub-band over a first set of symbols in a time domain. The method further includes waiting, by the first wireless communications device, for a time duration corresponding to a length of a second set of symbols in the time domain as a listen-before-talk (LBT) gap on a second frequency sub-band. The method further includes receiving, by the first wireless communications device from the second wireless communications device after the waiting, a second subset of data on the second frequency sub-band over a third set of symbols in the time domain, the first frequency sub-band being different than the second frequency sub-band.

In another aspect of the disclosure, a first wireless communications device comprises a transceiver configured to transmit, to a second wireless communications device, a first subset of data on a first frequency sub-band over a first set of symbols in a time domain. The transceiver is further configured to wait for a time duration corresponding to a length of a second set of symbols in the time domain as a listen-before-talk (LBT) gap on the second frequency sub-band before transmitting a second subset of data. The transceiver is further configured to transmit, to the second wireless communications device after the wait, the second subset of data on a second frequency sub-band over a third set of symbols in the time domain, the first frequency sub-band being different than the second frequency sub-band.

In another aspect of the disclosure, a first wireless communications device comprises a transceiver configured to receive, from a second wireless communications device, a first subset of data on a first frequency sub-band over a first set of symbols in a time domain. The transceiver is further configured to wait for a time duration corresponding to a length of a second set of symbols in the time domain as a listen-before-talk (LBT) gap on a second frequency sub-band. The transceiver is further configured to receive, from the second wireless communications device after the waiting, a second subset of data on the second frequency sub-band over a third set of symbols in the time domain, the first frequency sub-band being different than the second frequency sub-band In another aspect of the disclosure, a non-transitory computer-readable medium having program code recorded thereon, the program code including: code for causing a first wireless communications device to transmit, to a second wireless communications device, a first subset of data on a first frequency sub-band over a first set of symbols in a time domain. The program code further comprises code for causing the first wireless communications device to wait for a time duration corresponding to a length of a second set of symbols in the time domain as a listen-before-talk (LBT) gap on the second frequency sub-band before transmitting a second subset of data. The program code further comprises code for causing the first wireless communications device to transmit, to the second wireless communications device after the wait, the second subset of data on a second frequency sub-band over a third set of symbols in the time domain, the first frequency sub-band being different than the second frequency sub-band.

In another aspect of the disclosure, a non-transitory computer-readable medium having program code recorded thereon, the program code including: code for causing a first wireless communications device to receive, from a second wireless communications device, a first subset of data on a first frequency sub-band over a first set of symbols in a time domain. The program code further comprises code for causing the first wireless communications device to wait for a time duration corresponding to a length of a second set of symbols in the time domain as a listen-before-talk (LBT) gap on a second frequency sub-band. The program code further comprises code for causing the first wireless communications device to receive, from the second wireless communications device after the wait, a second subset of data on the second frequency sub-band over a third set of symbols in the time domain, the first frequency sub-band being different than the second frequency sub-band.

In another aspect of the disclosure, a first wireless communications device comprises means for transmitting, to a second wireless communications device, a first subset of data on a first frequency sub-band over a first set of symbols in a time domain. The first wireless communications device further comprises means for waiting for a time duration corresponding to a length of a second set of symbols in the time domain as a listen-before-talk (LBT) gap on the second frequency sub-band before transmitting a second subset of data. The first wireless communications device further comprises means for transmitting, to the second wireless communications device after the waiting, the second subset of data on a second frequency sub-band over a third set of symbols in the time domain, the first frequency sub-band being different than the second frequency sub-band.

In another aspect of the disclosure, a first wireless communications device comprises means for receiving, from a second wireless communications device, a first subset of data on a first frequency sub-band over a first set of symbols in a time domain. The first wireless communications device further comprises means for waiting for a time duration corresponding to a length of a second set of symbols in the time domain as a listen-before-talk (LBT) gap on a second frequency sub-band. The first wireless communications device further comprises means for receiving, from the second wireless communications device after the waiting, a second subset of data on the second frequency sub-band over a third set of symbols in the time domain, the first frequency sub-band being different than the second frequency sub-band.

Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
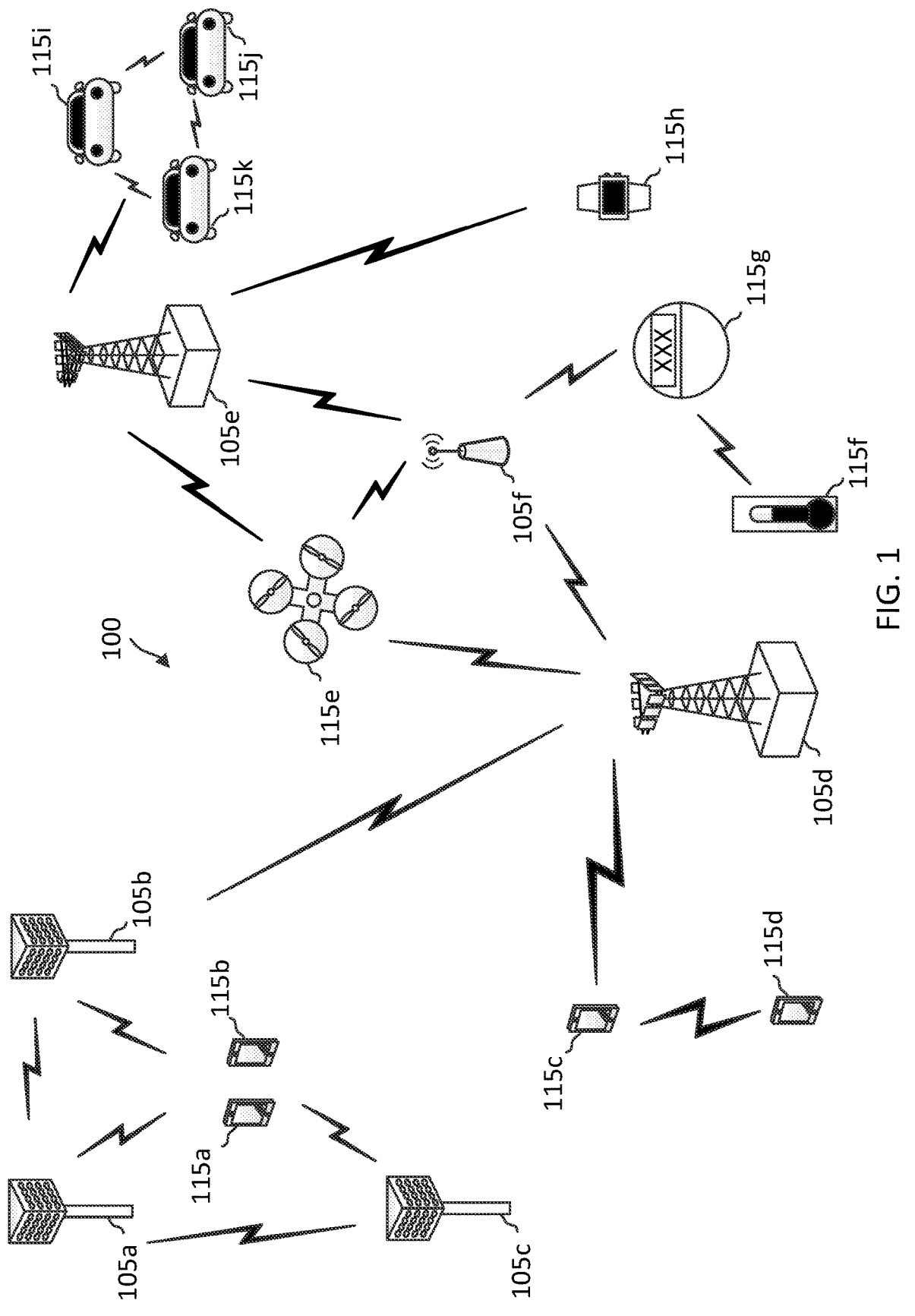
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time intervals (TTIs); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Embodiments of the present disclosure relate to frequency hopping for data transmission over uplink physical uplink downlink shared channel (PUSCH), particularly to hopping performed in unlicensed bands of NR-U. For example, in some embodiments a UE may transmit uplink data and upper layer signaling as well as control information (e.g., HARQ ACK/NACK, precoding matrix indicator (PMI), rank indication (RI)) over the PUSCH channel. The PUSCH includes time and frequency resources which is scheduled via downlink control information (DCI). In some situations (e.g., such as specified in Rel. 16 3GPP specifications), one PUSCH transmission instance might not be allowed to cross a slot boundary. Therefore, to avoid transmitting a long PUSCH, the UE can transmit small PUSCHs in several repetitions scheduled by uplink (UL) grant or RRC in consecutive slots. Further, there are currently two different PUSCH repetitions defined, including (i) PUSCH repletion type A (ii) PUSCH repetition type B.

PUSCH repetition type A divides a long PUSCH into K several small repetitions, and the same symbol allocation is applied over several consecutive slots (e.g., K consecutive slots). The PUSCH repetition type A may be used to reduce latency of PUSCH repetitions in configured grant (CG) resources where a UE can be configured to transmit a number of repetitions across consecutive slots without feedback. The PUSCH type A may cause a large time gap among the repetitions. PUSCH repetition type B eliminates time gap among repetitions and ensures the configured number of repetitions the are carried out in the consecutive slots. For example, PUSCH repetition type B may also divide a long PUSCH into K small repetitions, but with different symbol allocations. For example, a repetition of the PUSCH may be transmitted back-to-back once the prior repetition ends, even when the prior repetition ended before a slot boundary. Thus, the nominal repetitions may include one or more actual repetitions. For example, the nominal repetition may be split into two actual repetitions, the first actual repetition being back-to-back with the end of the prior repetition, and the second actual repetition starting in the next slot (e.g., following the end of the first actual repetition at the slot boundary).

In addition to PUSCH repetitions, frequency hopping can be applied to PUSCH transmissions (e.g., to increase frequency diversity and reduce the effect of radio signal distortion). In PUSCH frequency hopping, the PUSCH data may be transmitted over different frequency bands configured by the higher layers. Frequency hopping may be applied in conjunction with PUSCH repetition. For example, for PUSCH repetition type A one of two frequency hopping modes can be configured: (i) intra-slot frequency hopping, applicable to single slot and multi-slot PUSCH transmission, and (ii) inter-slot frequency hopping, applicable to multi-slot PUSCH transmission. For PUSCH repetition type B, one of the two frequency hopping modes can be configured: (i) inter-repetition frequency hopping, and (ii) inter-slot frequency hopping.

In NR-U, wide band operation in integer multiple of 20 MHz may be supported for multiple serving cells for UL and DL. In the case of wideband operation (e.g., greater than 20

MHz), frequency hopping across multiple unlicensed subbands can further increase frequency diversity. In such situations, the UE may benefit from performing one-shot channel monitoring (e.g., listen-before-talk, LBT, such as category 2 LBT as an example) across multiple frequency subbands to facilitate hopping across the subbands.

According to aspects of present disclosure, an LBT gap is introduced between PUSCH repetitions to allow for the LBT on the next frequency band (e.g., an unlicensed frequency band) when performing frequency hopping in PUSCH repetition scenarios. For example, a UE may transmit data (e.g., data and control signaling) over PUSCH on different frequency bands. In some cases, the UE may be configured with PUSCH repetition type A for inter-slot and/or intra-slot repetitions. The may UE transmit different PUSCH type A repetitions in different resource blocks (RBs) in different bands. In some other cases, the UE may be configured with PUSCH type B repetitions for inter-slot and/or inter-repetitions such that the UE may transmit different PUSCH type repetitions in different RBs in different bands.

In some aspects of the present disclosure, a gNB may specify a gap between PUSCH repetitions in different slots. The UE may use the gap to perform an LBT before transmitting the PUSCH repetition in a different frequency band (e.g., an unlicensed frequency band). In some other aspects, the LBT gap may be introduced between PUSCH type A repetitions or different hops of PUSCH, and the LBT gap may be part of PUSCH time domain resources allocated by a start and length indicator (SLIV). In some aspects, the first X symbols (e.g., one, two, three, or other number of symbols) of the time domain resource indicated for the next PUSCH repetition by SLIV may be used as the LBT gap. Alternatively, the last X symbols of the time domain resource allocation indicated by SLIV of the previous PUSCH repetition may be used as the LBT gap for the next PUSCH repetition. These may be used, for example, with PUSCH type A repetitions (such as inter-slot frequency hopping) and/or with PUSCH type B repetitions (such as inter-repetition frequency hopping).

In other aspects, the location of the LBT gap may be determined according to an algorithm useful in type A intra-slot repetition scenarios. For example, X number of symbols may be used as the LBT gap with the location of the start and end of the LBT gap determined from the starting symbol S, combined with the floor of a length of the repetition (e.g., in number of symbols) divided by two, further taking out the X symbols of the LBT gap, with the LBT gap's location extending to the value S combined with the length divided by two, less one symbol. This may be represented with the equation $S+\lfloor L/2 \rfloor - X$ (the start location of the LBT gap) to symbol $S+\lfloor L/2 \rfloor - 1$ (the end location of the LBT gap), where S is the starting symbol of the PUSCH repetition and L is the length of PUSCH repetition. This may correspond to a situation where the LBT gap occurs with a time domain resource allocated for the previous PUSCH repetition. Alternatively, the X number of symbols may be used as the LBT gap with the location of the start and end of the LBT gap determined starting from symbol $S+\lfloor L/2 \rfloor$ to symbol $S+\lfloor L/2 \rfloor + X - 1$, where again S is the starting symbol of PUSCH repetition and L is the length of the PUSCH repetition. This may correspond to a situation where the LBT gap occurs with a time domain resource allocated for the next PUSCH repetition.

In some other aspects of the present disclosure, the LBT gap between PUSCH repetition at different hops of PUSCH type A may be determined according to a different algorithm for intra-slot repetition scenarios. In some variants, a formula may be used, such as an existing formula used in the 3GPP specification, to determine the number of symbols and the location of the LBT gap for each hop. In some variants, the LBT gap may be introduced at the end of the first hop (e.g., occupying one or more symbols of the first part of the repetition on the first frequency band). In some other variants, the LBT gap may be introduced at the beginning of the second hop (e.g., occupying one or more symbols of the second part of the repetition on the second frequency band). In some other aspects, the existing formula may used to determine the number of symbols for each hop after first removing the X symbols used for the LBT gap. Thus, a floor value may be taken of the total length of the repetition (excluding the X symbols) divided by two to arrive at the location of the start of the LBT gap (e.g., at the first hop). This may be represented as $$\left\lfloor N_{symb}^{PUSCHS} - X/2 \right\rfloor$$

to determine the number of symbols of the first hop, where $$N_{symb}^{PUSCH,S}$$

is the length of the PUSCH transmission in OFDM symbols in a slot (both hops together). The location of the end of the LBT gap may be determine by taking away from the X symbols the floor value of the total length of the repetition (excluding the X symbols), divided by two. This may be represented as $$X - \left\lfloor N_{symb}^{PUSCH,S} - X/2 \right\rfloor.$$

In some other aspects of the present disclosure, the LBT gaps are introduced for PUSCH type A with inter-slot frequency hopping, or PUSCH repetition type B with inter-repetition frequency hopping or inter-slot frequency hopping. In such aspects, the location of the LBT gap may be determined based on the hopping boundary, instead of from the SLIV as in some other embodiments. For example, in some variants, the LBT gap may be introduced at the end of the first hop (e.g., occupying one or more symbols of the first repetition on the first frequency band). In some other variants, the LBT gap may be introduced at the beginning of the second hop (e.g., occupying one or more symbols of the second repetition on the second frequency band).

In some other aspects of the present disclosure, situations may arise where the hopping boundary may be close enough to an end of a slot that with the introduction of the LBT gap there might be a small number of symbols remaining between the LBT gap and the end of the slot. For example, only one symbol may remain after the LBT gap before the end of the slot (e.g., with a one symbol LBT gap when using 15 kHz or 30 kHz subcarrier spacing, or two symbol LBT gap when using 60 kHz subcarrier spacing). But it would not be ideal to transmit a PUSCH with just one symbol. Accordingly, according to embodiments of the present disclosure the situation may be treated as an error condition between the UE and the BS. In some other embodiments, the situation may include introducing a cyclic prefix (CP) extension (e.g., determined/derived from the first symbol of next actual repetition) to fill the single-symbol gap before the slot boundary. In other embodiments, the situation may include using a new frequency hopping rule that allows frequency hopping in situations where the number of symbols after the hop and before the slot boundary is larger than Y number of symbols (e.g., Y equaling two symbols for 15 kHz and 30 kHz subcarrier spacing, or equaling three symbols for 60 kHz subcarrier spacing as just some examples). According to such exemplary rule, where the condition isn't met (e.g., the number of symbols after the hop and before the slot boundary would be equal to or less than Y) the UE may determine to transmit the repetition on the same frequency band without hopping. The UE may determine to hop again at the next repetition (depending on the total number of repetitions specified) with another comparison to the number of symbols remaining and the slot boundary.

In yet some other aspects of the present disclosure, a tight LBT gap may be defined for load-based equipment (LBE) operation. In such cases, a CP extension may be used to maintain the LBT gap. In some examples for dynamic grant (DG) UL, the UE may apply the CP extension indicated by the UL grant for the first PUSCH repetition. For the next repetition(s), in some examples a default CP extension may be used (which may be based on the subcarrier spacing being used at the time), while in some other examples the CP extension may be configured by RRC. In some examples for configured grant (CG) UL, the UE may randomly select an offset for the first PUSCH repetition. The offset may be randomly selected from a RRC configured offset set (e.g., a list of possible offsets to randomly choose from). For the next repetition(s), the UE may use in some examples a default CP extension, or alternatively a CP extension may be configured by RRC.

Aspects of the present disclosure can provide several benefits. For example, by introducing an LBT gap between different hop of PUSCH repetition(s), the UE may take advantage of frequency hopping for PUSCH repetitions in unlicensed bands. This may result in the UE performing efficient LBT to determine the availability of the frequency subbands, when hopping to another frequency subband to transmit PUSCH repetition data. This can increase frequency diversity which may result in higher data rates, improved capacity, and/or spectral efficiency between the UE and the BS (e.g., on the uplink). This may also be done without adding to the complexity and/or cost associated with additional RF chains that would otherwise possibly be used to accommodate multiple frequency subbands. Thus, thermal and power consumption considerations may be minimally impacted while the effective bandwidth on the uplink is increased. Further, by using existing configuration messages, backwards compatibility is possible while still allowing new UEs to transmit data on multiple frequency subbands in the ways described herein, and no new configuration information is necessarily added to existing standards.

Various aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may includes at least one element of a claim.

FIG. 1 illustrates a wireless communication network 100 according to some embodiments of the present disclosure. The network 100 may be a 5G network. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100 A UE 115 may also be a machine specifically configured for connected communication, including machine type communication (MTC), enhanced MTC (eMTC), narrowband IoT (NB-IoT) and the like. The UEs 115e-115k are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the DL and/or UL, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as with the small cell, the BS 105f. The macro BS 105d may also transmit multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as in a vehicle-to-vehicle (V2V), V2X, C-V2X communications between a UE 115i, 115j, or 115k and other UEs 115, and/or vehicle-to-infrastructure (V2I) communications between a UE 115i, 115j, or 115k and a BS 105 (e.g., PC5 etc.).

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource elements (RE)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., a PSS and a SSS) in the network 100 to facilitate synchronization. The BSs 105 can broadcast system information associated with the network 100 (e.g., including a master information block (MIB), remaining minimum system information (e.g., RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (e.g., PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier BW. The network 100 may partition the system BW into multiple BWPs (e.g., portions). A BS 105 may dynamically assign a UE 115 to operate over a certain BWP (e.g., a certain portion of the system BW). For example, the BS 105 may make the assignment via RRC and/or other signaling. The assigned BWP may be referred to as the active BWP. The UE 115 may monitor the active BWP for signaling information from the BS 105, such as downlink control information and/or RRC signaling, among other information. The BS 105 may schedule the UE 115 for UL or DL communications in the active BWP. In some aspects, a BS 105 may assign a pair of BWPs within the component carrier to a UE 115 for UL and DL communications. For example, the BWP pair may include one BWP for UL communications and one BWP for DL communications.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

In carrier aggregation (CA) scenarios, each component carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over a set of carrier bandwidths (i.e., carrier aggregation). In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

The number of aggregated component carriers for an uplink transmission may be equal to or less than the number of aggregated component carriers for a downlink transmission to a UE 115. Moreover, the individual component carriers on the downlink and/or the uplink may have different bandwidths from each other—e.g., on the uplink, individual component carriers that are aggregated together for an uplink transmission from the UE 115 may have different bandwidths from each other. Further, carrier aggregation may be used with both frequency division duplexing (FDD) and time division duplexing (TDD) component carriers. In some aggregation scenarios, the component carriers may be contiguous to each other within a frequency band (e.g., intra-band contiguous). In other scenarios, the component carriers may include one or more component carriers that are not contiguous to each other within a frequency band (e.g., intra-band non-contiguous). In yet other scenarios, the component carriers may include one or more component carriers that are not in the same frequency band to each other (e.g., inter-band non-contiguous).

In some aspects, the network 100 may operate over a shared channel, which may include shared frequency bands and/or unlicensed frequency bands. For example, the network 100 may be an NR-U network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. A TXOP may also be referred to as COT (e.g., a channel occupancy time). For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. An LBT may include one, two, or more clear channel assessments (CCAs) performed during successive time periods. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random back-off period. For instance, a transmitting node may determine a channel measurement in a time interval and determine whether the channel is available or not based on a comparison of the channel measurement against a ED threshold. A CAT4 LBT refers to an LBT with a random back-off and a variable contention window (CW). For instance, a transmitting node may draw a random number and back-off for a duration based on the drawn random number in a certain time unit.

In some aspects, the UE 115 may transmits UL data and control signaling (e.g., RRC messages, uplink control information (UCI)) to the BS 105 over a PUSCH channel. The PUSCH may include several small PUSCH repetitions transmitted on distributed time and frequency resources. The small PUSCHs repetitions may be scheduled by an UL grant or RRC signaling in the consecutive available slots. In some aspects, the UE 115 may transmit PUSCH repetitions over multiple frequency bands. In some examples according to embodiments of the present disclosure, the UE 115 may perform an LBT to sense the availability of the channel in the multiple frequency bands before starts starting the transmission of data in the multiple frequency bands. The LBT thus employed may, in some examples, be a CAT2 LBT that does not have a random backoff period. In other examples, another LBT category may be implemented for one or more of the embodiments of the present disclosure.

In some examples, the UE 115 may allocate an LBT gap between the different PUSCH repetitions including several time domain symbols to perform LBT on the target frequency band (also referred to herein simply as a second frequency band or sub-band) in the gap, and after the successful LBT process, the UE 115 may hop to the different frequency band and transmit at least one PUSCH repetition in the new frequency band. In some examples, the UE 115 may allocate the LBT gap at the end of the first hop. In some other examples, the UE 115 may allocate the LBT gap at the beginning of the second hop. The UE 115 may use a SLIV indicator to determine the starting symbol and length of the LBT gap. In some other instances, the UE 115 may use a formula to compute the length and starting symbol of the LBT gap. In some cases, some of the time domain symbols in the gap may be considered to be invalid for UL transmission. In these cases, the UE 115 may use the CP extension to fill the invalid symbols of the LBT gap. In some other scenarios, the UE 115 may be configured by the BS 105 with dynamic grant or configured grant for the PUSCH repetitions, and may use CP extension to maintain the LBT gap (such as for meeting "tight" gap requirements as may be present in scenarios such as those relating to load-based equipment, etc.). In these scenarios, the UE 115 may use the default CP extension or a CP extension configured by RRC to fill part of the LBT gap. Further relating to these aspects are discussed with respect to the other figures herein below.

Figure 2:
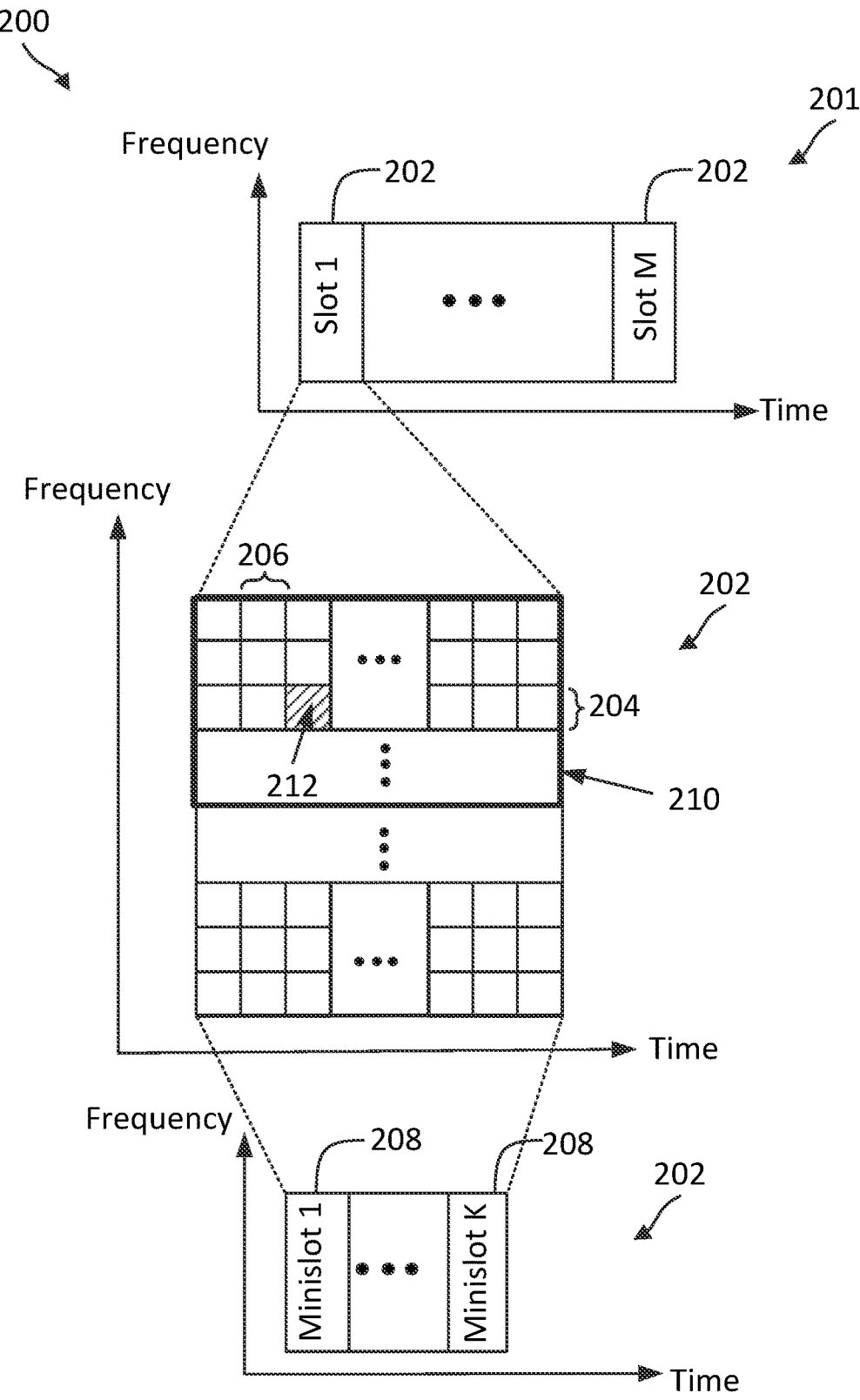
FIG. 2 illustrates a transmission frame for a communication network according to aspects of the present disclosure.

FIG. 2 illustrates a radio frame structure 200 according to some aspects of the present disclosure. The radio frame structure 200 may be employed by BSs such as the BSs 105 and UEs such as the UEs 115 in a network such as the network 100 for communications. In FIG. 2, the x-axis represent time in some arbitrary units and the y-axis represent frequency in some arbitrary units. The transmission frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the CP mode. One subcarrier 204 in frequency and one symbol 206 in time forms one resource element (RE) 212 for transmission. A resource block (RB) 210 is formed from a number of consecutive subcarriers 204 in frequency and one or more consecutive symbols 206 in time. In NR, a RB 210 is defined as twelve consecutive subcarriers 204 in a frequency domain. While the subcarriers are illustrated near each other, they may represent frequency bands that are adjacent to each other, spaced apart from each other, and/or may be examples of interlaced allocations of frequency bands. For example, where the frequency bands are interlaced, they may represent discontiguous chunks of frequencies within the bandwidth, where each chunk of frequency is separated by more than 1 MHz in some examples. In this manner, power spectral density limitations may be overcome that may exist, for example, in unlicensed bands that may be used according to embodiments of the present disclosure.

In an example, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204). In some examples, including any of the embodiments of the present disclosure, a UE 115 may be scheduled/allocated frequency resources in the granularity of interlaces (e.g., corresponding to RBs, such as 10 RBs interlaced together). The total number of resource elements constituting the RBs may be a multiple of 2, 3, or 5. The interlaces may be allocated across the entire system bandwidth, or for parts or subbands that do not span the entire bandwidth, or different bandwidths/ranges depending on use cases/available bandwidth, etc., or include multiple different SCSs within an allocation, and/or different modulation types (such as OFDM and DFT-s-OFDM) simultaneously, etc.

Figure 3:
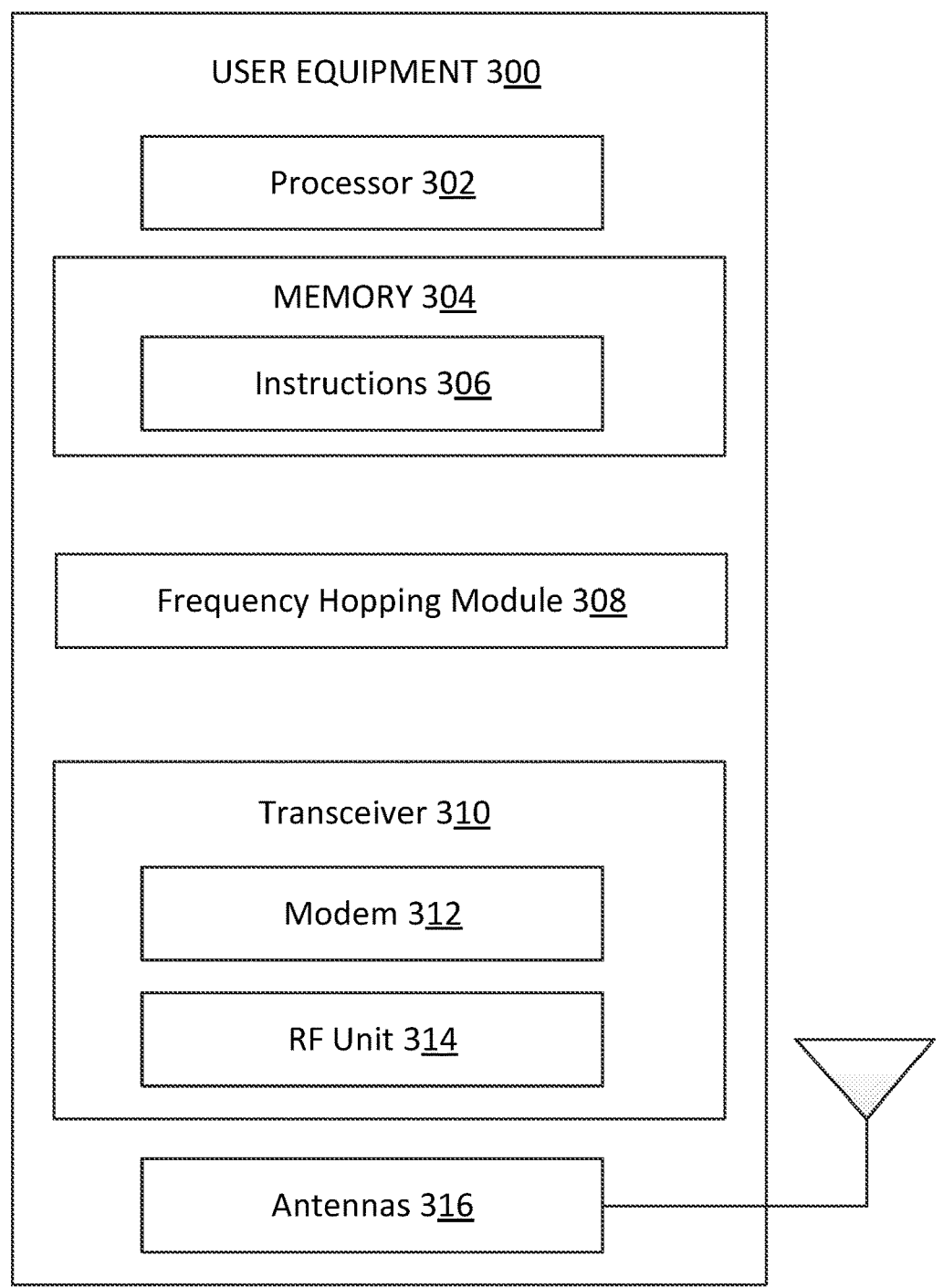
FIG. 3 is a block diagram of an example exemplary equipment (UE) according to aspects of the present disclosure.

FIG. 3 is a block diagram of an exemplary UE 300 according to embodiments of the present disclosure. The UE 300 may be a UE 115 as discussed above. As shown, the UE 300 may include a processor 302, a memory 304, a frequency hopping module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions 306. The instructions 306 may include instructions that, when executed by the processor 302, cause the processor 302 to perform the operations described herein with reference to the UEs 115 in connection with embodiments of the present disclosure. The instructions 306 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The frequency hopping module 308 may be implemented via hardware, software, or combinations thereof. For example, the frequency hopping module 308 may be implemented as a processor, circuit, and/or instructions 306 stored in the memory 304 and executed by the processor 302.

The frequency hopping module 308 may be configured to determine an LBT gap and perform an LBT during that gap, according to embodiments of the present disclosure, across multiple subbands to determine the availability of frequency subbands, hop to a different frequency subband based on the result of the LBT, and transmit PUSCH repetition data across multiple subbands.

For example, the UE 300 may be configured, with the frequency hopping module 308, for both PUSCH repletion type A (e.g., inter-slot, inter-repetition) and type B (e.g., inter-slot, inter repetition) on both licensed and unlicensed frequency bands. Or, alternatively, the UE 300 may be configured with the frequency hopping module 308 for just one of the two repetition types (or other types developed in the future to which embodiments of the present disclosure may be applied as well). Embodiments of the present disclosure enable the UE 300's uplink frequency hopping decisions to take into consideration, by the uplink frequency hopping module 308, a channel assessment from an LBT performed, before transmitting PUSCH repetitions in multiple frequency bands. When the UE 300 receives uplink scheduling information from a BS 105, the frequency hopping module 308 may identify available frequency bands for PUSCH repetitions. This may include allocating a gap to determine the frequency band availability of the frequency bands for scheduling PUSCH transmission.

For example, the frequency hopping module 308 may apply an LBT gap for a duration specified previously by a BS (e.g., a gNB), e.g. via DCI, RRC, or some other signaling mechanism. The frequency hopping module 308 may apply such gap, for example, when implementing PUSCH type A repetitions. In some other examples, the frequency hopping module 308 may determine the LBT gap based on one or more SLIVs from one or more BSs (e.g., BS 105). The frequency hopping module 308 may introduce the LBT gap between PUSCH type A repetitions or different hops of PUSCH. In some aspects, the frequency hopping module 308 may use the first X symbols (e.g., one, two, three, or other number of symbols) of the time domain resource indicated for the next PUSCH repetition by SLIV as the LBT gap. Alternatively, the frequency hopping module 308 may use the last X symbols of the time domain resource allocation indicated by SLIV of the previous PUSCH repetition as the LBT gap for the next PUSCH repetition. The frequency hopping module 308 may use SLIV to make these determinations when configured for PUSCH type A repetitions (such as inter-slot frequency hopping) and/or with PUSCH type B repetitions (such as inter-repetition frequency hopping).

In other examples, the frequency hopping module 308 may determine the location of the LBT gap according to an algorithm useful in type A intra-slot repetition scenarios. For example, the frequency hopping module 308 may use X number of symbols as the LBT gap. The frequency hopping module 308 may determine the location of the start and end of the LBT gap for such situations from the starting symbol S, combined with the floor of a length of the repetition (e.g., in number of symbols) divided by two, further taking out the X symbols of the LBT gap, with the LBT gap's location extending to the value S combined with the length divided by two, less one symbol. As noted previously, this may be represented with the equation $S+\lfloor L/2\rfloor-X$ (the start location of the LBT gap) for the frequency hopping module 308 determining the starting location ($\lfloor L/2\rfloor$ representing a maximum integer operation here, and the similar brackets $\lfloor * \rfloor$ representing that operation generally herein), and $S+\lfloor L/2\rfloor-1$ for the frequency hopping module 308 determining the end location of the LBT gap. In such an example, S may be the starting symbol of the PUSCH repetition and L the length of PUSCH repetition. This may correspond to a situation where the LBT gap occurs with a time domain resource allocated for the previous PUSCH repetition.

Alternatively, continuing with the example where the frequency hopping module 308 determines the location of the start and end of the LBT gap, the frequency hopping module 308 may determine the X number of symbols of the LBT gap with the location of the start and end of the LBT gap determined starting from symbol $S+\lfloor L/2\rfloor$ to symbol $S+\lfloor L/2\rfloor+X-1$, where again S is the starting symbol of PUSCH repetition and L is the length of the PUSCH repetition. This may correspond to a situation where the LBT gap occurs with a time domain resource allocated for the next PUSCH repetition.

In some other aspects of the present disclosure, the frequency hopping module 308 may determine the location and duration of the LBT gap between PUSCH repetition at different hops of PUSCH type A according to a different algorithm for intra-slot repetition scenarios. For example, the frequency hopping module 308 may use an existing formula used in the 3GPP specification to determine the number of symbols of each hop within a slot, and from that determine the location of the LBT gap relative to the symbols of each hop. The existing formula for the first hop (e.g., the first part of a repetition) may be, for example, $$\lfloor N_{symb}^{PUSCH,S}/2\rfloor,$$

where $$N_{symb}^{PUSCH,S}$$

is the length of the PUSCH transmission in OFDM symbols in a slot (both hops together). The existing formula for the second hop (e.g., the second part of a repetition) may be, for example, $$N_{symb}^{PUSCH,S} - \lfloor N_{symb}^{PUSCH,S}/2\rfloor.$$

The frequency hopping module 308 may, in some examples, introduce the LBT gap at the end of the first hop (e.g., occupying one or more symbols of the first part of the repetition on the first frequency band). In some other variants, the LBT gap may be introduced at the beginning of the second hop (e.g., occupying one or more symbols of the second part of the repetition on the second frequency band).

In some other aspects, the frequency hopping module 308 may use an existing formula to determine the number of symbols for each hop after first removing the X symbols used for the LBT gap. Thus, the frequency hopping module 308 may take a floor value of the total length of the repetition (excluding the X symbols) divided by two to arrive at the location of the start of the LBT gap (e.g., at the first hop). This may be represented as $$\lfloor N_{symb}^{PUSCH,S} - X/2 \rfloor$$

to determine the number of symbols of the first hop, where $$N_{symb}^{PUSCH,S}$$

is the length of the PUSCH transmission in OFDM symbols in a slot (both hops together). The location of the end of the LBT gap may be determine by taking away from the X symbols the floor value of the total length of the repetition (excluding the X symbols), divided by two. This may be represented as $$X - \lfloor N_{symb}^{PUSCH,S} - X/2 \rfloor.$$

In some other aspects of the present disclosure, the frequency hopping module 308 may introduce LBT gaps for PUSCH type A with inter-slot frequency hopping, or PUSCH repetition type B with inter-repetition frequency hopping or inter-slot frequency hopping. In such aspects, the frequency hopping module 308 may determine the location of the LBT gap based on the hopping boundary, instead of from the SLIV as in some other embodiments. For example, in some variants, the frequency hopping module 308 may introduce (and use) the LBT gap at the end of the first hop (e.g., occupying one or more symbols of the first repetition on the first frequency band). In some other variants, the frequency hopping module may introduce (and use) the LBT gap at the beginning of the second hop (e.g., occupying one or more symbols of the second repetition on the second frequency band).

Situations may arise where the hopping boundary may be close enough to an end of a slot that with the introduction of the LBT gap there might be a small number of symbols remaining between the LBT gap and the end of the slot. For example, only one symbol may remain after the LBT gap before the end of the slot (e.g., with a one symbol LBT gap when using 15 kHz or 30 kHz subcarrier spacing, or two symbol LBT gap when using 60 kHz subcarrier spacing). According to embodiments of the present disclosure the situation may be treated as an error condition between the UE 300 and the BS 105. The frequency hopping module 308, for example, may cause an error message to be transmitted to the BS 105. The error message may identify the issue to the BS 105. Alternatively or additionally, the error procedure may include a retransmission at a subsequent time.

In some other embodiments, the situation may include the frequency hopping module 308 instead introducing a cyclic prefix (CP) extension (e.g., determined/derived from the first symbol of next actual repetition) to fill the single-symbol gap before the slot boundary. The frequency hopping module 308 may determine or otherwise derive the CP extension from the first symbol of the next actual repetition. In other embodiments, the frequency hopping module 308 may apply a frequency hopping rule defined between the UE 300 and the BS 105, such as pre-configured with the UE 300, and/or dynamically updated via control messaging from one or more BSs 105 during operation. The frequency hopping rule may allow frequency hopping in situations where the number of symbols after the hop and before the slot boundary is larger than Y number of symbols (e.g., Y equaling two symbols for 15 kHz and 30 kHz subcarrier spacing, or equaling three symbols for 60 kHz subcarrier spacing as just some examples). According to such exemplary rule, where the condition isn't met (e.g., the number of symbols after the hop and before the slot boundary would be equal to or less than Y) the frequency hopping module 308 may determine to transmit the repetition on the same frequency band without hopping. The frequency hopping module 308 may determine to hop again at the next repetition (depending on the total number of repetitions specified), which may include another comparison to the number of symbols remaining and the slot boundary and resulting determination.

In examples, a tight LBT gap may be defined for load-based equipment (LBE) operation (e.g., where the UE 300 is an LBE). In such cases, the frequency hopping module 308 may use a CP extension to maintain the LBT gap for the duration of a symbol or symbols. In dynamic grant environments, for example, the frequency hopping module 308 may apply the CP extension indicated by an UL grant (e.g., previously received at the UE 300 from a BS 105) for the first PUSCH repetition. For the next repetition(s), the frequency hopping module 308 may use a default CP extension. The default CP extension may be based on the SCS being used at the time (e.g., one symbol less 25 μs for 15 kHz or 30 kHz SCS, or two symbols less 25 μs for 60 kHz SCS). In other examples, the frequency hopping module 308 may use a CP extension as configured by RRC. In configured grant environments, the frequency hopping module 308 may randomly select an offset for the first PUSCH repetition. The offset may be randomly selected from a RRC configured offset set (e.g., a list of possible offsets to randomly choose from), such as may have been received by the UE 300 previously and stored in memory. For the next repetition(s), the frequency hopping module may use a default CP extension, similar to as discussed above related to the dynamic grant scenario, or alternatively a CP extension may be configured by RRC.

As shown, the transceiver 310 may include the modem subsystem 312 and the RF unit 314. The transceiver 310 can be configured to communicate bi-directionally with other devices, such as the BSs 105 and/or another core network element. The modem subsystem 312 may be configured to modulate and/or encode the data from the memory 304 and/or the frequency hopping module 308 according to a modulation and coding scheme (MCS), e.g., a low-density parity check (LDPC) coding scheme, a turbo coding scheme, a convolutional coding scheme, a digital beamforming scheme, etc., and in accordance with the predetermined frame structure. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 300 to enable the UE 300 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement different RATs.

Figure 4:
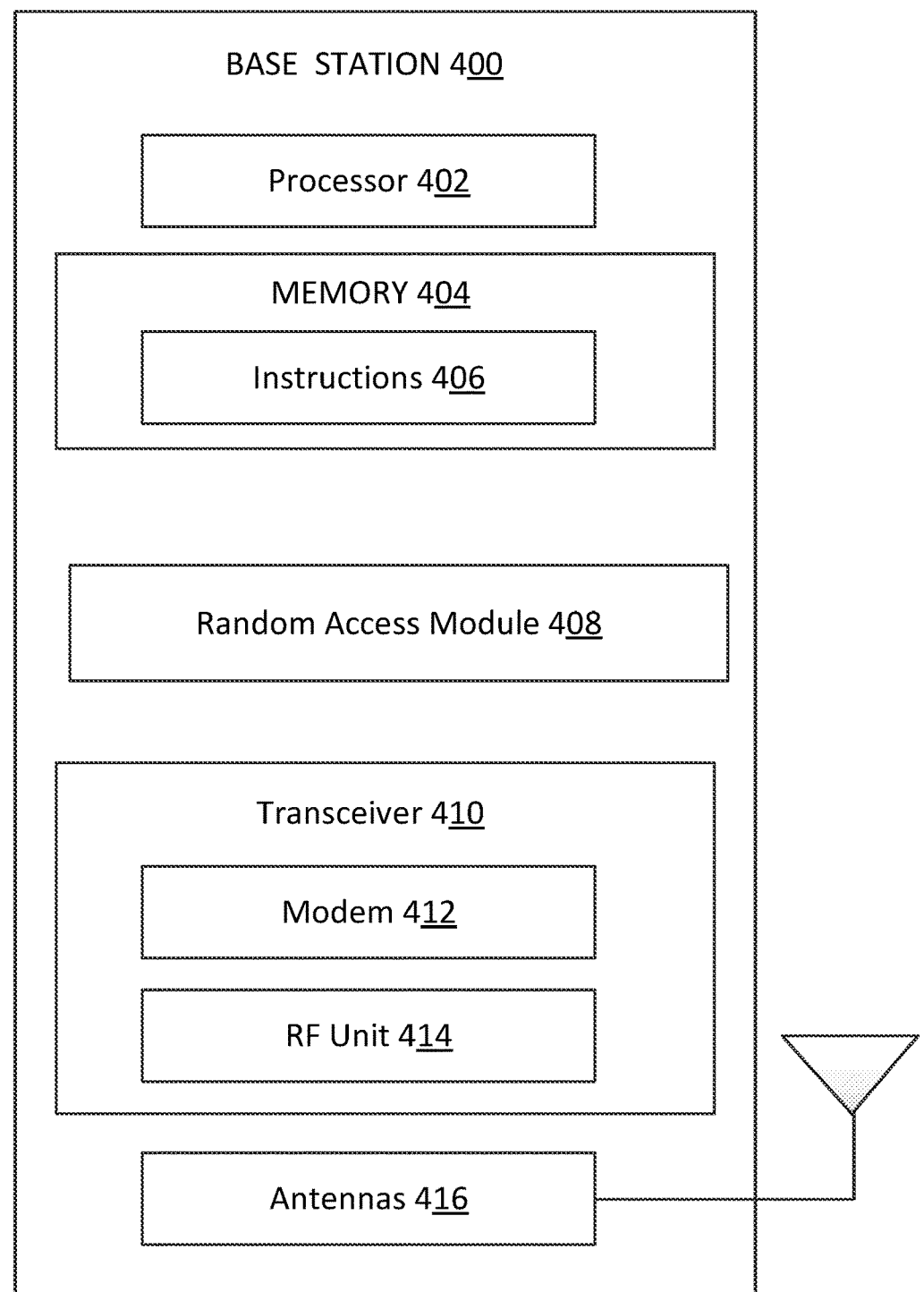
FIG. 4 is a block diagram of an exemplary base station (BS) according to aspects of the present disclosure.

FIG. 4 is a block diagram of an exemplary BS 400 according to embodiments of the present disclosure. The BS 400 may be a BS 105 as discussed above. As shown, the BS 400 may include a processor 402, a memory 404, a frequency hopping module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein. The instructions 406 may also be referred to as code, which may be interpreted broadly to include any type of computer-readable statement(s) as discussed above with respect to FIG. 3.

The frequency hopping module 408 may be implemented via hardware, software, or combinations thereof. For example, the frequency hopping module 408 may be implemented as a processor, circuit, and/or instructions 406 stored in the memory 404 and executed by the processor 402.

The frequency hopping module 408 may be configured, in cooperation with other aspects of the BS 400, to schedule the UE 115 for PUSCH repetitions, receive the PUSCH repetitions and PUSCH information (e.g., type) from the UE 115, assist in soft-combining the different PUSCH repetitions, and process the PUSCH data according to the repetition type.

For example, the BS 400 may be configured, with the frequency hopping module 408, for assisting the BS 400 in determining where and when to listen for PUSCH repetitions, in particular taking into account where the LBT gap may appear for the UE 300, and when repetitions may be transmitted and at what frequency band or bands. Embodiments of the present disclosure enable the BS 400 to process uplink data in different frequency hops to take into consideration, by the uplink frequency hopping module 408, for example, transmitting PUSCH repetitions in multiple frequency bands. When the BS 400 receives uplink data from a UE 105, the frequency hopping module 408 may identify the data in different frequency bands. This may include considering an LBT allocated by the UE 115 to determine the frequency band availability of the frequency bands for scheduling PUSCH transmission, including one or more of the aspects discussed above with respect to the frequency hopping module 308 determining where and when to perform the LBT operation and at what frequencies to transmit the repetitions.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or another BS 105. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 400 to enable the BS 400 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of UL scheduling grant according to embodiments of the present disclosure. The antennas 416 may further receive data messages transmitted from other devices and provide the received data messages for processing and/or demodulation at the transceiver 410 (e.g., repetitions of PUSCH transmitted on one or more frequencies with LBT gaps introduced according to embodiments of the present disclosure). The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement different RATs.

Figure 5A:
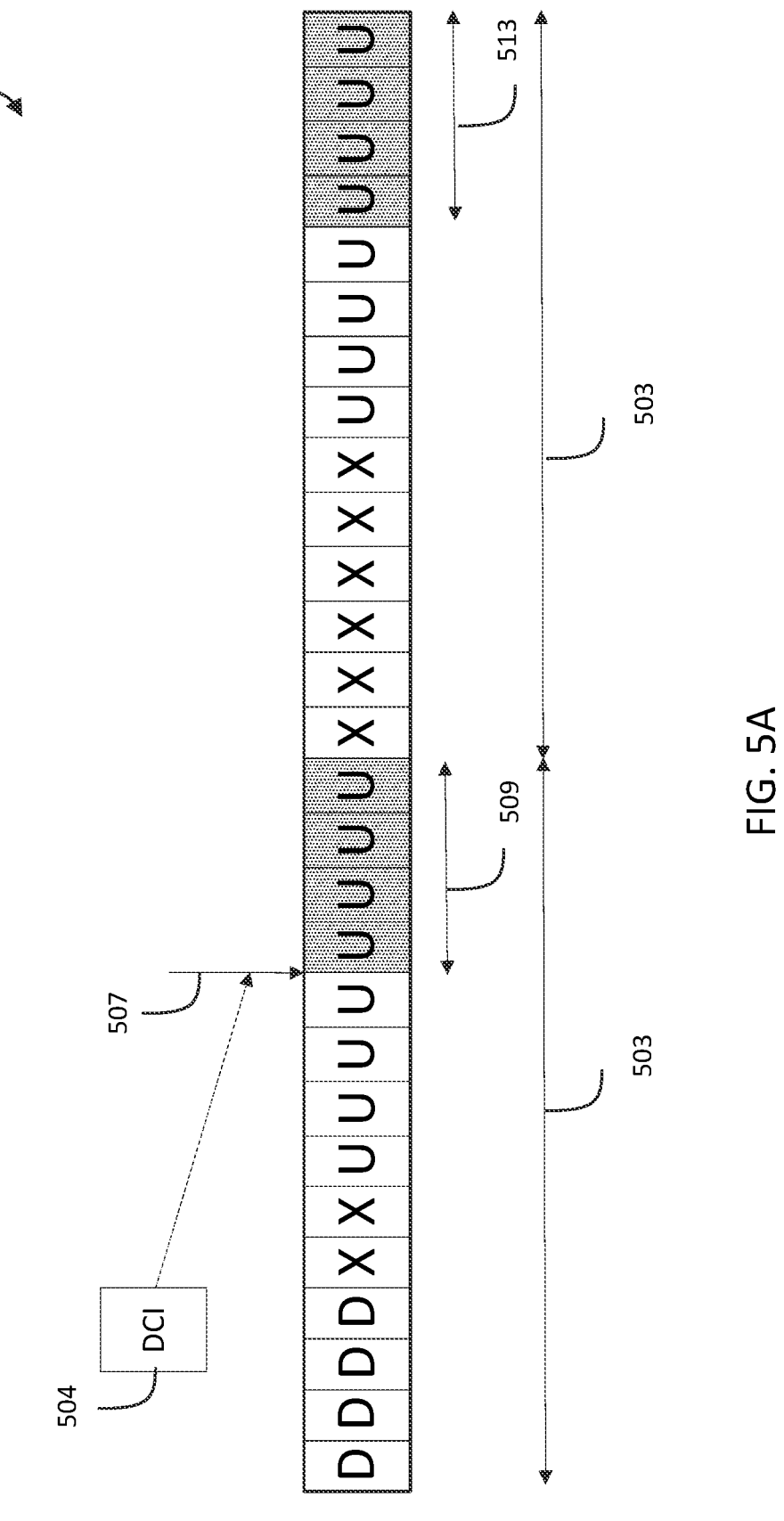
FIG. 5A illustrates an exemplary transmission repetition structure according to aspects of the present disclosure.

FIG. 5A illustrates aspects of an exemplary configuration 500 for transmission of PUSCH type A repetitions. A BS such as BS 400 may configure a UE 300 to transmit using a frequency and time allocation such as the allocation 500. Two adjacent slots are illustrated in FIG. 5A, slots 503 and

504, available for use for PUSCH type A repetitions. Slot 503, 504 include time domain symbols 515. The downlink control information (DCI) 504 transmitted from BS 400 may indicate to the UE 300 the starting symbol within a slot and length of the PUSSCH repetitions 509, 513 via SLIV. In the configuration 500, the same SLIV may be applied across different slots 503, 504, such that the position of the repetitions 509, 513 within their respective slots 503, 505 are the same in terms of starting symbol and length. More generally, for K repetitions (e.g., greater than 1), the same SLIV information is applied to each repetition in each consecutive slot in which a repetition is transmitted.

Figure 5B:
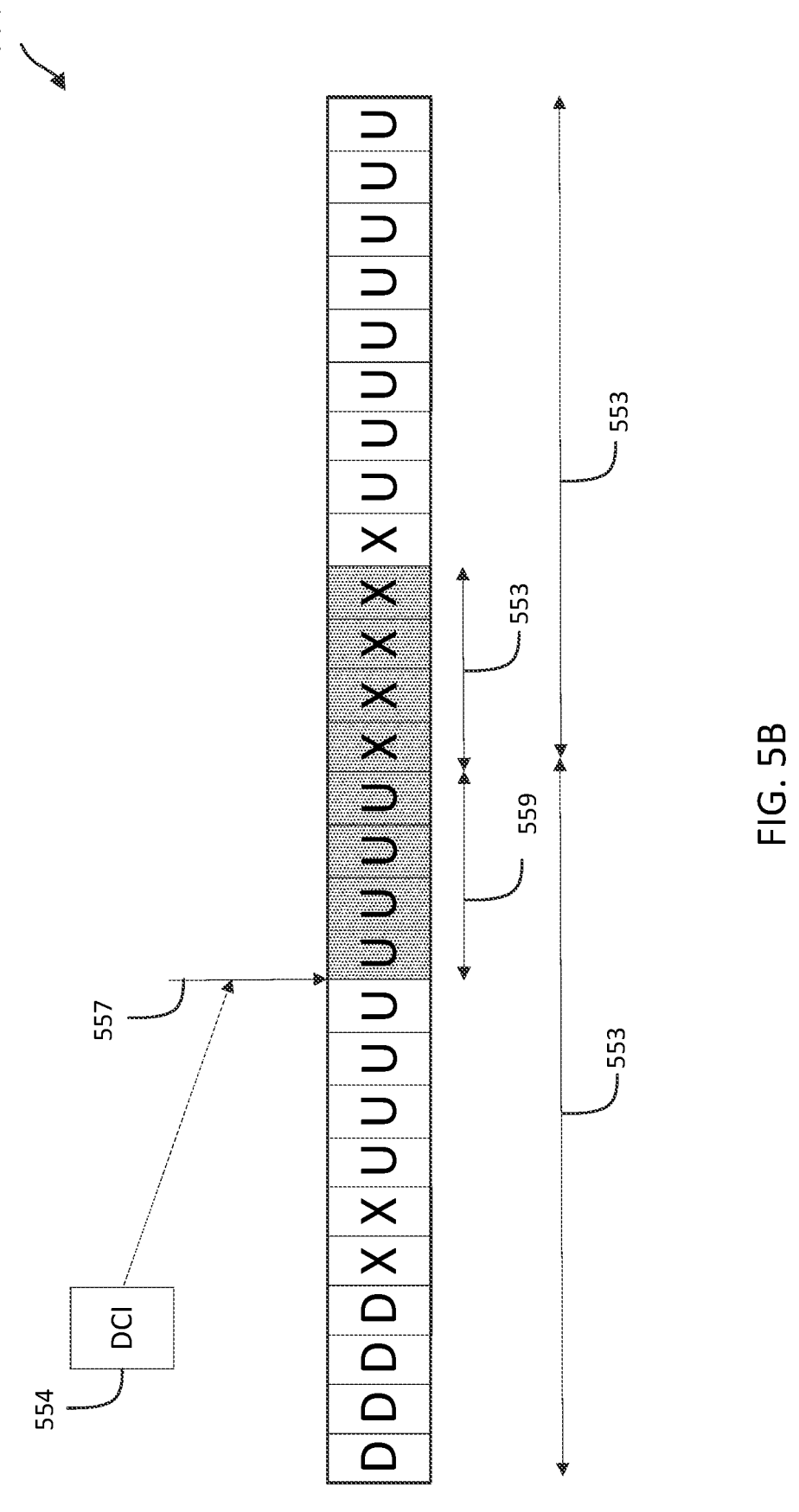
FIG. 5B illustrates an exemplary transmission repetition structure according to aspects of the present disclosure.

FIG. 5B illustrates aspects of an exemplary configuration 550 for transmission of PUSCH type B repetitions. A BS such as BS 400 may configure a UE 300 to transmit using a frequency and time allocation. Two adjacent slots are illustrated in FIG. 5B, slot 553 and 555. Each slot 553, 555 includes 14 time domain symbols for PUSCH type B repetitions in the illustrated example. The downlink control information (DCI) 554 transmitted from a BS 400 may indicate to the UE 300 the starting symbol within a slot and length of the PUSCH repetition 559 via SLIV. In the configuration 550, the repetition 557 begins at the starting symbol 557 identified via SLIV in slots 553, while the repetition 561 starts within or across slots 553 and 555. For example, as illustrated the repetition 561 begins back-to-back at the end of repetition 559, which occurs at the slot boundary between slots 553 and 555 in the example. PUSCH type B repetitions may cross the slot boundary between slots. Further, PUSCH type B repetition supports the dynamic indication of number of repetitions, inter-nominal PUSCH frequency hopping, new UL/DL symbol interaction, new SLIV, etc.

In the configuration 550, the UE 300 may determine invalid symbols for PUSCH repetitions 559 and 561, for example based on predefined rules and/or RRC configuration. A symbol of a repetition may be determined as invalid if it conflicts with another symbol, such as a semi-static DL symbol or an invalid symbol (e.g., as configured via RRC as invalid such as only for PUSCH). Once the UE 300 determines the invalid symbols, the remaining symbols may be considered as potential symbols for PUSCH repetition transmission.

If the number of potential valid symbols for PUSCH repetition type B transmission is greater than zero for a nominal repetition, the PUSCH repetition may consist of one or more actual repetitions (e.g., potentially surrounding a slot boundary). Each actual repetition may consist of a consecutive set of all potentially valid symbols that can be used for PUSCH repetition Type B transmission within a slot. Thus, where the repetition starts after a prior repetition in the same slot, but has a length greater than the rest of the time available in the same slot, this is identified as a nominal repetition. It may be split into two actual repetitions—the first actual repetition occupies the remaining valid symbols in the same slot as the prior repetition up until the slot boundary. The second actual repetition occupies the first valid symbols in the next slot after the slot boundary. In cases where the actual repetition has just a single symbol, the UE 300 may omit the repetition, and/or may allow the actual repetition in situations where L=1 (i.e., the length of the repetition is one symbol).

Figure 6:
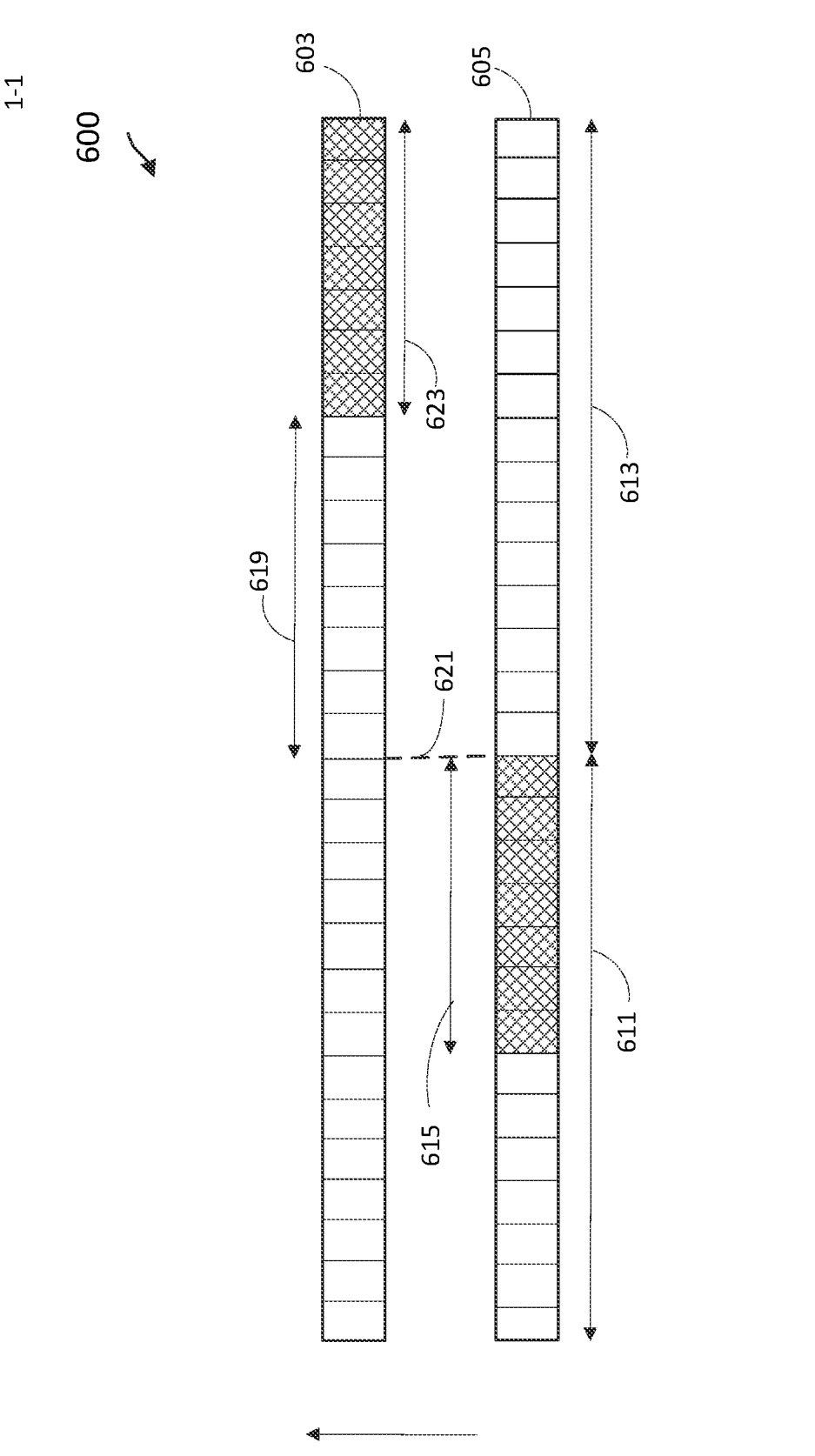
FIG. 6 illustrates an exemplary frequency hopping repetition structure according to aspects of the present disclosure.

FIG. 6 illustrates an exemplary frequency hopping repetition structure according to aspects of the present disclosure. In particular, FIG. 6 illustrates aspects of an exemplary time and frequency resource allocation structure 600 for transmission of PUSCH type A repetitions with inter-slot frequency hopping. The vertical axis represents frequency (e.g., two frequency bands 603 and 605). Further, the horizontal axis represents time.

The frequency bands 603 and 605 are illustrated in FIG. 6 above one another, signifying that they constitute different bands of frequencies. As further illustrated, frequency bands 603 and 605 occupy the same time slots albeit across different frequencies in a time-frequency grid. Two frequency bands 603 and 605 are illustrated in FIG. 6, and in the ensuing figures, for simplicity of discussion, and may represent interlaced bands in some examples. As illustrated, frequency bands 603 and 605 span two adjacent slots 611 and 613. The frequency band 603 may also be referred to as frequency band f1, and frequency band 605 may also be referred to as frequency band f2. As shown, there are two PUSCH repetitions in FIG. 6 configured according to PUSCH type A repetitions with inter-slot frequency hopping across unlicensed bands. Accordingly, two PUSCH repetitions are illustrated, PUSCH repetition 615 and PUSCH repetition 623. This may correspond to a scenario where two repetitions are defined by the BS 400 for a UE 300 to transmit. In other scenarios, more than two repetitions may be defined, but for simplicity of illustration herein just two are shown and discussed.

The BS 400 may inform the UE 300 what the LBT gap, illustrated as gap 619 in FIG. 6, should be before the PUSCH repetition 623. The UE 300 may then implement, for example by frequency hopping module 308. As shown, the UE 300 may transmit the PUSCH repetition 615 in frequency band 605. After transmitting the PUSCH repetition 615, the UE 300 may perform LBT during the gap 619 that was defined by the BS 400 as part of the procedure to hop to frequency band 603. If the LBT passes, then the UE 300 transmits the PUSCH repetition 623 on frequency band 603 at the same symbol start time as was used for PUSCH repetition 615.

Figures 7A, 7B:
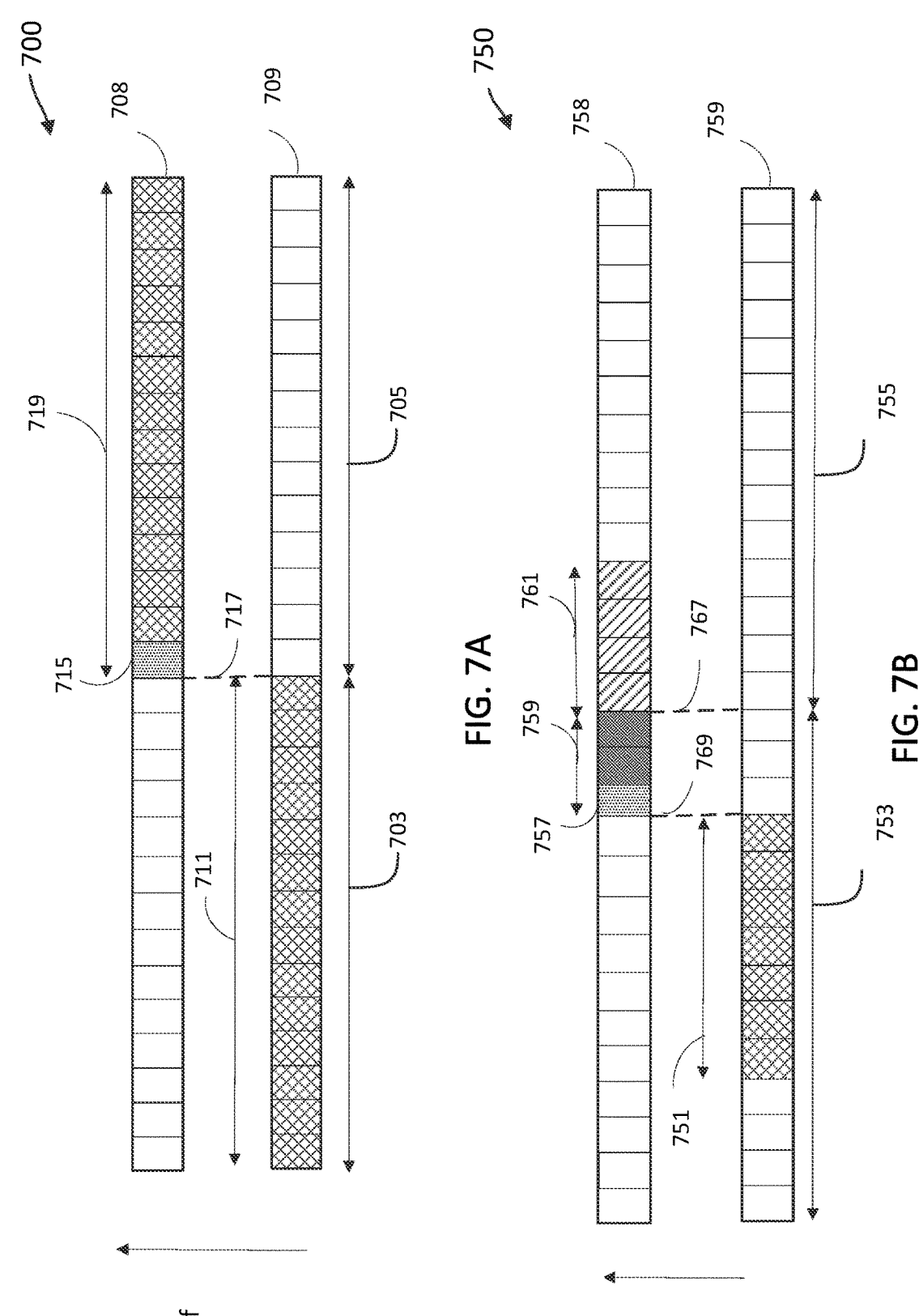
FIG. 7A illustrates an exemplary frequency hopping repetition structure according to aspects of the present disclosure.
FIG. 7B illustrates an exemplary frequency hopping repetition structure according to aspects of the present disclosure.

FIG. 7A illustrates an exemplary frequency hopping repetition structure according to aspects of the present disclosure. In particular, FIG. 7A illustrates aspects of an exemplary time and frequency resource allocation 700 for transmission of PUSCH type A repetitions with inter-slot frequency hopping. FIG. 7A includes frequency bands 708 and 709, and may again represent a variety of frequency band configurations (as discussed with respect to FIGS. 2 and/or 6), including interlaced bands. As illustrated, the frequency bands 708 and 709 span two adjacent slots 703 and 705. As shown, there are two PUSCH repetitions in FIG. 7A configured according to PUSCH type A repetitions with inter-slot frequency hopping across unlicensed bands 708 and/or 709. Accordingly, two PUSCH repetitions are illustrated, PUSCH repetition 711 and PUSCH repetition 719. This may correspond to a scenario where two repetitions are defined by the BS 400 for a UE 300 to transmit. In other scenarios, more than two repetitions may be defined, but for simplicity of illustration herein just two are shown and discussed.

In the embodiment of FIG. 7A, the first repetition is transmitted starting at the symbol identified in a SLIV from the BS 400, for the length identified in the SLIV as well. This is illustrated with the PUSCH repetition 711 transmitted in frequency subband 709 in slot 703. Further, the UE 300 may perform LBT during gap 715, which occurs after the slot boundary 717. The UE 300 determines the LBT gap 715 by using the first X symbols of the time domain resource allocation/SLIV for the second and subsequent repetitions (depending on how many repetitions are defined by the SLIV, for example). Accordingly, in FIG. 7A the UE 300 transmits the PUSCH repetition 719 on frequency band 708 if the LBT clears from the gap 715. This is exemplary only; shorter lengths may also be defined, in which case the LBT gap would occupy the first time domain resource allocation of the repetition as defined in the SLIV. The illustrated example shows PUSCH repetitions with length L defined to occupy the full length of the slot (with the same symbol start time for each repetition pursuant to PUSCH type A repetitions with inter-slot frequency hopping).

FIG. 7B illustrates an exemplary frequency hopping repetition structure according to aspects of the present disclosure. In particular, FIG. 7B illustrates aspects of an exemplary time and frequency resource allocation 750 for transmission of PUSCH type B repetitions with inter-repetition frequency hopping. FIG. 7B includes frequency bands 758 and 759, and may again represent a variety of frequency band configurations (as discussed with respect to FIGS. 2 and/or 6), including interlaced bands. As illustrated, the frequency bands 758 and 759 span two adjacent slots 753 and 759. As shown, there are two PUSCH repetitions in FIG. 7B configured according to PUSCH type B repetitions with inter-repetition frequency hopping across unlicensed bands 758 and/or 759. Accordingly, two PUSCH repetitions are illustrated, actual PUSCH repetition 751 and nominal PUSCH repetition 759-761. In particular, the nominal PUSCH repetition is constituted of actual PUSCH repetition 759 and actual PUSCH repetition 761. This may correspond to a scenario where two repetitions are defined by the BS 400 for a UE 300 to transmit. In other scenarios, more than two repetitions may be defined, but for simplicity of illustration herein just two are shown and discussed. In particular, this illustrates a scenario where the second repetition may span slot boundary 767, hence two actual repetitions constituting one nominal repetition.

In the embodiment of FIG. 7B, the first repetition 751 is transmitted starting at the symbol identified in a SLIV from the BS 400, for the length identified in the SLIV as well. This is illustrated with the PUSCH repetition 751 transmitted in frequency subband 759 in slot 753. Further the UE 300 may perform LBT during gap 757 by using the first X symbols of the time domain resource allocation/SLIV for the second and subsequent repetitions (depending on how many repetitions are defined), at the hopping boundary 769. Further, according to type B repetition, the second nominal repetition begins right after the first repetition (i.e., still in the first slot 753) after the LBT gap 757. Accordingly, the UE 300 transmits the actual PUSCH repetition 759 in the remaining symbols of slot 753 (reaching the slot boundary 767) if the LBT clears from the gap 757 in frequency band 758. The UE 300 continues transmitting the actual PUSCH repetition 761 on frequency band 758 at the start of the new slot 755. Again, the length of the repetitions may be defined by SLIV and may assume a variety of values ranging from a few symbols (including 1 symbol in some examples) up to the length of the slot.

Figures 8A, 8B:
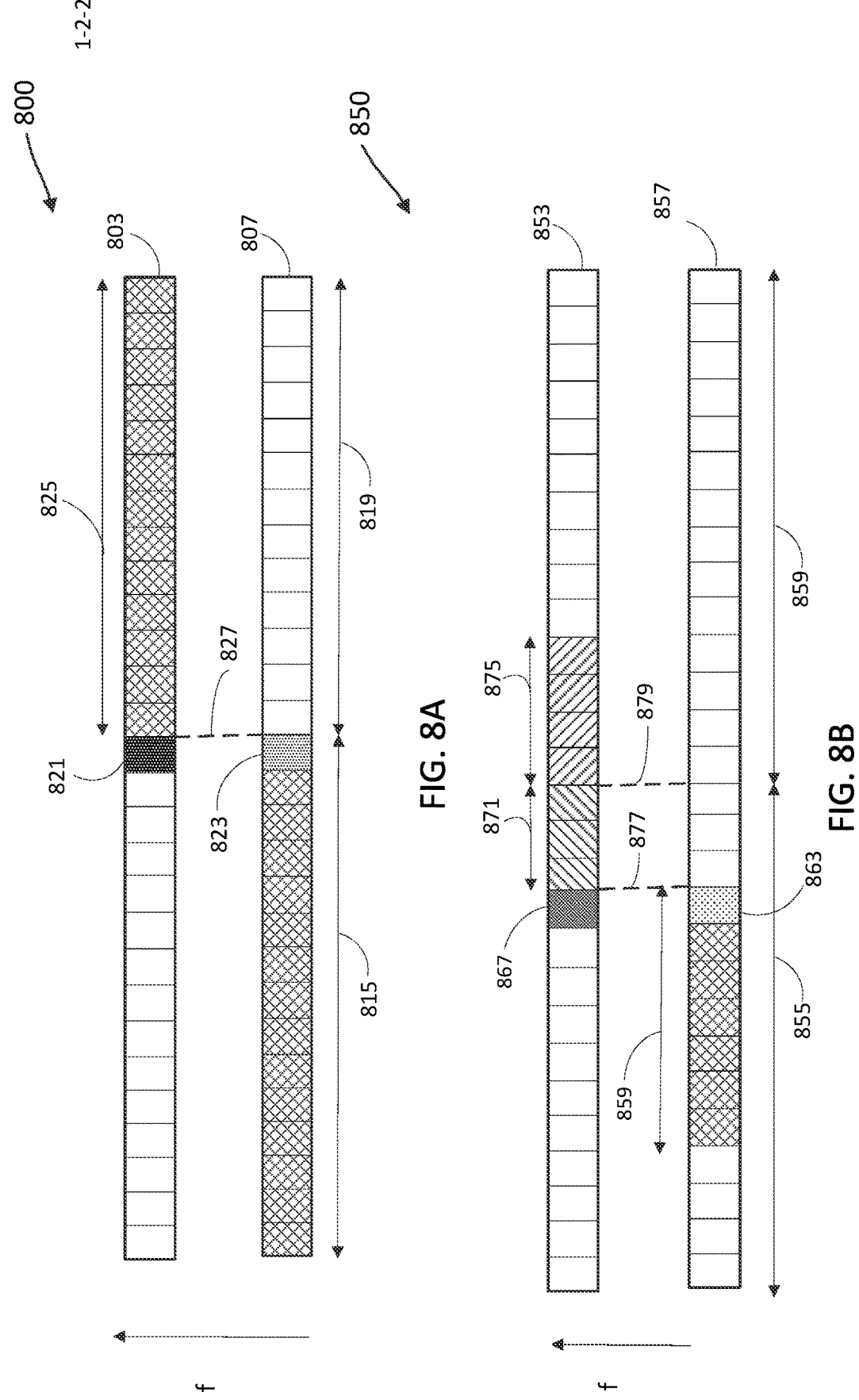
FIG. 8A illustrates an exemplary frequency hopping repetition structure according to aspects of the present disclosure.
FIG. 8B illustrates an exemplary frequency hopping repetition structure according to aspects of the present disclosure.

FIG. 8A illustrates an exemplary frequency hopping repetition structure according to aspects of the present disclosure. In particular, FIG. 8A illustrates aspects of an exemplary time and frequency resource allocation 800 for transmission of PUSCH type A repetitions with inter-slot frequency hopping. FIG. 8A includes frequency bands 803 and 807, and may again represent a variety of frequency band configurations (as discussed with respect to FIGS. 2 and/or 6), including interlaced bands. As illustrated, the frequency bands 80, and 809 span two adjacent slots 815 and 819. As shown, there are two PUSCH repetitions in FIG. 8A configured according to PUSCH type A repetitions with inter-slot frequency hopping across unlicensed bands 803 and/or 807. Accordingly, two PUSCH repetitions are illustrated, PUSCH repetition 811 and PUSCH repetition 825. This may correspond to a scenario where two repetitions are defined by the BS 400 for a UE 300 to transmit. In other scenarios, more than two repetitions may be defined, but for simplicity of illustration herein just two are shown and discussed.

In the embodiment of FIG. 8A, the first repetition is transmitted starting at the symbol identified in a SLIV from the BS 400, similar to as discussed with respect to FIG. 7A above, similarly with the length defined by the SLIV as well. This is illustrated with PUSCH repetition 811 transmitted in frequency band 807 in slot 815. Further, the UE 300 may perform LBT during gap 821, which coincides with the last symbol 823 of the prior repetition (here, PUSCH repetition 811), which occurs before the slot boundary 827. The UE 300 determines the LBT gap 821 by using the last X symbols of the time domain resource allocation/SLIV for the first repetition. Accordingly, in FIG. 8A the UE 300 transmits the PUSCH repetition 825 on frequency band 803 in slot 819 if the LBT clears from the gap 821. This is exemplary only; shorter lengths may also be defined, though in such cases the LBT gap would still occupy the last time domain resource allocation, here symbol 823, of the first repetition. The illustrated example shows PUSCH repetitions with length L defined to occupy the full length of the slots, but as noted with respect to FIG. 7A other lengths are possible too. Embodiments where the last symbol of the prior PUSCH repetition is used may have reduced impact on PUSCH DMRS, for example.

FIG. 8B illustrates an exemplary frequency hopping repetition structure according to aspects of the present disclosure. In particular, FIG. 8B illustrates aspects of an exemplary time and frequency resource allocation 850 for transmission of PUSCH type B repetitions with inter-repetition frequency hopping. FIG. 8B includes frequency bands 853 and 857, and may again represent a variety of frequency band configurations (as discussed with respect to FIGS. 2 and/or 6), including interlaced bands. As illustrated, the frequency bands 853 and 859 span two adjacent slots 855 and 859. As shown, there are two PUSCH repetitions in FIG. 8B configured according to PUSCH type B repetitions with inter-repetition frequency hopping across unlicensed bands 853 and/or 857. Accordingly, two PUSCH repetitions are illustrated, actual PUSCH repetition 859 and nominal PUSCH repetition 817-875. In particular, the nominal PUSCH repetition is constituted of actual PUSCH repetition 871 and actual PUSCH repetition 875. As discussed with respect to FIG. 7B's example, this may correspond to a scenario where two repetitions are defined, and particular where one of the repetitions spans slot boundary 879.

In the embodiment of FIG. 8B, the first repetition 859 is transmitted starting at the symbol identified in a SLIV from the BS 400, for the length identified in the SLIV as well. This is illustrated with the PUSCH repetition 855 transmitted in frequency subband 857 in slot 855. Further the UE 300 may perform LBT during gap 867 by using the last X symbols of the time domain resource allocation/SLIV for the first repetition (here, PUSCH repetition 855), which occurs before the hopping boundary 877. The LBT gap 867 may coincide with the last symbol 863 of the prior repetition 855. Further, according to type B repetition, the second nominal repetition begins right after the first repetition (i.e., still in the first slot 855) after the LBT gap 867. Accordingly, the UE 300 transmits the actual PUSCH repetition 871 in the remaining symbols of slot 855 (reaching the slot boundary 879) if the LBT clears from the gap 867 in frequency band 853. The UE 300 continues transmitting the actual PUSCH repetition 875 on frequency band 853 at the start of the new slot 859. Again, the length of the repetition may be defined by SLIV.

Figures 9A, 9B:
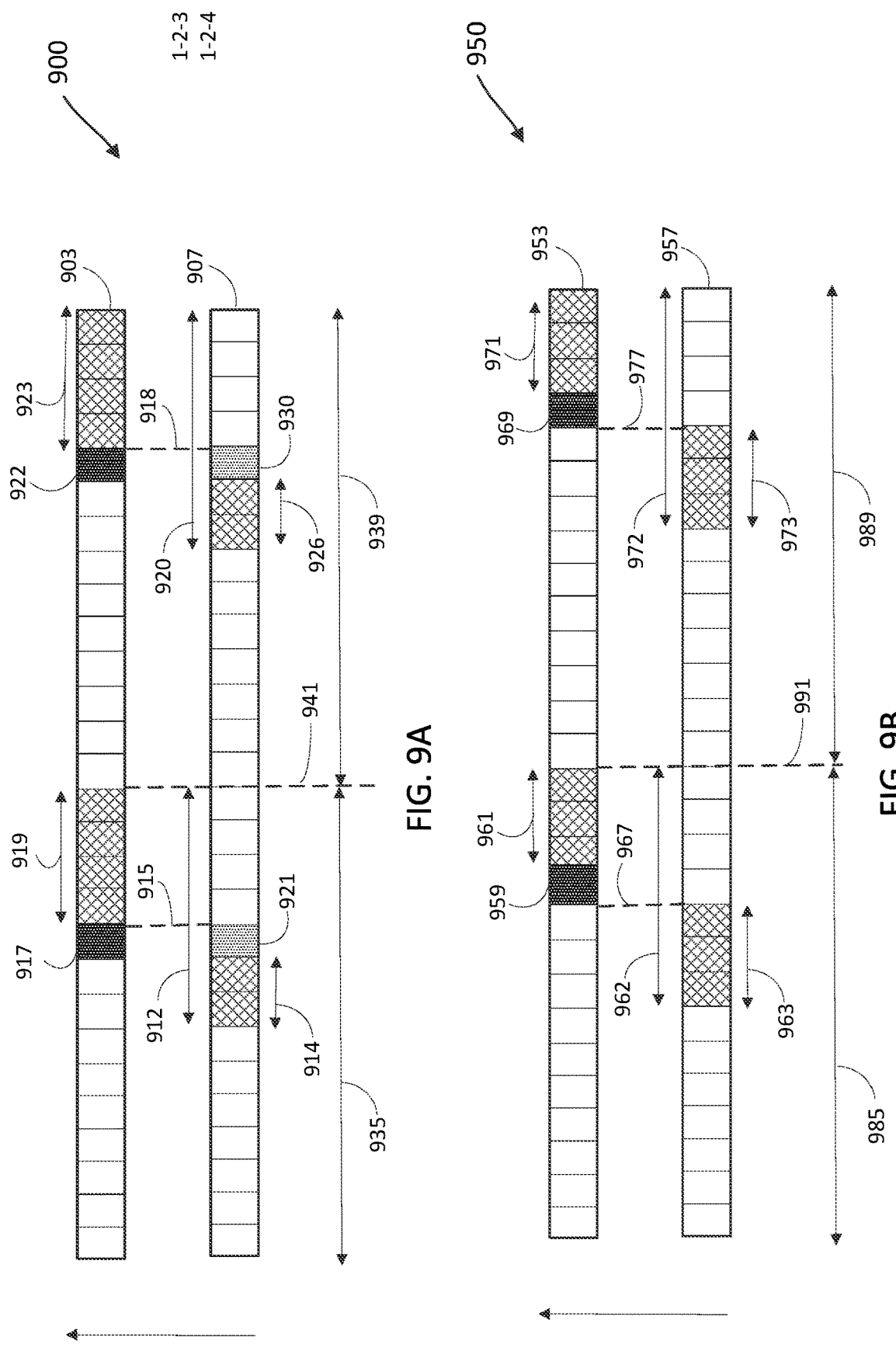
FIG. 9A illustrates an exemplary frequency hopping repetition structure according to aspects of the present disclosure.
FIG. 9B illustrates an exemplary frequency hopping repetition structure according to aspects of the present disclosure.

FIG. 9A illustrates an exemplary frequency hopping repetition structure according to aspects of the present disclosure. In particular, FIG. 9A illustrates aspects of an exemplary time and frequency resource allocation 900 for transmission of PUSCH type A repetitions with intra-slot frequency hopping. FIG. 9A includes frequency bands 903 and 907, and may again represent a variety of frequency band configurations as discussed with respect to other figures. As illustrated, the frequency bands 903 and 907 span two adjacent slots 935 and 939. As shown, there are two PUSCH repetitions in FIG. 9A configured according to PUSCH type A repetitions with intra-slot frequency hopping across unlicensed bands 903 and 907. Accordingly, two PUSCH repetitions are illustrated, repetition 912 in slot 935 and repetition 920 in slot 939. Repetition 912 in slot 935 includes two parts, repetition part 914 on frequency band 907 and repetition part 919 on frequency band 903. The repetition 920 in slot 939 includes two parts again, repetition part 926 on frequency band 907 and repetition part 923 on frequency band 903. This may correspond to a scenario where two repetitions are defined by the BS 400 for a UE 300 to transmit. In other scenarios, more than two repetitions may be defined, but for simplicity of illustration herein just two are shown and discussed.

In the embodiment of FIG. 9A, the first repetition 912 is transmitted starting at the symbol identified in a SLIV from the BS 400, further with the length defined by the SLIV as well. In this intra-slot repetition frequency hopping scenario, the location of the LBT gap 917 may be determined according to an algorithm. For example, X number of symbols may be used as the LBT gap 917. The UE 300 may determine the location of the start and end of the LBT gap 917 for such situations from the S (starting symbol) and L (length) parameters from SLIV. For example, the LBT gap 917 may be determined with starting symbol S, combined with the floor of a length of the repetition (e.g., in number of symbols) divided by two, further taking out the X symbols of the LBT gap 917, with the LBT gap 917's location extending to the value S combined with the length divided by two, less one symbol. This may be represented with the equation $S+\lfloor L/2 \rfloor - X$ (the start location of the LBT gap 917) for the starting location, and $S+\lfloor L/2 \rfloor - 1$ for the end location of the LBT gap 917. This may correspond to a situation where the LBT gap 917 occurs with a time domain resource, namely the last X symbols of the time domain resource allocation/SLIV allocated for the first PUSCH repetition part (here, PUSCH repetition part 914, which occurs before the hopping boundary 915), of the first PUSCH repetition 912. The LBT gap 917 may coincide with the last symbol 921 of the first PUSCH repetition part 914. Further, according to type A repetition with intra-slot frequency hopping, the second PUSCH repetition part (here, PUSCH repetition part 919, which occurs after the hopping boundary 915) begins right after the first repetition part 914 in slot 935 after the LBT gap 917 if the LBT clears in the frequency band 903. Accordingly, the UE 300 transmits the second PUSCH repetition part 919 in the remaining symbols of slot 935 in frequency band 903, with the end location of the LBT gap 917 determined according to the formula noted herein for FIG. 9A.

The second PUSCH repetition 918 is handled in like manner in the subsequent slot 939. That is, the PUSCH repetition 920 starts at the symbol S within the next slot, with the second PUSCH repetition 920 including the first PUSCH repetition part 926 on frequency band 907 and second PUSCH repetition part 923 on the frequency band 903. The LBT gap 922 location (starting and ending locations) is again determined from the same algorithm, and may coincide with the last symbol 930 of the first PUSCH repetition part 926 of the second PUSCH repetition 920. Again, per intra-slot frequency hopping, the second PUSCH repetition part 923 occurring after the hopping boundary 918 begins right after the first repetition part 926 in slot 939 after the LBT gap 922 if the LBT clears in the frequency band 903. Accordingly, the UE 300 transmits the second PUSCH repetition part 923 in the remaining symbols of slot 939 in frequency band 903, with the end location of the LBT gap 922 again determined according to the formula noted herein for FIG. 9A.

FIG. 9B illustrates an exemplary frequency hopping repetition structure according to aspects of the present disclosure. In particular, FIG. 9B illustrates aspects of an exemplary time and frequency resource allocation 950 for transmission of PUSCH type A repetitions with intra-slot frequency hopping. FIG. 9B includes frequency bands 953 and 957, and may again represent a variety of frequency band configurations as discussed with respect to other figures. The frequency bands 953 and 957 may span two adjacent slots 985 and 989. As shown, there are two PUSCH repetitions in FIG. 9B configured according to PUSCH type A repetitions with intra-slot frequency hopping across unlicensed bands 953 and 957. Accordingly, two PUSCH repetitions are illustrated, repetition 962 in slot 985 and repetition 972 in slot 989. Repetition 962 in slot 985 includes two parts, repetition part 963 on frequency band 957 and repetition part 961 on frequency band 953. The repetition 972 in slot 989 includes two parts again, repetition part 973 on frequency band 957 and repetition part 971 on frequency band 953. This may correspond to a scenario where two repetitions are defined by the BS 400 for a UE 300 to transmit. In other scenarios, more than two repetitions may be defined, but for simplicity of illustration herein just two are shown and discussed.

In the embodiment of FIG. 9B, the first repetition 962 is transmitted starting at the symbol identified in a SLIV from the BS 400, further with the length defined by the SLIV as well. In this intra-slot repetition frequency hopping scenario, the location of the LBT gap 959 may be determined according to an algorithm. For example, X number of symbols may be used as the LBT gap 959. The UE 300 may determine the location of the start and end of the LBT gap 959 for such situations from the S (starting symbol) and L (length) parameters from SLIV. For example, the LBT gap 959 may be determined with starting symbol S, combined with the floor of a length of the repetition (e.g., in number of symbols) divided by two, as the start of the LBT gap 959. The LBT gap 959's location may extend to the value S combined with the length divided by two, plus the X number of symbols, less one symbol. This may be represented with the equation $S+\lfloor L/2 \rfloor$ (the start location of the LBT gap 959) for the starting location, and $S+\lfloor L/2 \rfloor + X - 1$ for the end location of the LBT gap 959. This may correspond to a situation where the LBT gap 959 occurs with a time domain resource, namely the first X symbols of the time domain resource allocation/SLIV allocated for the second PUSCH repetition part (here, PUSCH repetition part 961, which occurs after the hopping boundary 967), of the first PUSCH repetition 962. Further, according to type A repetition with intra-slot frequency hopping, the second PUSCH repetition part (here, PUSCH repetition part 961, which occurs after the hopping boundary 967) begins after the first repetition part 963 and LBT gap 959 in slot 985, if the LBT clears in the frequency band 953. Accordingly, the UE 300 transmits the second PUSCH repetition part 961 in the remaining symbols of slot 985 in frequency band 953, with the end location of the LBT gap 959 determined according to the formula noted herein for FIG. 9B.

The second PUSCH repetition 972 is handled in like manner in the subsequent slot 989. That is, the PUSCH repetition 972 starts at the symbol S within the next slot, with the second PUSCH repetition 972 including the first PUSCH repetition part 973 on frequency band 957 and second PUSCH repetition part 971 on the frequency band 953. The LBT gap 969 location (starting and ending locations) is again determined from the same algorithm, and may coincide with the first symbol of the second PUSCH repetition part 971 of the second PUSCH repetition 972. Again, per intra-slot frequency hopping, the second PUSCH repetition part 971 occurring after the hopping boundary 977 begins after the first repetition part 973 and LBT gap 969 in slot 989, if the LBT clears in the frequency band 953. Accordingly, the UE 300 transmits the second PUSCH repetition part 971 in the remaining symbols of slot 989 in frequency band 953, with the end location of the LBT gap 969 again determined according to the formula noted herein for FIG. 9B.

Figures 10A, 10B:
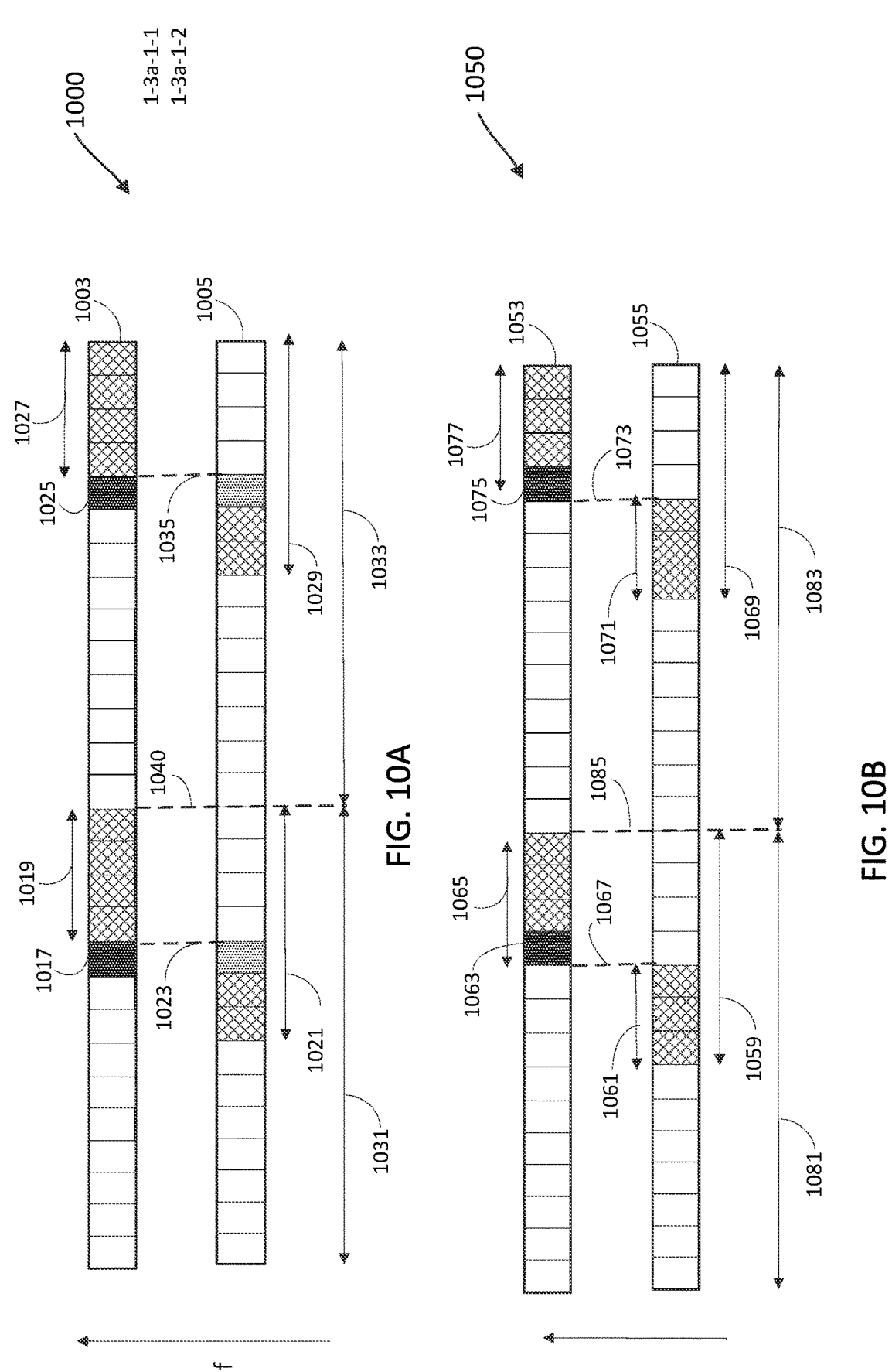
FIG. 10A illustrates an exemplary frequency hopping repetition structure according to aspects of the present disclosure.
FIG. 10B illustrates an exemplary frequency hopping repetition structure according to aspects of the present disclosure.

FIG. 10A illustrates an exemplary frequency hopping repetition structure according to aspects of the present disclosure. In particular, FIG. 10A illustrates aspects of an exemplary time and frequency resource allocation 1000 for transmission of PUSCH type A repetitions with intra-slot frequency hopping. FIG. 10A includes frequency bands 1003 and 1005, which may again represent a variety of frequency band configurations as discussed with respect to other figures. The frequency bands 1003 and 1007 span two adjacent slots 1031 and 1033. As shown, there are two PUSCH repetitions in FIG. 10A configured according to PUSCH type A repetitions with intra-slot frequency hopping across unlicensed bands 1003 and 1005. Accordingly, two PUSCH repetitions are illustrated, repetition 1021 in slot 1031 and repetition 1029 in slot 1033. Repetition 1021 in slot 985 includes two parts, repetition part 963 on frequency band 957 and repetition part 961 on frequency band 953. The repetition 972 in slot 989 includes two parts again, repetition part 973 on frequency band 957 and repetition part 971 on frequency band 953. This may correspond to a scenario where two repetitions are defined by the BS 400 for a UE 300 to transmit. In other scenarios, more than two repetitions may be defined, but for simplicity of illustration herein just two are shown and discussed.

In the embodiment of FIG. 10A, the first repetition 1021 is transmitted starting at the symbol identified in a SLIV from the BS 400, further with the length defined by the SLIV as well. In this intra-slot repetition frequency hopping scenario, the location of the LBT gap 1017 may be determined according to an algorithm. For example, the embodiment of FIG. 10A may use an existing formula used in the 3GPP specification to determine the number of symbols of each hop, and from that determine the location of the LBT gap 1017 relative to the symbols of each hop (e.g., parts 1020 and 1019) in the first PUSCH repetition 1021. The UE 300 may determine the location of the start and end of the LBT gap 1017 for such situations from the S (starting symbol) from SLIV. The LBT gap 1017 may be determined with starting symbol S, in combination length of the overall PUSCH repetition 1021 divided by two. This may be represented with the equation for example, $$\lfloor N_{symb}^{PUSCH,S}/2 \rfloor,$$

where $$N_{symb}^{PUSCH,S}$$

is the length of the PUSCH transmission in OFDM symbols in a slot (both hops together). With this, the UE 300 determines the number of symbols for the first hop, i.e., the first repetition part 1020. The UE 300 introduces the LBT gap 1017 at the end of the first repetition part 1020, which may correspond to a situation where the LBT gap 1017 occurs with a time domain resource, namely the last X symbols of the time domain resource allocation/SLIV allocated for the first PUSCH repetition part (here, PUSCH repetition part 1020, which occurs before the hopping boundary 1023), of the first PUSCH repetition 1021. Further, according to type A repetition with intra-slot frequency hopping, the second PUSCH repetition part (here, PUSCH repetition part 1019, which occurs after the hopping boundary 1023) begins right after the first repetition part 1020 in slot 1031 after the LBT gap 1017 if the LBT clears in the frequency band 1003. The duration of the second repetition part 1019 on frequency band 1003 may be determined by $$N_{symb}^{PUSCH,S} - \lfloor N_{symb}^{PUSCH,S}/2 \rfloor,$$

reaching the slot boundary 1040.

The second PUSCH repetition 1029 is handled in like manner in the subsequent slot 1033. That is, the PUSCH repetition 1029 starts at the symbol S within the next slot, with the second PUSCH repetition 1029 including the first PUSCH repetition part 1028 on frequency band 1005 and second PUSCH repetition part 1027 on the frequency band 1003. The LBT gap 1025 location (starting and ending locations) is again determined by first looking at the number of symbols for each hop of the second PUSCH repetition 1029, determined from the same algorithm discussed above with respect to the first repetition in the prior slot. The LBT gap 1025 may coincide with the last symbol of the first PUSCH repetition part 1028 of the second PUSCH repetition 1029. Again, per intra-slot frequency hopping, the second PUSCH repetition part 1027 occurring after the hopping boundary 1035 begins right after the first repetition part 1028 in slot 1033 after the LBT gap 1025 if the LBT clears in the frequency band 1003. Accordingly, the UE 300 transmits the second PUSCH repetition part 1027 in the remaining symbols of slot 1033 in frequency band 1003, with the duration of the second part 1027 again determined by the algorithm as was used for the second part 1019 of the first repetition 1021.

FIG. 10B illustrates an exemplary frequency hopping repetition structure according to aspects of the present disclosure. In particular, FIG. 10B illustrates aspects of an exemplary time and frequency resource allocation 1050 for transmission of PUSCH type A repetitions with intra-slot frequency hopping. FIG. 10B includes frequency bands 1053 and 1055, and may again represent a variety of frequency band configurations as discussed with respect to other figures. The frequency bands 1053 and 1055 may span two adjacent slots 1081 and 1083. As shown, there are two PUSCH repetitions in FIG. 10B configured according to PUSCH type A repetitions with intra-slot frequency hopping across unlicensed bands 1053 and 1055. Accordingly, two PUSCH repetitions are illustrated, repetition 1059 in slot 1081 and repetition 1069 in slot 1083. Repetition 1059 in slot 1081 includes two parts, repetition part 1061 on frequency band 1055 and repetition part 1065 on frequency band 1053. The repetition 1069 in slot 1083 includes two parts again, repetition part 1071 on frequency band 1055 and repetition part 1077 on frequency band 1053. This may correspond to a scenario where two repetitions are defined by the BS 400 for a UE 300 to transmit. In other scenarios, more than two repetitions may be defined, but for simplicity of illustration herein just two are shown and discussed.

In the embodiment of FIG. 10B, the first repetition 1059 is transmitted starting at the symbol identified in a SLIV from the BS 400, further with the length defined by the SLIV as well. In this intra-slot repetition frequency hopping scenario, the location of the LBT gap 1063 may be determined according to an algorithm. For example, the embodiment of FIG. 10B may use an existing formula used in the 3GPP specification to determine the number of symbols of each hop, as was done with respect to FIG. 10A, and from that determine the location of the LBT gap 1063 relative to the symbols of each hop (e.g., parts 1061 and 1065) in the first PUSCH repetition 1059. The algorithmic approach is similar to FIG. 10A, except that instead of introducing the LBT gap 1063 at the end of the first repetition part 1061, the UE 300 may introduce the LBT gap 1063 at the first X symbols of the second PUSCH repetition part (here, PUSCH repetition part 1065, which occurs after the hopping boundary 1067), of the first PUSCH repetition 1059. Further, according to type A repetition with intra-slot frequency hopping, the second PUSCH repetition part (here, PUSCH repetition part 1065, which occurs after the hopping boundary 1067) begins after the first repetition part 1061 and LBT gap 1063 in slot 1081, if the LBT clears in the frequency band 1053. Accordingly, the UE 300 transmits the second PUSCH repetition part 1065 for the duration of symbols determined according to the same algorithm of FIG. 10A for the second repetition part (here, 1065), reaching the slot boundary 1085.

The second PUSCH repetition 1069 is handled in like manner in the subsequent slot 1083. That is, the PUSCH repetition 1069 starts at the symbol S within the next slot, with the second PUSCH repetition 1069 including the first PUSCH repetition part 1071 on frequency band 1055 and second PUSCH repetition part 1077 on the frequency band 1053. The LBT gap 1075 location is again determined by first looking at the number of symbols for each hop of the second PUSCH repetition 1069, determined from the same algorithm discussed above with respect to the first repetition in the prior slot (e.g., as introduced with respect to FIG. 10A). The LBT gap 1075 may be the first X symbols of the second PUSCH repetition part (here, PUSCH repetition part 1077, which occurs after the hopping boundary 1073), of the second PUSCH repetition 1069. Again, per intra-slot frequency hopping, the second PUSCH repetition part 1077 occurring after the hopping boundary 1073 begins after the first repetition part 1071 in slot 1083 after the LBT gap 1075 if the LBT clears in the frequency band 1053. Accordingly, the UE 300 transmits the second PUSCH repetition part 1077 for the duration of symbols determined according to the same algorithm of FIG. 10A for the second repetition part (here, 1077).

Figure 11:
FIG. 11 illustrates an exemplary frequency hopping repetition structure according to aspects of the present disclosure.
Figure 11:
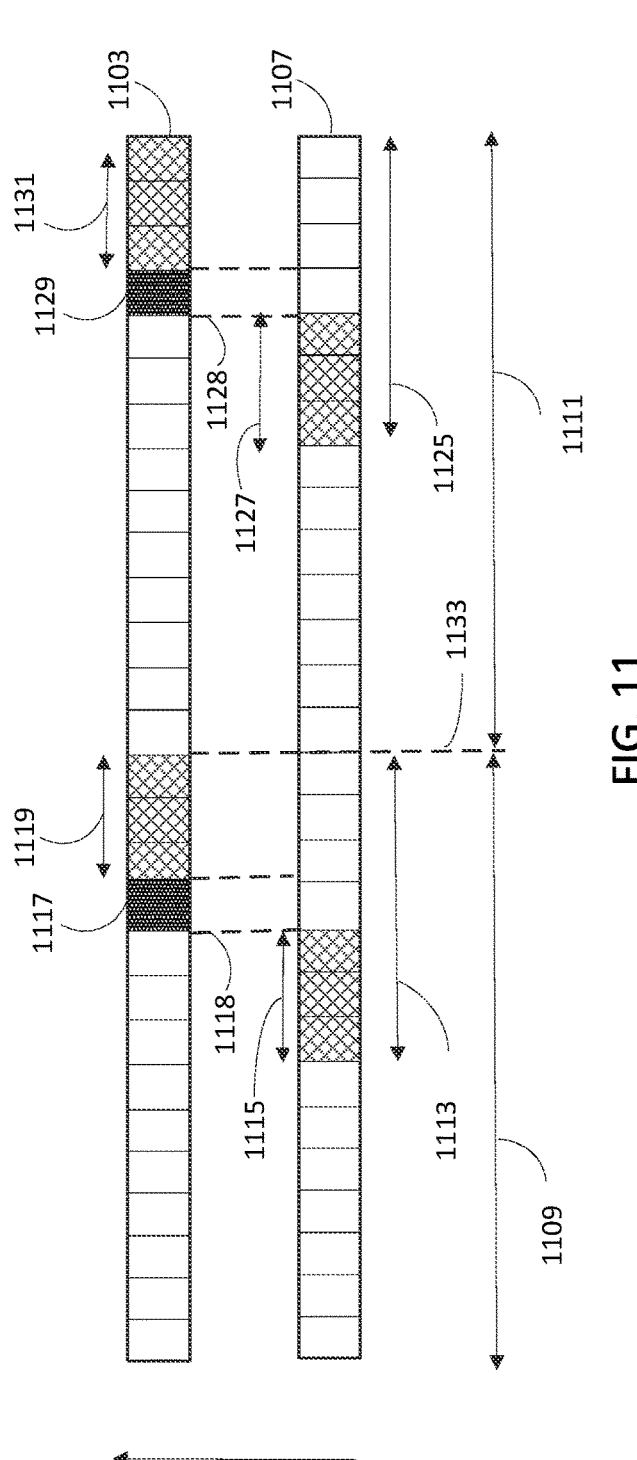

FIG. 11 illustrates an exemplary frequency hopping repetition structure according to aspects of the present disclosure. In particular, FIG. 11 illustrates aspects of an exemplary time and frequency resource allocation 1100 for transmission of PUSCH type A repetitions with intra-slot frequency hopping. FIG. 11 includes frequency bands 1103 and 1107, and may again represent a variety of frequency band configurations as discussed with respect to other figures. The frequency bands 1103 and 1107 span two adjacent slots 1109 and 1111. Again, while two repetitions are illustrated, one overall in each slot, there may be further repetitions in further slots (focusing here just on two slots for discussion). Thus, hopping may be across unlicensed bands 1103 and 1107. Two PUSCH repetitions 1113 and 1125 are illustrated, one in each slot. The PUSCH repetition 1113 includes two parts, repetition part 1115 on frequency band 1107 and repetition part 1119 on frequency band 1103. The PUSCH repetition 1125 in slot 1111 includes two parts, repetition part 1127 on frequency band 1107 and repetition part 1131 on frequency band 1103.

The UE 300 may use an existing formula to determine the number of symbols for each hop (that is, for each repetition part of repetition 1113) after first removing the X symbols used for the LBT gap 1117. To do this, the UE 300 may take a floor value of the total length of the repetition 1113 (excluding the X symbols) divided by two to arrive at the location of the start of the LBT gap 1117. This may be represented as $$\lfloor N_{symb}^{PUSCH,S} - X/2 \rfloor$$

to determine the number of symbols of the first repetition part 1115, where $$N_{symb}^{PUSCH,S}$$

is the length of the PUSCH transmission in OFDM symbols in a slot (both repetition parts together). The location of the end of the LBT gap 1117 may be determined by taking away from the X symbols the floor value of the total length of the repetition (excluding the X symbols), divided by two. This may be represented as $$X - \lfloor N_{symb}^{PUSCH,S} - X/2 \rfloor.$$

Thus, the LBT gap 1117 may occur after the hopping boundary 1118, but in between first repetition part 1115 and second repetition part 1119.

Further, according to type A repetition with intra-slot frequency hopping, the second PUSCH repetition part (here, PUSCH repetition part 1119, which occurs after the hopping boundary 1118) begins after the first repetition part 1115 and LBT gap 1118 in slot 1109, if the LBT clears in the frequency band 1103. Accordingly, the UE 300 transmits the second PUSCH repetition part 1119 on frequency band 1103, reaching the slot boundary 1133. This approach may be beneficial because it may have no impact on PUSCH DMRS, since PUSCH DMRS in some examples is determined based on the PUSCH length of each hop (e.g., PUSCH repetition part).

The location of LBT gap 1129 in the second slot 1111 may be determined in like manner with respect to second repetition 1125, and constituent repetition parts 1127 and 1131. The number of symbols for the LBT gap 1129 may be removed before determining the length of the first repetition part 1127 and second repetition part 1131. Similarly, transmission of the second repetition part 1131 will occur if LBT clears from the LBT gap 1129 on frequency band 1103.

Figures 12A, 12B:
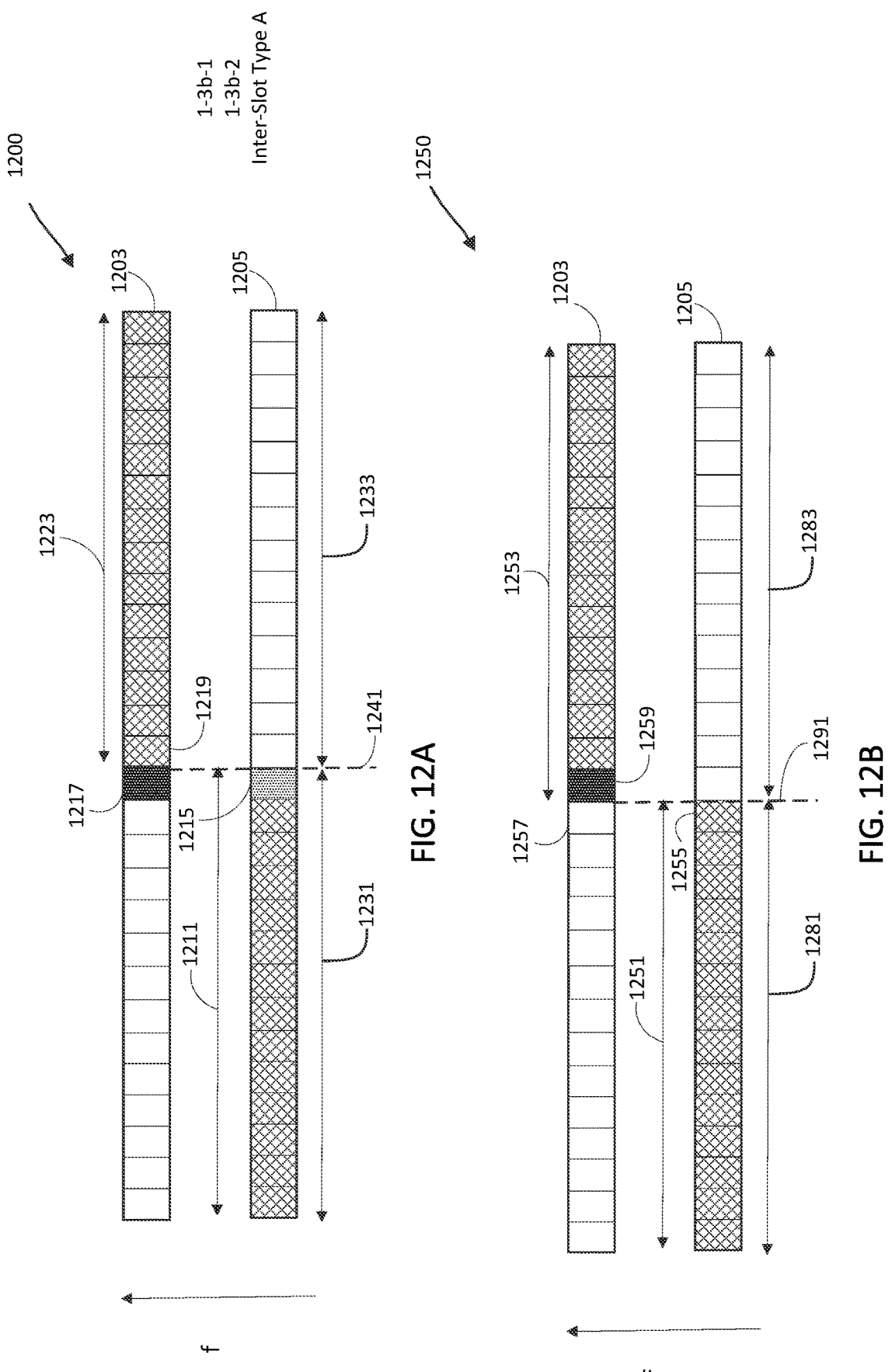
FIG. 12A illustrates an exemplary frequency hopping repetition structure according to aspects of the present disclosure.
FIG. 12B illustrates an exemplary frequency hopping repetition structure according to aspects of the present disclosure.

Turning now to FIG. 12A, illustrated is an exemplary hopping repetition structure according to aspects of the present disclosure. In particular, FIG. 12A illustrates aspects of an exemplary time and frequency resource allocation 1200 for transmission of PUSCH type repetitions. For example, the time and frequency resource allocation 1200 may apply to type A repetitions with inter-slot frequency hopping. In this example, frequency bands 1203 and 1205 are illustrated. These frequency bands span two adjacent slots 1231 and 1233. There are two PUSCH repetitions 1211 and 1223 illustrated. The UE 300 may transmit the PUSCH repetition 1211 on frequency subband 1205, and perform LBT during gap 1217.

The UE 300 may determine the location of the LBT gap 1217 based on the hopping boundary 1219 (which may correspond to the slot boundary between slots 1231 and 1233). Thus, after identifying the hopping boundary 1219 the UE 300 may introduce the LBT gap 1217 as the last symbol at the end of the first PUSCH repetition 1211 in the slot 1231. This may correspond to the last symbol 1215 of the first PUSCH repetition 1211. In some examples, the number of symbols used for the LBT gap 1217 may be one symbol where the SCS is 15 kHz or 30 kHz, and two symbols where the SCS is 60 kHz (as just some examples). If the LBT clears for frequency band 1203 from gap 1217, then the UE 300 transmits the PUSCH repetition 1223 on the frequency band 1203 in the next slot 1233.

FIG. 12B illustrates aspects of an exemplary time and frequency resource allocation 1250 for transmission of PUSCH repetition type A with inter-slot frequency hopping. A difference between FIGS. 12A and 12B is that instead of locating the LBT gap of FIG. 12B before the hopping boundary 1291 (at the end of the previous repetition), in FIG. 12B the LBT gap 1257 is placed after the hopping boundary 1291. Thus, the first repetition 1251 is transmitted on frequency band 1205 in slot 1281, the UE 300 hops to the frequency band 1203, performs LBT at the LBT gap 1259, and if the LBT passes the UE 300 transmits the second repetition 1253 on the frequency band 1203 in slot 1283. Similar LBT gap symbol lengths may apply related to the SCS size, as discussed with respect to FIG. 12A above.

Figures 13A, 13B:
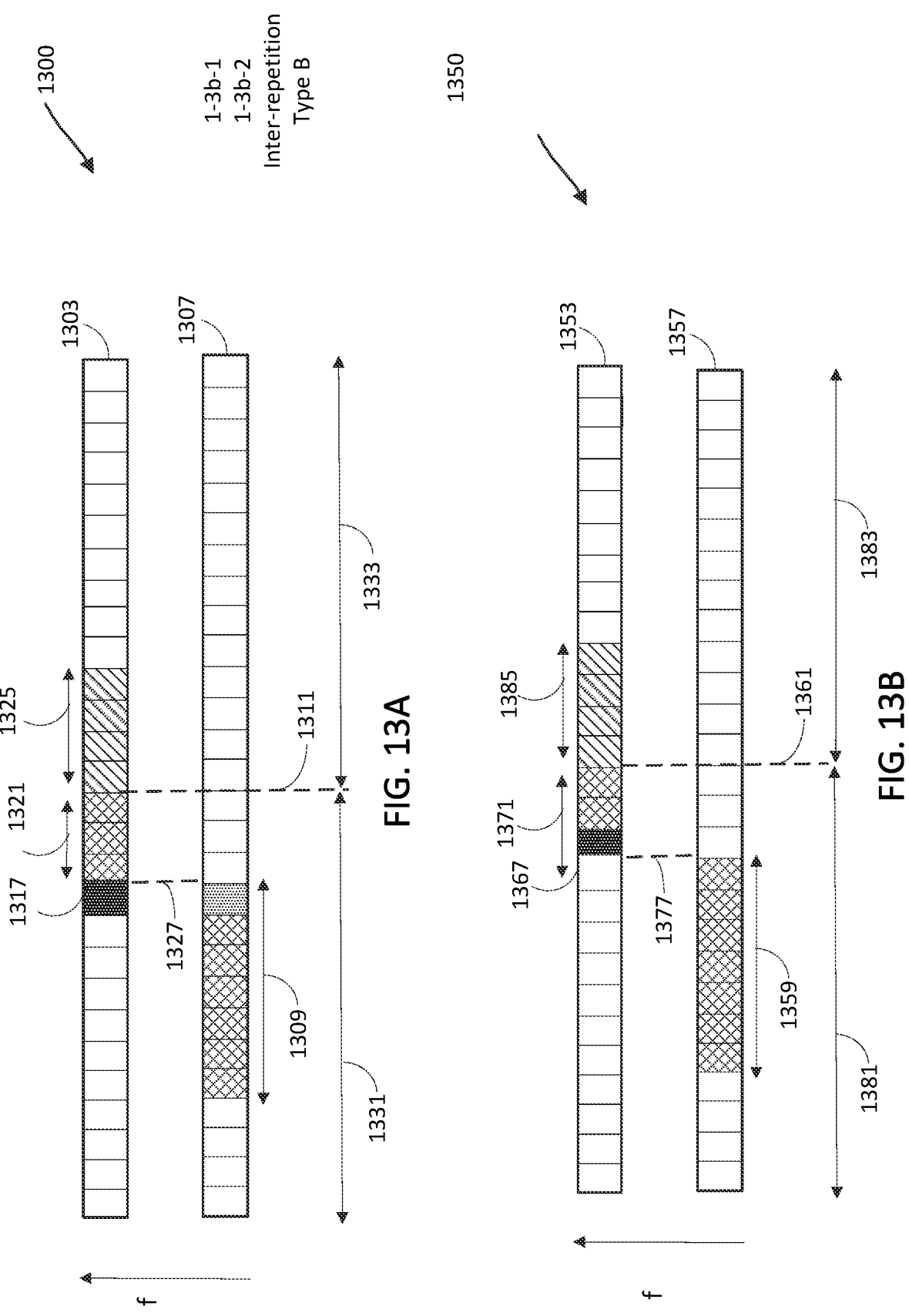
FIG. 13A illustrates an exemplary frequency hopping repetition structure according to aspects of the present disclosure.
FIG. 13B illustrates an exemplary frequency hopping repetition structure according to aspects of the present disclosure.

FIG. 13A illustrates aspects of an exemplary time and frequency resource allocation 1300 for transmission of PUSCH repetitions type B with inter-repetition frequency hopping. A difference between FIGS. 13A and 12A is that FIG. 13A relates to type B inter-repetition while FIG. 12A relates to type A inter-slot repetition. The frequency bands 1303 and 1307 span two adjacent slots 1331 and 1333. As shown, there are two PUSCH repetitions configured according to PUSCH type B repetitions with inter-repetition frequency hopping across unlicensed bands 1303 and/or 1307. Accordingly, two PUSCH repetitions are illustrated, actual PUSCH repetition 1309 and nominal PUSCH repetition 1321-1325. In particular, the nominal PUSCH repetition is constituted of actual PUSCH repetition 1321 and actual PUSCH repetition 1325. This may correspond to a scenario where two repetitions are defined, and one of the repetitions spans slot boundary 1311.

In the embodiment of FIG. 13A, the first repetition 1309 is transmitted in the frequency band 1307 in slot 1331. The UE 300 may perform LBT during gap 1317 by using the last X symbols for the first repetition (here, PUSCH repetition 1309), which occurs before the hopping boundary 1327. Further, according to type B repetition, the second nominal repetition begins right after the first repetition (i.e., still in the first slot 1331) after the LBT gap 1317. Accordingly, the UE 300 transmits the actual PUSCH repetition 1321 in the remaining symbols of slot 1331 (reaching the slot boundary 1311) if the LBT clears from the gap 1317 in frequency band 1303. The UE 300 continues transmitting the actual PUSCH repetition 1325 on frequency band 1303 at the start of the new slot 1333. Similar LBT gap symbol lengths may apply related to the SCS size, as discussed with respect to FIG. 12A above.

FIG. 13B illustrates aspects of an exemplary time and frequency resource allocation 1350 for transmission of PUSCH repetitions type B with inter-repetition frequency hopping. A difference between FIGS. 13A and 13B is that instead of locating the LBT gap of FIG. 13B before the hopping boundary 1377, the LBT gap 1367 at the start of the new repetition after the hopping boundary 1377. Thus, the first repetition 1359 is transmitted on frequency band 1357 in slot 1381, the UE 300 hops to the frequency band 1353, performs LBT at the LBT gap 1367, and if the LBT passes the UE 300 transmits the nominal repetition 1371-1385 on the frequency band 1353 starting in slot 1381 (with actual repetition 1371) and concluding in slot 1383 (with actual repetition 1385). Similar LBT gap symbol lengths may apply related to the SCS size, as discussed with respect to FIG. 12A above.

Figures 14A, 14B:
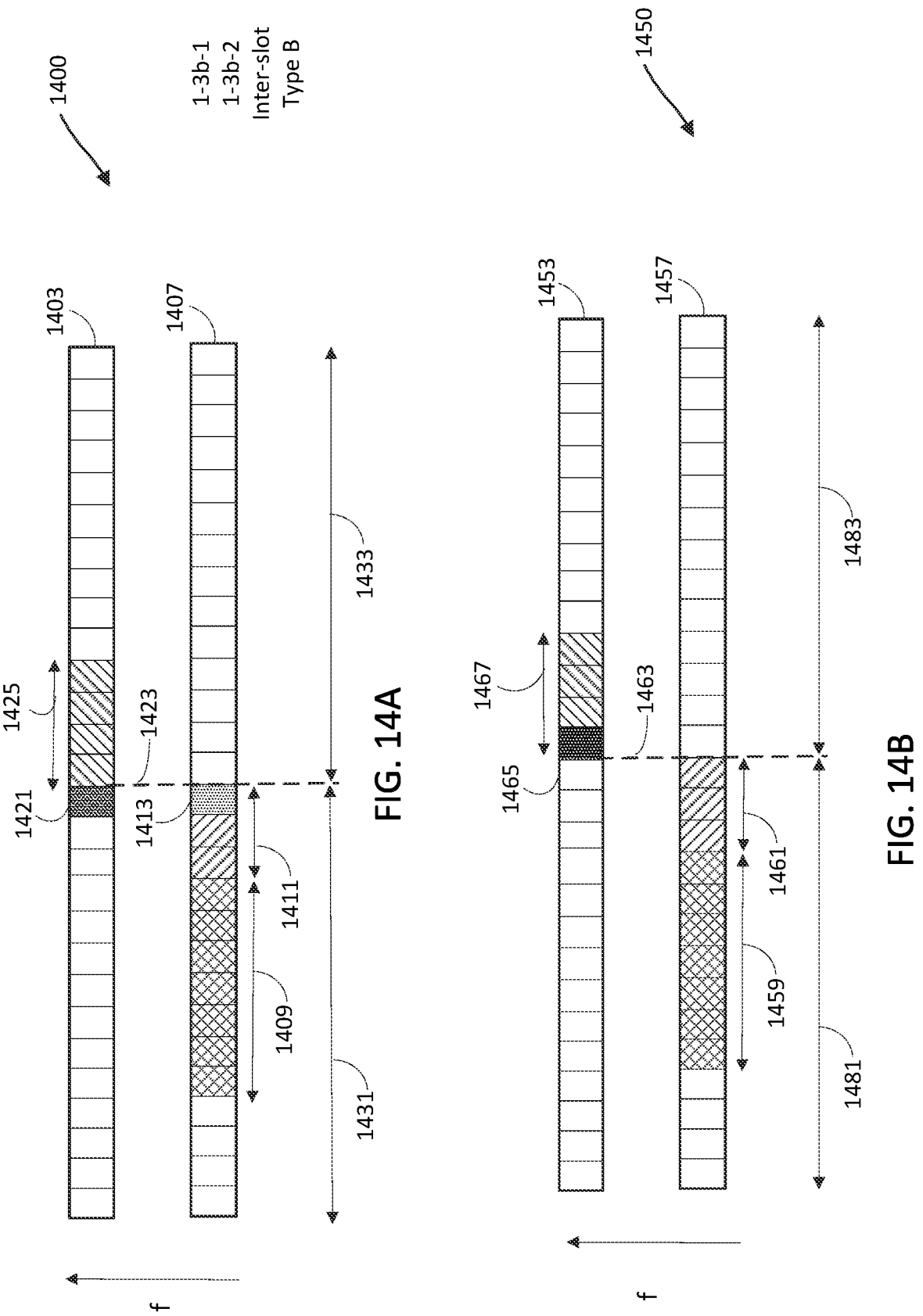
FIG. 14A illustrates an exemplary frequency hopping repetition structure according to aspects of the present disclosure.
FIG. 14B illustrates an exemplary frequency hopping repetition structure according to aspects of the present disclosure.

FIG. 14A illustrates aspects of an exemplary time and frequency resource allocation 1400 for transmission of PUSCH repetitions type B with inter-slot frequency hopping. The configurations 1400 includes frequency bands 1403 and 1407 that span two adjacent slots 1431 and 1433. As shown, there are two PUSCH repetitions configured according to PUSCH type B repetitions with inter-slot frequency hopping across unlicensed bands 1403 and/or 1407. Accordingly, two PUSCH repetitions are illustrated, actual PUSCH repetition 1409 and nominal PUSCH repetition 1411-1425. In particular, the nominal PUSCH repetition is constituted of actual PUSCH repetition 1411 and actual PUSCH repetition 1425. This may correspond to a scenario where two repetitions are defined, and one of the repetitions spans slot boundary 1423.

In the embodiment of FIG. 14A, the first repetition 1409 is transmitted in the frequency band 1407 in slot 1431. The UE 300 may perform LBT during gap 1421 by using the last X symbols for the first repetition (here, PUSCH repetition 1409), which occurs before the hopping boundary 1423 (which in type B inter-slot repetitions coincides with the slot boundary). Further, according to type B repetition, the second nominal repetition begins right after the first repetition (i.e., still in the first slot 1431). However, the LBT gap 1421 does not occur until the frequency hop, which occurs at the slot boundary, not the start of the second nominal repetition. Accordingly, the UE 300 transmits the actual PUSCH repetition 1411 in the remaining symbols of slot 1431 (reaching the slot boundary 1423), while still on frequency band 1407.

At the slot boundary, the UE 300 hops to the frequency band 1304. According to the embodiment of FIG. 14A, the LBT is performed before the slot boundary/hopping boundary 1423 using the last X symbols of the at the end of the slot (in a middle portion of the second nominal repetition). If the LBT clears from the gap 1421 in frequency band 1403, then the UE 300 continues transmits the actual PUSCH repetition 1425 on frequency band 1403 at the start of the new slot 1433. Similar LBT gap symbol lengths may apply related to the SCS size, as discussed with respect to FIG. 12A above.

FIG. 14B illustrates aspects of an exemplary time and frequency resource allocation 1450 for transmission of PUSCH repetitions type B with inter-slot frequency hopping. A difference between FIGS. 14A and 14B is that instead of locating the LBT gap 1465 of 14B before the slot/hopping boundary 1463, the UE 300 places the LBT gap 1465 at the start of the new slot. Thus, the first repetition 1459 is transmitted on frequency band 1457 in slot 1481, the actual repetition 1461 of nominal repetition 1461-1467 is transmitted on frequency band 1457 still in slot 1481, and the UE 300 hops to the frequency band 1453. The UE 300 performs LBT at the LBT gap 1465, and if the LBT passes the UE 300 transmits the actual repetition 1467 starting in slot 1483. The configurations 1450 includes two adjacent slots 1481 and 1483. Similar LBT gap symbol lengths may apply related to the SCS size, as discussed with respect to FIG. 12A above.

Situations may arise where the hopping boundary may be close enough to an end of a slot that with the introduction of the LBT gap (such as in PUSCH repetition type B with inter-repetition frequency hopping) there might be a small number of symbols remaining between the LBT gap and the end of the slot. For example, only one symbol may remain after the LBT gap before the end of the slot (e.g., with a one symbol LBT gap when using 15 kHz or 30 kHz subcarrier spacing, or two symbol LBT gap when using 60 kHz subcarrier spacing). The situation may be treated as an error condition between the UE 300 and the BS 400, which in some examples may include transmitting an error message to the BS 400. In other examples, no response/error message might be sent, and the BS 400 may interpret the lack of message to itself be an error indication. Alternatively or additionally, the error procedure may include a retransmission at a subsequent time.

Figures 15A, 15B:
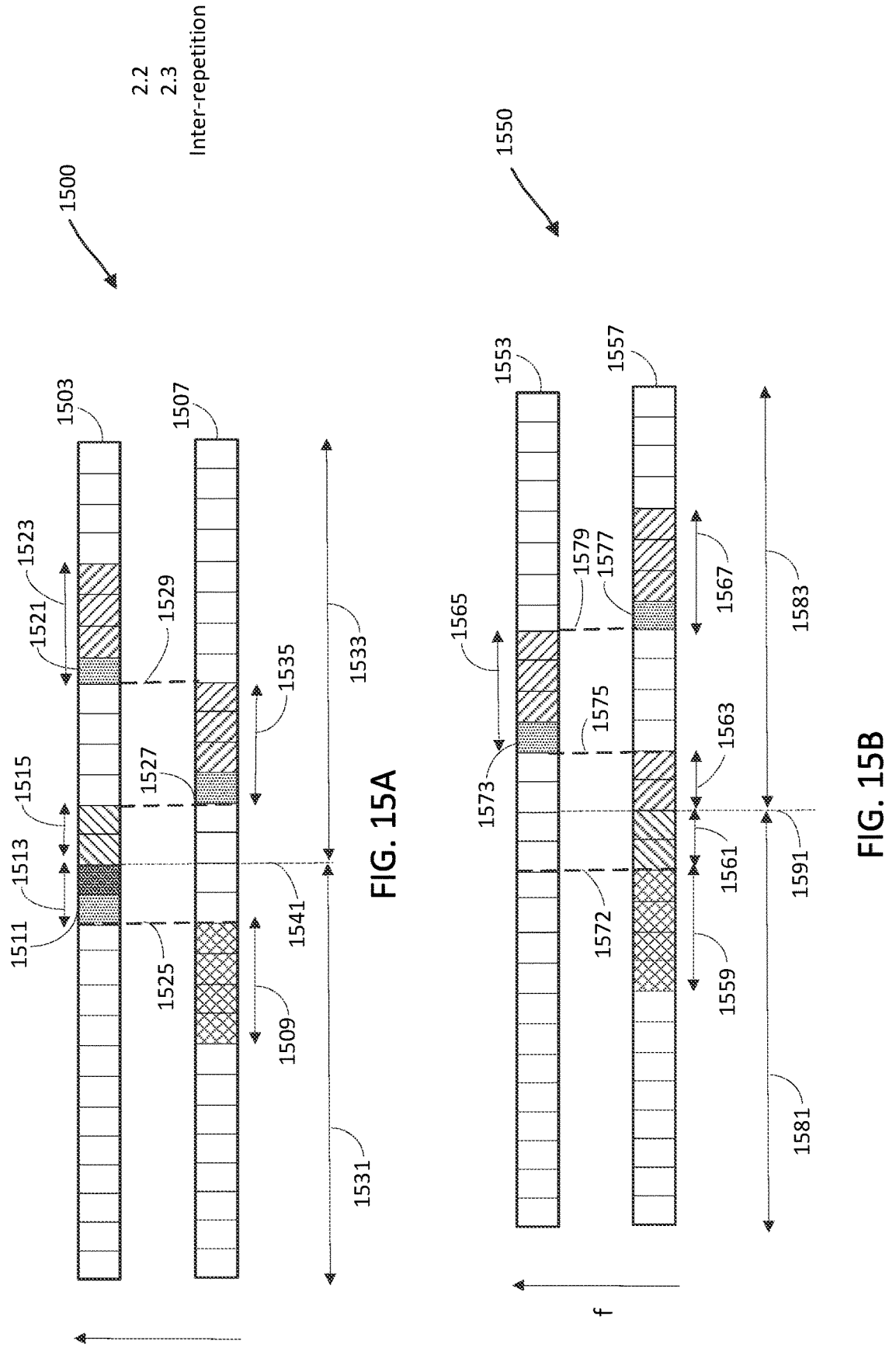
FIG. 15A illustrates an exemplary frequency hopping repetition structure according to aspects of the present disclosure.
FIG. 15B illustrates an exemplary frequency hopping repetition structure according to aspects of the present disclosure.

In other embodiments, devices may be configured to allow such situations as where the hopping boundary is close to an end of a slot. For example, FIG. 15A illustrates aspects of an exemplary time and frequency resource allocation 1500 for transmission of PUSCH repetitions type B with inter-repetition frequency hopping with hopping boundary close to a slot boundary. The configuration 1500 includes frequency bands 1503 and 1507, spanning two adjacent slots 1531 and 1533. As shown, there are four PUSCH repetitions configured according to PUSCH type B repetitions with inter-repetition frequency hopping across frequency bands 1507 and 1503. In this example, four PUSCH repetitions are illustrated—actual repetition 1509, nominal repetition 1513-1515, actual repetition 1535, and actual repetition 1523. The nominal repetition 1513-1515 spans slot boundary 1541.

In the configuration 1500, where there is a single symbol between an LBT gap and a slot boundary, the UE 300 may be configured to introduce a cyclic prefix (CP) to fill the single-symbol gap before the slot boundary. For example, in FIG. 15A the first actual repetition 1509 is all within the slot 1531, so the UE 300 transmits the repetition 1509 on the frequency band 1507. Normally, the next repetition would start right after the end of the previous repetition. But here, introduction of the LBT gap 1511 after the hopping boundary 1525 leaves only the one symbol 1526 before the slot boundary 1541. Therefore, the repetition 1515 is not started yet but instead the symbol 1526 is filled with a CP extension, which may be derived or otherwise determined from the first symbol of the next actual repetition. In this example, that is repetition 1515 that starts at the new slot 1533 if the LBT clears on frequency band 1503 in the LBT gap 1511.

Another hopping boundary 1509 arises at the end of the repetition 1515. The UE 300 hops to frequency band 1507 again, performs LBT at the LBT gap 1527 on frequency band 1507 before starting the next repetition 1535, and transmits the repetition 1535 if the LBT passes. As illustrated, this repetition 1535 is not at the end of slot 1533 with just one symbol between the LBT gap 1527 and a slot boundary, and therefore no CP extension is needed. The UE 300 then hops to frequency band 1503 again at hopping boundary 1529, performs LBT at the LBT gap 1521 on frequency band 1503 before starting the next repetition 1523, and transmits the repetition 1523 if the LBT passes. Again, this is not against a slot boundary so the CP extension is not needed still.

FIG. 15B illustrates aspects of an exemplary time and frequency resource allocation 1550 for transmission of PUSCH repetitions type B with inter-repetition frequency hopping. While FIG. 15B again illustrates a situation with respect to inter-repetition frequency hopping, a new frequency hopping rule may be applied. The frequency hopping rule may allow frequency hopping in situations where the number of symbols after the hop and before the slot boundary is larger than Y number of symbols (e.g., Y equaling two symbols for 15 kHz and 30 kHz subcarrier spacing, or equaling three symbols for 60 kHz subcarrier spacing as just some examples). According to such exemplary rule, where the condition isn't met (e.g., the number of symbols after the hop and before the slot boundary would be equal to or less than Y) the UE 300 may determine to transmit the repetition on the same frequency band without hopping. The UE 300 may determine to hop again at the next repetition (depending on the total number of repetitions specified), which may include another comparison to the number of symbols remaining and the slot boundary and resulting determination.

The configurations 1550 includes frequency bands 1553 and 1557 that span two adjacent slots 1581 and 1583 to illustrate this example. Like the example in FIG. 15A, FIG. 15B again illustrates four repetitions configured according to the repetition and hopping type. The four repetitions include actual repetition 1559, nominal repetition 1561-1563, actual repetition 1565, and actual repetition 1567.

In this configuration, the UE 300 transmits the first repetition 1559 in slot 1581 because it does not reach a slot boundary. However, at hopping boundary 1572 (i.e., the end of the previous repetition), the UE 300 determines whether a next repetition spans a slot boundary 1591 and, if so, whether the number of symbols after the hopping boundary 1572 is larger than Y number of symbols (e.g., Y equaling two symbols for 15 kHz and 30 kHz SCS, or equaling three symbols for 60 kHz SCS). In the example in FIG. 15B, the nominal repetition 1561-1563 includes the actual repetition 1561 before the slot boundary 1591. As there are just the two symbols as part of actual repetition 1561, which is less than 2 symbols (for 15 kHz/30 kHz SCS) as well as 3 symbols (for 60 kHz SCS), the rule is not met. Accordingly, the UE 300 determines at the hopping boundary 1572 not to hop to the frequency band 1553. Thus, no LBT gap is introduced at hoping boundary 1572. Instead, the nominal repetition 1561-1563 remains on the frequency band 1557 for the duration of its transmission.

After finishing the actual repetition 1563 transmission in slot 1583, the UE 300 then hops to frequency band 1553 at hopping boundary 1575. This is done because the entirety of the repetition 1565 does not reach a slot boundary. Thus, the UE 300 performs an LBT at LBT gap 1573 on frequency band 1553, and if the LBT passes the UE 300 transmits the repetition 1565 on the frequency band 1553. At hopping boundary 1579, at the end of the repetition 1565 transmission, the UE 300 hops back to frequency band 1557. Again, the repetition 1567 does not reach a slot boundary, so the UE 300 does not check against the rule. Instead, the UE 300 performs an LBT at LBT gap 1577 on frequency band 1557, and if the LBT passes the UE 300 transmits the repetition 1567 on the frequency band 1557. In some examples, the candidate hopping boundary at each hop may be determined based on an existing frequency hopping rule.

In some examples, a UE 300 may be a load-based equipment (LBE) that uses a tight gap generated for certain LBT types. In such situations, a CP extension may be used to maintain the gap (e.g., for portions of a given symbol where the tight LBT is used that does not fill the full symbol). This may apply in dynamic grant (DG) situations, and/or in configured grant (CG) situations.

Figures 16A, 16B:
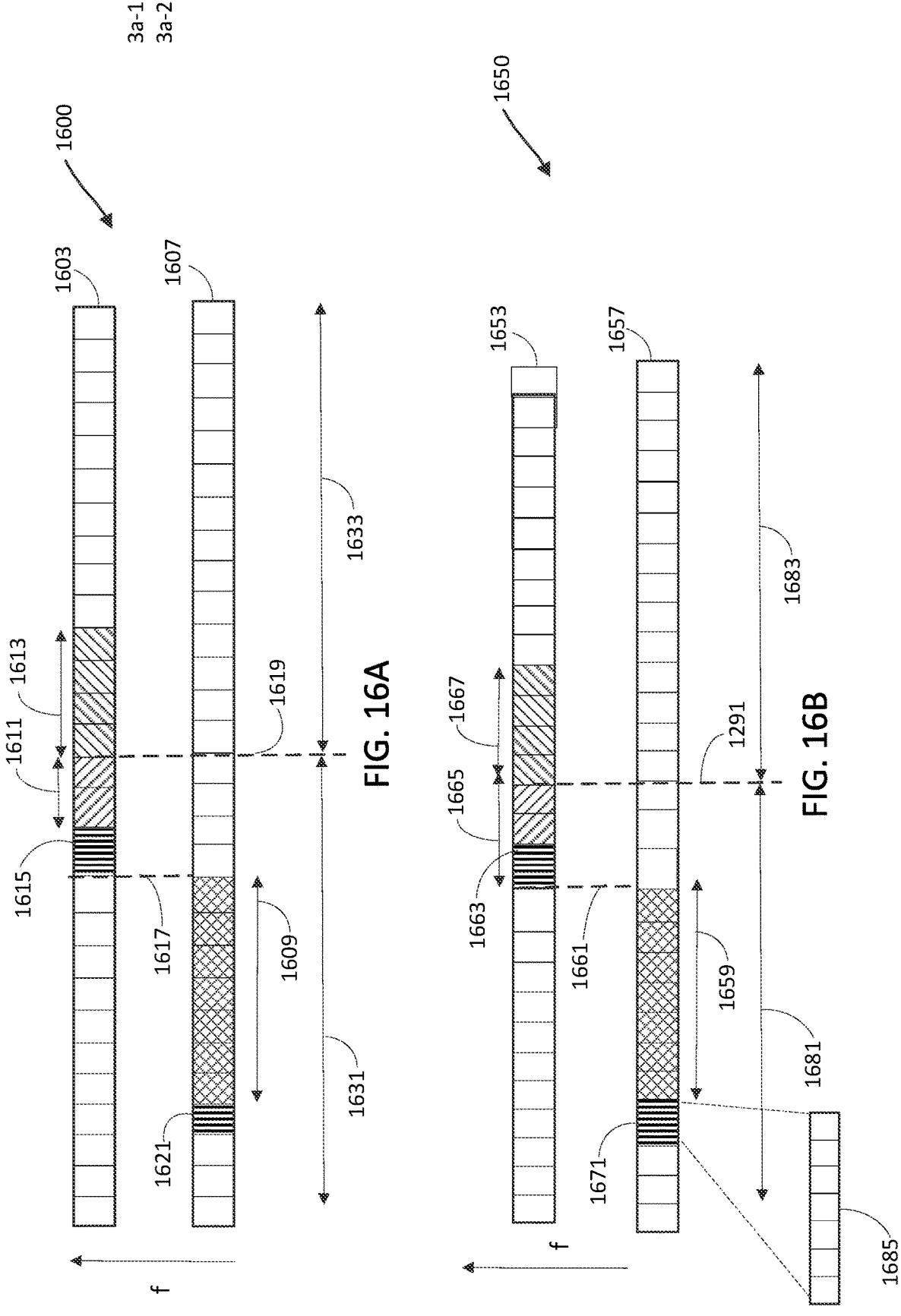
FIG. 16A illustrates an exemplary frequency hopping repetition structure according to aspects of the present disclosure.
FIG. 16B illustrates an exemplary frequency hopping repetition structure according to aspects of the present disclosure.

For example, FIG. 16A illustrates aspects of an exemplary time and frequency resource allocation 1600 for transmission of PUSCH repetitions for LBE with DG UL. The configuration 1600 includes frequency bands 1603 and 1607 spanning two adjacent slots 1631 and 1633. As shown, the configuration 1600 includes actual PUSCH repetition 1609 and nominal PUSCH repetition 1611-1613. Nominal PUSCH repetition 1611-1613 spans the slot boundary 1619, with actual repetition 1611 at the end of slot 1631 and actual repetition 1613 at the start of slot 1633. Each PUSCH repetition may be preceded by a CP extension.

In FIG. 16A, the first PUSCH repetition 1609 on frequency band 1607 is preceded by CP extension 1621. The CP extension 1621 may have been indicated previously by an UL grant from BS 400, which the UE 300 applies as before the first PUSCH repetition 1609. The UE 300 then transmits the PUSCH repetition 1609 on frequency band 1607 and hops at hopping boundary 1617 to the frequency band 1603. The UE 300 performs LBT at the LBT 1615, but the LBT is tight enough that it does not require the full symbol it occupies. Therefore, the UE 300 applies a CP extension 1616 for the rest of the symbol before starting the actual PUSCH repetition 1611 transmission in slot 1631.

In some examples, the CP extension 1616 may be defined with a default definition, such as computed by C1*symbol length-25 μs (to name one numeric example), where C1=1 for 15 KHz and 30 kHz SCS, and C1=2 for 60 kHz SCS (as just a few examples). Alternatively, the CP extension 1616 may be configured by RRC. Either way, the UE 300 applies the CP extension 1616 for the rest of the symbol, and if the LBT passed on frequency band 1603, begins transmission of the PUSCH repetition 1611 to the slot boundary 1619. At the start of the slot 1633, the UE 300 continues transmission with PUSCH repetition 1613, thereby completing transmission of the nominal repetition across the slot boundary 1619, while implementing a CP extension in a DG UL scenario.

In other situations, the LBE may be implemented in a CG UL scenario. This is illustrated in FIG. 16B, which shows aspects of an exemplary time and frequency resource allocation 1600 for transmission of PUSCH repetitions for load based equipment (LBE) with CG UL. The configuration 1650 includes frequency bands 1653 and 1657 spanning two adjacent slots 1681 and 1683. A difference between the example in FIG. 16A and the example in FIG. 16B is that an offset for the CP extension 1671 preceding the first PUSCH repetition 1659 may be randomly selected by UE 300 (instead of configured from an UL grant). The UE 300 may randomly select the offset from a set of offset options (e.g., 16 μs, 25 μs, 43 μs, 52 μs, 61 μs, 72 μs as an example of possible offsets to randomly choose from) previously configured via control signaling (e.g., RRC signaling). Similar to the example of FIG. 16A, subsequent CP extensions applied after tight LBT gaps may be applied based on a default definition or RRC configuration.

For example, after the randomly selected offset for CP extension 1671, the UE 300 may transmit the first PUSCH repetition 1659 on frequency band 1657. At the end of the repetition 1659, the UE 300 may hop to the frequency band 1653 at the hopping boundary 1661. The UE 300 performs LBT at the LBT 1662, but the LBT is tight enough that it does not require the full symbol it occupies. Therefore, the UE 300 applies a CP extension 1663 for the rest of the symbol before starting the actual PUSCH repetition 1665 if the LBT passed. The UE 300 then completes the nominal repetition with actual PUSCH repetition 1667 at the next slot 1683.

Figure 17:
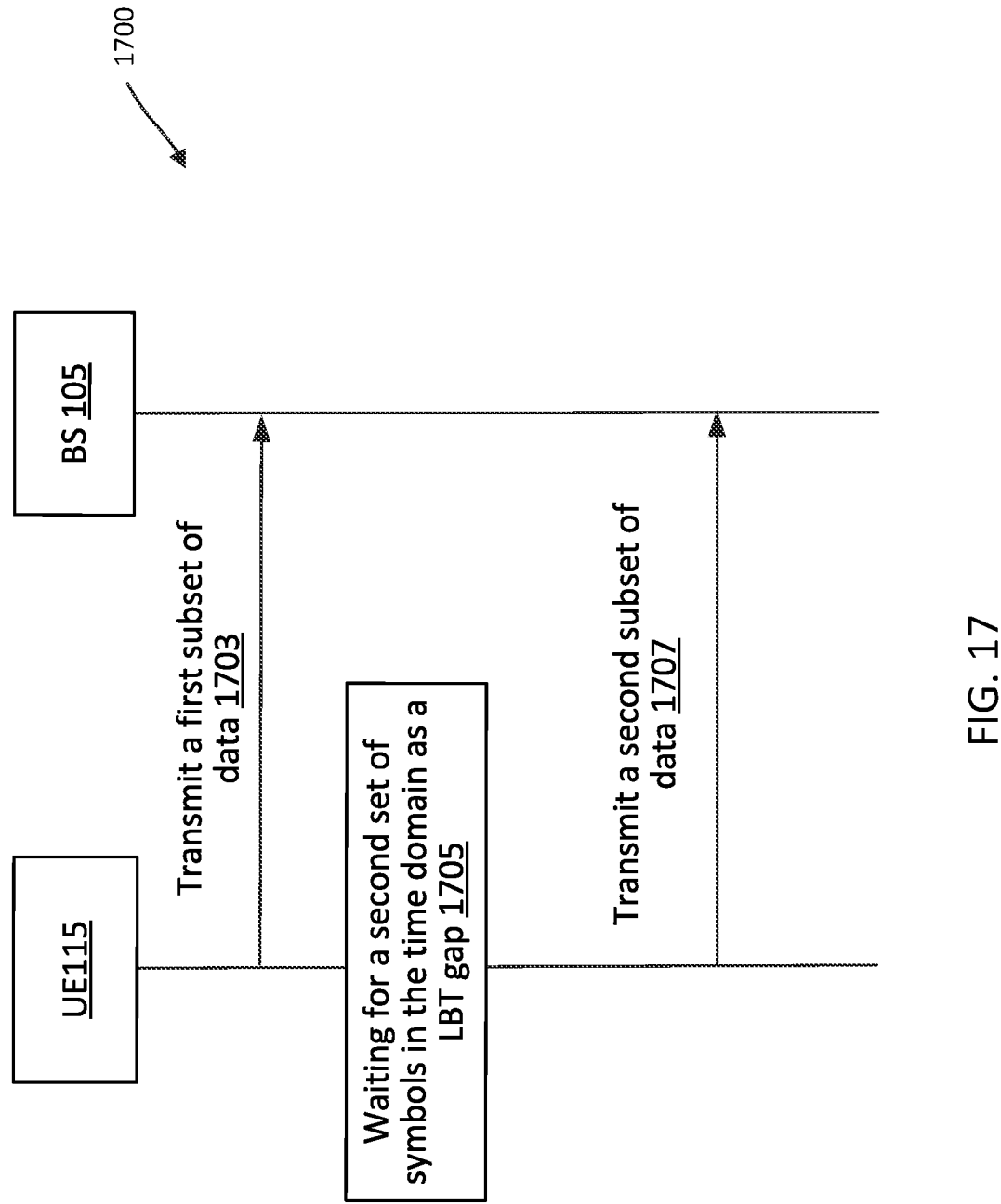
FIG. 17 illustrates an exemplary protocol diagram for introducing a gap between repetitions according to aspects of the present disclosure.

Turning now to FIG. 17, illustrated is a exemplary protocol diagram 1700 for introducing a gap between repetitions according to some aspects of the present disclosure. First device 1702 may be a UE such as a UE 115 or UE 300. Second device 1704 may be a BS such as a BS 105, or BS 400. Components of UE 300 discussed with respect to FIG. 3 may be utilized to perform the functions of communication protocol diagram 1700. Likewise, components of BS 400 discussed with respect to FIG. 4 may be utilized to perform the functions of communication protocol diagram 1700. Features of communication protocol diagram 1700 may use time and frequency resource allocation such as those in FIGS. 5A-16B, and/or methods described in FIG. 18 or 19 below.

At action 1703, the first device 1702 transmits a first subset of data to the second device 1704 on a first frequency sub-band. The first subset of data may be transmitted over a first set of symbols in a time domain. The second device 1704 may process the first subset of data, and detect the first set of symbols or buffer the data until receiving a repetition of the data at a subsequent time and/or frequency (e.g., perform soft-combining of the received data before decoding). In some examples, the first device 1702 may transmit the first subset of data in PUSCH repetitions type A or B.

At action 1707, the first device 102 waits for a second set of symbols in the time domain. This is what is referred to herein also as an LBT gap, which the first device 1702 uses as an opportunity to perform LBT to sense the availability of a second frequency band (different from the first frequency band on which the action 1703 occurred). The LBT gap in this action, in terms of location and duration, may be defined according to any of the embodiments described already herein, such as with respect to FIGS. 5A-16B above and/or FIGS. 18-19 below.

At action 1709, the first device 1702 transmits the second subset of data to the second device 1704 over a third set of symbols in the time domain on a second frequency band. This corresponds to situations where the LBT passes. If the LBT did not pass, the first device 1702 may not transmit the repetition, transmit the repetition on the same frequency band as the first repetition, perform another LBT on the same second frequency band, or LBT on a different frequency band. The second device 1704 may detect the third set of symbols and process the second subset of data upon receipt. The second device 1704 may soft combine the information before decoding.

Figure 18:
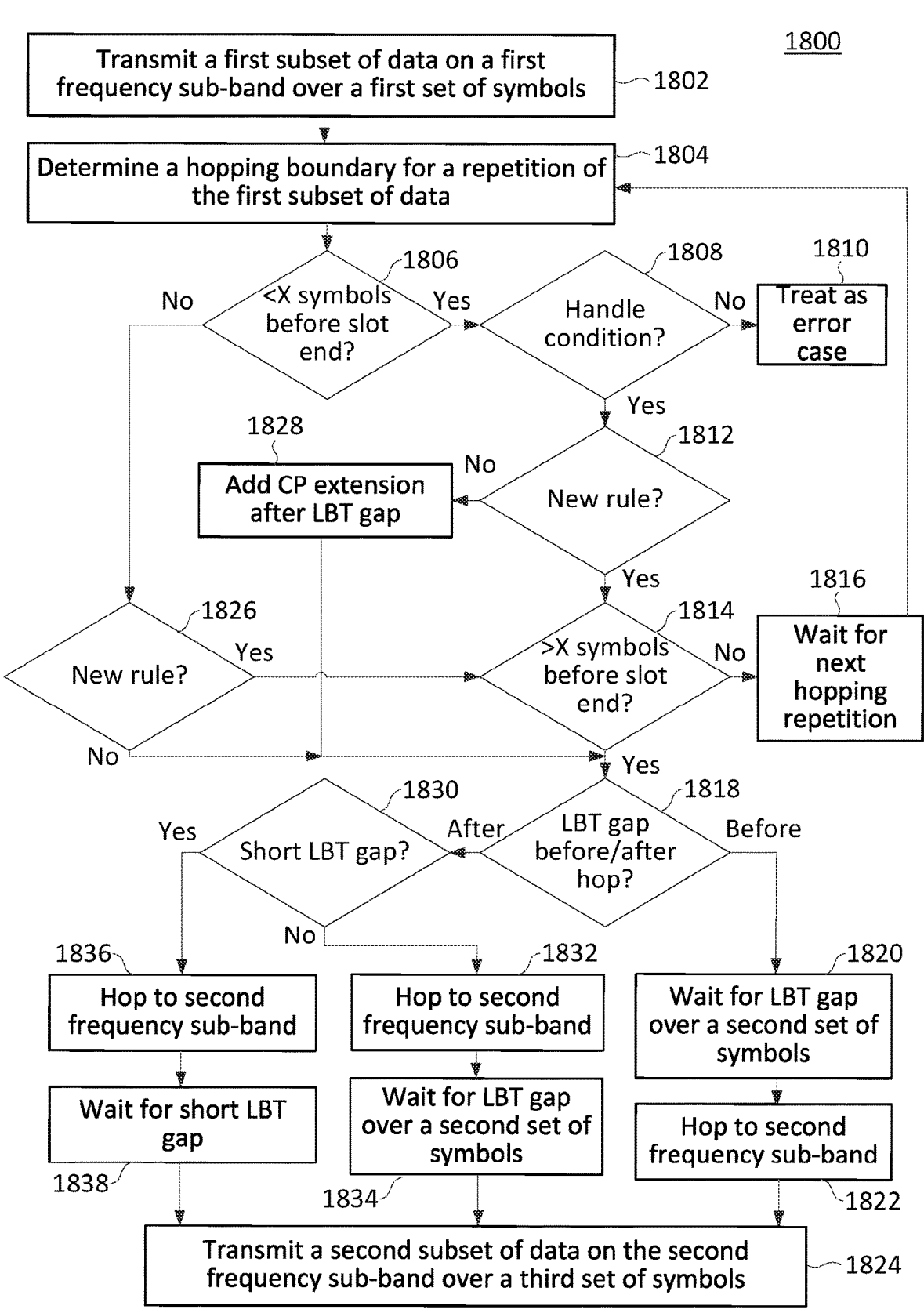
FIG. 18 illustrates a flow diagram of a method of wireless communications according to aspects of the present disclosure.

FIG. 18 illustrates a flow diagram 1800 of a method for wireless communication according to some aspects of the present disclosure. The method 1800 may be performed by a UE such as a UE 115 or UE 300. Aspects of method 1800 may utilize one or more components, such as the processor 302, the memory 304, the frequency hopping module 308, the transceiver 310, the modem 312, and the one or more antennas 316, to execute the steps of method 1800. As illustrated, the method 1800 includes a number of enumerated steps, but aspects of the method 1800 may include additional steps before, after, and in between the enumerated steps. In some aspects, one or more of the enumerated steps may be omitted or performed in a different order.

At block 1802, the UE 300 transmits a first set of data to a second wireless communication device over a first subset of data on a first frequency sub-band over a first set of symbols in time domain. The first subset of data may include uplink data and control information. The first subset of data may be transmitted according to PUSCH repetition type A or type B. The number of symbols in the first subset of data maybe indicated in some examples dynamically with a SLIV (which may further be applied across K consecutive slots).

At block 1804, the UE 300 determines a hopping boundary for a repetition of the first subset of data. In some examples, the hopping boundary maybe the slot boundary. In some other examples, the hopping boundary maybe different than a slot boundary. Examples of determining the hopping boundary are described above with respect to FIGS. 5A-16B.

At decision block 1806, the UE 300 may determine whether the number of hop symbols before the slot boundary is less than X. In some examples, the X maybe 2 symbols for 15 kHz and 30 kHz or 3 symbols for 60 kHz. In either example, with the introduction of an LBT gap at the hopping boundary before a slot boundary only one valid symbol before the slot boundary might remain. Instead of attempting to transmit PUSCH on this one symbol, embodiments of the present disclosure may determine whether to add a CP extension and start the next repetition when the new slot starts.

If there are fewer than X symbols remaining as determined at decision block 1806, the method 1800 proceeds to decision block 1808. At decision block 1808, the UE 300 may decide whether it is configured to handle a condition where there are fewer than X symbols remaining before a slot boundary. If the UE 300 is not configured to handle such a condition, the method 1800 may proceed to block 1810, where the UE 300 treats the situation as an error case. With that, the method may return for the next repetition to arise for handling.

Returning to decision block 1808, if the UE 300 is able to handle the condition with fewer than X symbols, then the method 1800 proceeds to decision block 1812. At decision block 1812, the UE 300 may determine whether it has been configured with a new hopping rule. If the UE 300 is configured for the rule, then the method 1800 proceeds to decision block 1814.

At decision block 1814, the UE 300 may determine whether the number of hop symbols before the slot boundary is greater than X. This may arise, for example, where the method 1800 proceeds from decision block 1806 (determining if less than X symbols before slot end) to decision block 1826 instead of block 1808. In some examples, the X maybe 2 symbols for 15 kHz and 30 kHz and 3 symbols for 60 kHz.

If the UE 300 determines at decision block 1814 that there are not more than X symbols before slot end, then the method 1800 proceeds to block 1816. At block 1816, the UE 300 waits for the next hopping repetition before determining to hop. Instead, the UE 300 will transmit the upcoming repetition on the same frequency band as the first repetition. The method 1800 then returns to the block 1804 and proceeds as discussed above and further below.

Returning to decision block 1814, if there are more than X symbols before slot end, then the method 1800 proceeds to decision block 1818. At decision block 1818, the UE 300 may determine whether the LBT gap is before or after the hop. If the LBT is before the hop, then the method 1800 proceeds to block 1820.

At block 1820, the UE 300 waits for LBT gap over a second set of symbols (before the hop). The second set of the symbols may allow the UE 300 to determine the availability of the second frequency sub-band for the transmission of the third set of symbols in the second frequency sub-band.

At block 1822, if the LBT passes the UE 300 hops to the second frequency sub-band. While shown as occurring after the LBT gap, hopping to the next frequency sub-band may occur before or after the LBT gap itself.

The method 1800 proceeds from block 1822 to block 1824. At block 1824, the UE 300 transmit a second subset of data on the second frequency sub-band over a third set of symbols. The second subset of data may be transmitted on PUSCH repetitions type A or type B according to embodiments of the present disclosure. This corresponds to a situation where the LBT passed at block 1822.

Returning now back to decision block 1806, where there are not less than X symbols before the end of a slot, the method 1800 may proceed to decision block 1826.

At decision block 1826, the UE 300 may determine whether it has been configured with a new hopping rule. If the UE 300 is configured for the rule, then the method 1800 proceeds from decision block 1826 to decision block 1814 and proceeds as laid out above and further below. If, instead, the UE 300 determines that it has not been configured according to a new rule, then the method 1800 proceeds to after decision block 1814 to feed into decision block 1818, to proceed as laid out above and further below.

Returning to decision block 1812, if instead the UE 300 determines that it has not been configured with a new hopping rule, then the method 1800 proceeds to block 1828.

At block 1828, the UE 300 adds a CP extension after the LBT gap (e.g., as introduced in discussions herein). From there, the method 1800 proceeds after block 1814 and as discussed above and further below.

Returning now to decision block 1818, if the UE 300 determines that the LBT gap is to be after the hop, then the method 1800 proceeds to decision block 1830.

At decision block 1830, the UE 300 may determine whether the LBT gap is a short LBT gap, such as would occur where the UE 300 is an LBE.

If the UE 300 is not an LBE and the LBT gap is not a short LBT gap, then the method 1800 proceeds to block 1832.

At block 1832, the UE 300 hops to a second frequency sub-band, similar to as discussed above with respect to block 1822, but before the LBT occurs.

At block 1834, the UE 300 waits for a second set of symbols over the LBT gap, for example as discussed above with respect to block 1820. From block 1834, the method 1800 proceeds to block 1824 as already discussed.

Returning to decision block 1830, if the UE 300 is an LBE and the LBT gap is a short LBT gap, then the method 1800 proceeds to block 1836.

At block 1836, the UE 300 hops to the second frequency sub-band. This may occur after a CP extension has been applied before the first repetition.

At block 1838, the UE 300 waits for the LBT gap (e.g., a short LBT gap) to determine the availability of the channel in the second frequency sub-band, similar to blocks 1820 or 1834 as discussed above. From block 1838, the method 1800 may proceed to block 1824 to transmit the second subset of data (e.g., a next PUSCH repetition). The method 1800 may continue the same or similar procedure over time, using LBT gaps to facilitate frequency hopping across unlicensed sub-bands.

Figure 19:
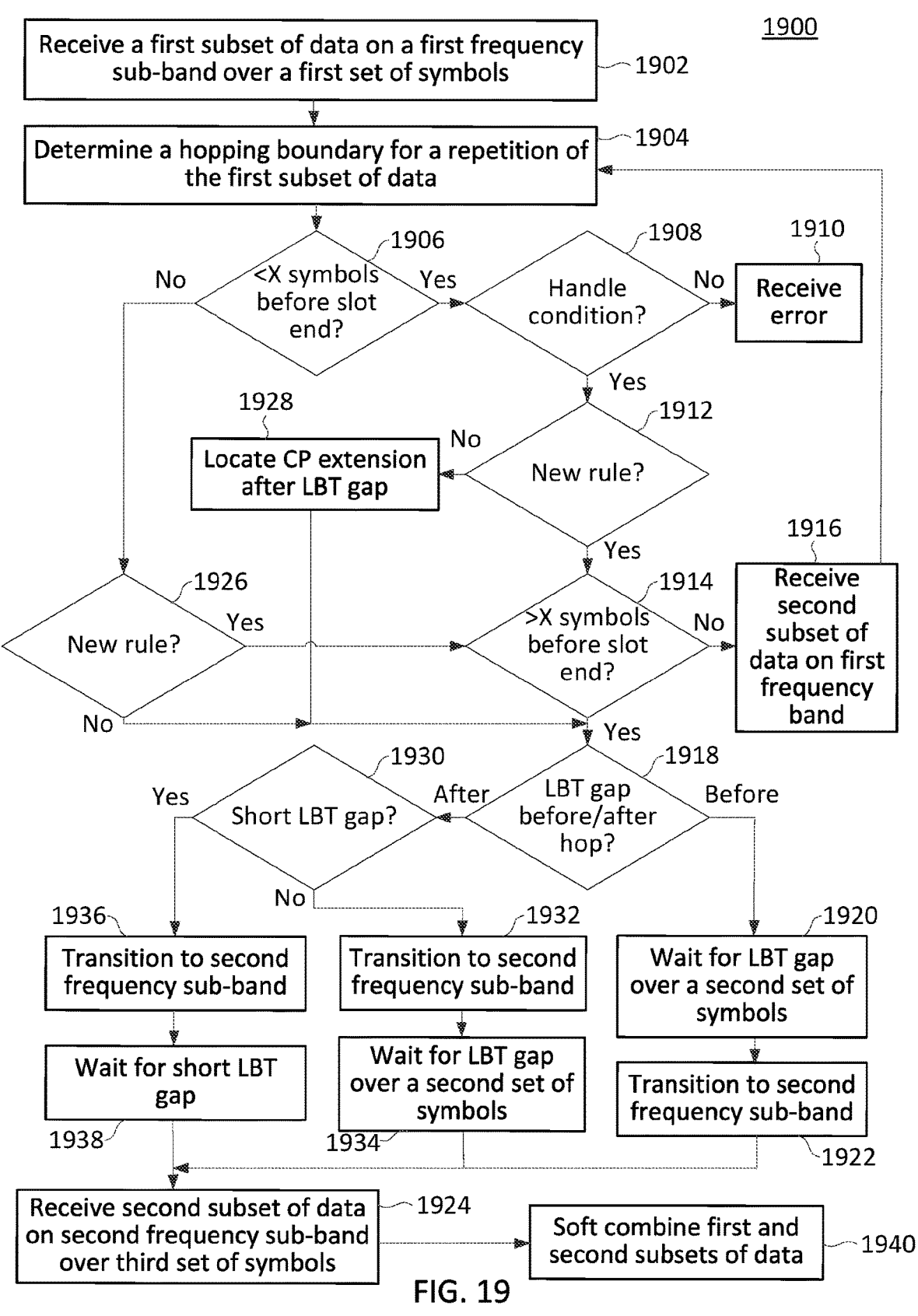
FIG. 19 illustrates a flow diagram of a method of wireless communications according to aspects of the present disclosure.

FIG. 19 illustrates a flow diagram 1900 of a method for wireless communication according to some aspects of the present disclosure. The method 1900 may be performed by a BS such as a BS 105 or BS 400. Aspects of method 1900 may utilize one or more components, such as the processor 402, the memory 404, the frequency hopping module 408, the transceiver 410, the modem 412, and the one or more antennas 416, to execute the steps of method 1900. As illustrated, the method 1800 includes a number of enumerated steps, but aspects of the method 1900 may include additional steps before, after, and in between the enumerated steps. In some aspects, one or more of the enumerated steps may be omitted or performed in a different order.

At block 1902, the BS 400 receives a first set of data from a first wireless communication device (e.g., a UE 300) on a first frequency sub-band over a first set of symbols in time domain. The first subset of data may include uplink data and control information. The first subset of data may be received on PUSCH repetition type A or type B.

At block 1904, the BS 400 determines a hopping boundary for a repetition of the first subset of data. In some examples, the hopping boundary maybe the slot boundary. In some other examples, the hopping boundary maybe a different than a slot boundary. Examples of determining the hopping boundary are described above with respect to FIGS. 5A-16B. This may be useful so the BS 400 is able to predict when the UE 300 may be transmitting PUSCH data and on what frequency subbands.

At decision block 1906, the BS 400 may determine whether the number of hop symbols before the slot boundary is less than X, similar to as discussed with respect to block 1806 above in FIG. 18.

If there are fewer than X symbols remaining as determined at decision block 1906, the method 1900 proceeds to decision block 1908. At decision block 1908, the BS 400 may determine whether the UE 300 is configured to handle a condition where there are fewer than X symbols remaining before a slot boundary. If not, the method 1900 may proceed to block 1910, where the situation is handled as an error case. With that, the method may return for the next repetition to arise for handling.

Returning to decision block 1908, if the UE 300 is able to handle the condition with fewer than X symbols, then the method 1900 proceeds to decision block 1912. At decision block 1912, the BS 400 may determine whether the UE 300 has been configured with a new hopping rule. If the UE 300 is configured for the rule, then the method 1900 proceeds to decision block 1914.

At decision block 1914, the BS 400 may determine whether the number of hop symbols before the slot boundary is greater than X. This may arise, for example, where the method 1900 proceeds from decision block 1906 (determining if less than X symbols before slot end) to decision block 1926 instead of block 1908. In some examples, the X maybe 2 symbols for 15 kHz and 30 kHz and 3 symbols for 60 kHz.

If the BS 400 determines at decision block 1914 that there are not more than X symbols before slot end, then the method 1900 proceeds to block 1916. At block 1916, the BS 400 waits for the next hopping repetition before determining to monitor for the repetition after a hop. Instead, the BS 400 will monitor/receive the upcoming repetition on the same frequency band as the first repetition. The method 1900 then returns to the block 1904 and proceeds as discussed above and further below.

Returning to decision block 1914, if there are more than X symbols before slot end, then the method 1900 proceeds to decision block 1918. At decision block 1918, the BS 400 may determine whether the LBT gap is before or after the hop. If the LBT is before the hop, then the method 1900 proceeds to block 1920.

At block 1920, the BS 400 waits for the LBT gap over a second set of symbols (before the hop) before monitoring for repetition data.

At block 1922, if the LBT passes the BS 400 transitions to monitor the second frequency sub-band for transmission of repetition data from the UE 300. While shown as occurring after the LBT gap, hopping to the next frequency sub-band may occur before or after the LBT gap itself.

The method 1900 proceeds from block 1922 to block 1924. At block 1924, the BS 400 receives a second subset of data on the second frequency sub-band over a third set of symbols. The second subset of data may be transmitted on PUSCH repetitions type A or type B according to embodiments of the present disclosure. This corresponds to a situation where the LBT passed at block 1922.

Returning now back to decision block 1906, where there are not less than X symbols before the end of a slot, the method 1900 may proceed to decision block 1926.

At decision block 1926, the BS 400 may determine whether the UE 300 has been configured with a new hopping rule. If the UE 300 is configured for the rule, then the method 1900 proceeds from decision block 1926 to decision block 1914 and proceeds as laid out above and further below. If, instead, the BS 400 determines that the UE 300 has not been configured according to a new rule, then the method 1900 proceeds to after decision block 1914 to feed into decision block 1918, to proceed as laid out above and further below.

Returning to decision block 1912, if instead the BS 400 determines that the UE 300 has not been configured with a new hopping rule, then the method 1900 proceeds to block 1928.

At block 1928, the BS 400 locates/waits for a CP extension the UE 300 has applied after the LBT gap (e.g., as introduced in discussions herein). From there, the method 1900 proceeds after block 1814 and as discussed above and further below.

Returning now to decision block 1918, if the BS 400 determines that the LBT gap is to be after the hop, then the method 1900 proceeds to decision block 1930.

At decision block 1930, the BS 400 may determine whether the LBT gap is a short LBT gap, such as would occur where the UE 300 is an LBE.

If the UE 300 is not an LBE and the LBT gap is not a short LBT gap, then the method 1900 proceeds to block 1932.

At block 1932, the BS 400 transitions to monitoring a second frequency sub-band, similar to as discussed above with respect to block 1922, but before the LBT occurs.

At block 1934, the BS 400 waits for a second set of symbols over the LBT gap, for example as discussed above with respect to block 1920. From block 1934, the method 1900 proceeds to block 1924 as already discussed.

Returning to decision block 1930, if the UE 300 is an LBE and the LBT gap is a short LBT gap, then the method 1900 proceeds to block 1936.

At block 1936, the BS 400 transitions to monitor the second frequency sub-band. This may occur after a CP extension has been applied before the first repetition.

At block 1938, the BS 400 waits for the LBT gap (e.g., a short LBT gap) to determine the availability of the channel in the second frequency sub-band, similar to blocks 1920 or 1934 as discussed above. From block 1938, the method 1900 may proceed to block 1924 to receive the second subset of data (e.g., a next PUSCH repetition) from the UE 300.

At block 1940, the BS 400 may soft combine the first and second subsets of data (e.g., repetitions of the same PUSCH data) and proceed with decoding and other processes. The method 1900 may continue the same or similar procedure over time, using LBT gaps to facilitate frequency hopping across unlicensed subbands.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include:

1. A method of wireless communication, comprising: transmitting, by a first wireless communications device to a second wireless communications device, a first subset of data on a first frequency sub-band over a first set of symbols in a time domain; waiting, by the first wireless communications device, for a time duration corresponding to a length of a second set of symbols in the time domain as a listen-before-talk (LBT) gap on the second frequency sub-band before transmitting a second subset of data; and transmitting, by the first wireless communications device to the second wireless communications device after the waiting, the second subset of data on a second frequency sub-band over a third set of symbols in the time domain, the first frequency sub-band being different than the second frequency sub-band.

2. The method of 1, wherein the second subset of data is a repetition of the first subset of data. 3. The method of 1, wherein the first set of symbols is transmitted in a first time slot, and the third set of symbols is transmitted in a second time slot adjacent to the first time slot, the method further comprising: receiving, by the first wireless communications device from the second wireless communications device, identification of the LBT gap.

4. The method of 1, wherein the second set of symbols comprises a beginning of the third set of symbols in the time domain. 5. The method of 4, wherein the second set of symbols is identified from an allocation from a start and length indicator value (SLIV) from the second wireless communications device. 6. The method of 5, further comprising: hopping, by the first wireless communications device, to the second frequency sub-band during a first time slot; transmitting, by the first wireless communications device after the LBT gap, a first portion of the second subset of data in the first time slot; and transmitting, by the first wireless communications device, a second portion of the second subset of data in a second time slot adjacent to the first time slot. 7. The method of 5, further comprising: hopping, by the first wireless communications device, to the second frequency sub-band at an end of transmitting the first subset of data in a first time slot; and transmitting, by the first wireless communications device after the LBT gap, the second subset of data in a second time slot adjacent to the first time slot. 8. The method of 5, wherein the first set of symbols in the time domain are in a first time slot, and the SLIV comprises a starting symbol indication and a length indication, the method further comprising: performing, by the first wireless communications device, the waiting beginning at a first time domain location within the first time slot and ending at a second time location, wherein the first time domain location is based on the starting symbol identification plus the maximum integer that is no more than the length indication divided by two, and the second time domain location is based on the starting symbol identification plus the maximum integer that is no more than length indication divided by two, plus a size of the second set of symbols less one. 9. The method of 5, wherein the first set of symbols and the third set of symbols in the time domain are in a first time slot, the method further comprising: determining, by the first wireless communications device, a first number of symbols for the first set of symbols based on a maximum integer that is no more than a combined length of the first subset of data and the second subset of data together divided by two; determining, by the first wireless communications device, a second number of symbols for the third set of symbols based on the combined length subtracted by the maximum integer that is no more than the combined length divided by two; and performing, by the first wireless communications device, the waiting beginning at a time domain location at a start of the third set of symbols based on the first and second numbers of symbols. 10. The method of 5, wherein the first set of symbols and the third set of symbols in the time domain are in a first time slot, the method further comprising: removing, by the first wireless communications device, a length of the second set of symbols from a combined length of the first subset of data and the second subset of data to determine a modified length; determining, by the first wireless communications device, a first number of symbols for the first set of symbols based on the maximum integer that is no more than the modified length divided by two; determining, by the first wireless communications device, a second number of symbols for the third set of symbols based on the modified length subtracted by the length of the second set of symbols, further subtracted by the maximum integer that is no more than the modified length divided by two; and performing, by the first wireless communications device, the waiting beginning at a time domain location between the first set of symbols and the third set of symbols based on the first and second numbers of symbols.

11. The method of 4, further comprising: determining, by the first wireless communications device, a hopping boundary between the first frequency sub-band and the second frequency sub-band; and hopping, by the first wireless communications device, to the second frequency sub-band.

12. The method of 11, wherein the hopping boundary comprises an end of a time slot, the method further comprising: performing, by the first wireless communications device, the waiting for the second set of symbols at a beginning of the third set of symbols after the hopping boundary.

13. The method of 11, wherein the hopping boundary comprises a time location before a boundary of a time slot, the method further comprising: performing, by the first wireless communications device, the waiting for the second set of symbols at a beginning of the third set of symbols after the hopping boundary.

14. The method of 11, wherein the hopping boundary comprises an end of a first time slot, the method further comprising: transmitting, by the first wireless communications device, a first portion of the second subset of data in the first time slot; performing, by the first wireless communications device, the waiting for the second set of symbols at a beginning of the second time slot after the hopping boundary; and transmitting, by the first wireless communications device, a second portion of the second subset of data in the second time slot.

15. The method of 1, wherein the second set of symbols comprises an end of the first set of symbols in the time domain.

16. The method of 15, wherein the second set symbol is identified from an allocation from a start and length indicator value (SLIV) from the second wireless communications device.

17. The method of 16, further comprising: hopping, by the first wireless communications device, to the second frequency sub-band at an end of transmitting the first subset of data in a first time slot; transmitting, by the first wireless communications device after the LBT gap, a first portion of the second subset of data in the first time slot; and transmitting, by the first wireless communications device, a second portion of the second subset of data in a second time slot adjacent to the first time slot.

18. The method of 16, further comprising: hopping, by the first wireless communications device after the LBT gap, to the second frequency sub-band at an end of a first time slot; and transmitting, by the first wireless communications device after the LBT gap at a start of a second time slot adjacent to the first time slot, the second subset of data.

19. The method of 16, wherein the first set of symbols in the time domain are in a first time slot, and the SLIV comprises a starting symbol indication and a length indication, the method further comprising: performing, by the first wireless communications device, the waiting beginning at a first time domain location within the first time slot and ending at a second time location, wherein the first time domain location is based on the starting symbol identification plus the maximum integer that is no more than the length indication divided by two, less a size of the second set of symbols, and the second time domain location is based on the starting symbol identification plus the maximum integer that is no more than the length indication divided by two, less one.

20. The method of 16, wherein the first set of symbols and the third set of symbols in the time domain are in a first time slot, the method further comprising: determining, by the first wireless communications device, a first number of symbols for the first set of symbols based on a maximum integer that is no more than a combined length of the first subset of data and the second subset of data together divided by two; determining, by the first wireless communications device, a second number of symbols for the third set of symbols based on the combined length subtracted by the maximum integer that is no more than the combined length divided by two; and performing, by the first wireless communications device, the waiting beginning at a time domain location at the end of the first set of symbols based on the first and second numbers of symbols.

21. The method of 15, further comprising: determining, by the first wireless communications device, a hopping boundary between the first frequency sub-band and the second frequency sub-band; and hopping, by the first wireless communications device, to the second frequency sub-band at the hopping boundary.

22. The method of 21, wherein the hopping boundary comprises an end of a time slot, the method further comprising: performing, by the first wireless communications device, the waiting for the second set of symbols at the end of the first set of symbols before the hopping boundary.

23. The method of 21, wherein the hopping boundary comprises a time location before a boundary of a time slot, the method further comprising: performing, by the first wireless communications device, the waiting for the second set of symbols at the end of the first set of symbols before the hopping boundary.

24. The method of 21, wherein the hopping boundary comprises an end of a first time slot, the method further comprising: transmitting, by the first wireless communications device, a first portion of the second subset of data in the first time slot; performing, by the first wireless communications device, the waiting for the second set of symbols at an end of the first time slot before the hopping boundary; and transmitting, by the first wireless communications device, a second portion of the second subset of data in the second time slot.

25. The method of 1, wherein the transmitting the second subset of data further comprises: determining, by the first wireless communications device, whether a length of the third set of symbols after the LBT gap before a slot boundary is greater than two symbols for a subcarrier spacing (SCS) of 15 kHz or 30 kHz, or greater than three symbols for an SCS of 60 kHz.

26. The method of 25, wherein the transmitting further comprises: substituting, by the first wireless communications device, an error message as the second subset of data to indicate an error condition in response to the length of the third set of symbols being equal to or less than two symbols for the 15 kHz or 30 kHz SCSs, or three symbols for the 60 kHz SCS.

27. The method of 25, further comprising: introducing, by the first wireless communication device, a cyclic prefix (CP) extension before the hopping boundary in response to the length of the third set of symbols being equal to or less than two symbols for the 15 kHz or 30 kHz SCSs, or three symbols for the 60 kHz SCS.

28. The method of 25, further comprising: reverting, by the first wireless communication device, back to the frequency sub-band instead of the second frequency sub-band for transmitting the second subset of data in response to the length of the third set of symbols being equal to or less than two symbols for the 15 kHz or 30 kHz SCSs, or three symbols for the 60 kHz SCS; and continuing, by the first wireless communications device, with the transmitting the second subset of data on the second frequency sub-band in response to the length of the third set of symbols being greater than two symbols for the 15 kHz or 30 kHz SCSs, or three symbols for the 60 kHz SCS.

29. The method of 1, further comprising: receiving, by the first wireless communications device from the second wireless communications device, a dynamic grant of uplink (UL)

resources for the transmitting the first and second subsets of data; applying, by the first wireless communications device, a first cyclic prefix (CP) extension before the transmitting the first subset of data based on the dynamic grant of UL resources; and applying, by the first wireless communications device, a second CP extension after the LBT gap and before the transmitting the second subset of data based on a default configuration. 30. The method of 29, wherein the default configuration comprises a default value multiplied by a symbol length, less a time duration of the LBT gap. 31. The method of 30, wherein the default value comprises a value of one for a subcarrier spacing (SCS) of 15 kHz or 30 kHz, or a value of two for an SCS of 60 kHz.

32. The method of 1, further comprising: receiving, by the first wireless communications device from the second wireless communications device, a dynamic grant of uplink (UL) resources for the transmitting the first and second subsets of data; applying, by the first wireless communications device, a first cyclic prefix (CP) extension before the transmitting the first subset of data based on the dynamic grant of UL resources; and applying, by the first wireless communications device, a second CP extension after the LBT gap and before the transmitting the second subset of data based on a radio resource control (RRC) configuration.

33. The method of 1, further comprising: randomly selecting, by the first wireless communications device, a time offset for applying a first cyclic prefix (CP) extension in response to the transmitting the first subset of data being according to a configured grant communications scheme; applying, by the first wireless communications device, the first cyclic prefix (CP) extension with the randomly selected time offset before the transmitting the first subset of data; and applying, by the first wireless communications device, a second CP extension after the LBT gap and before the transmitting the second subset of data based on a default configuration. 34. The method of 33, wherein the default configuration comprises a default value multiplied by a symbol length, less a time duration of the LBT gap. 35. The method of 34, wherein the default value comprises a value of one for a subcarrier spacing (SCS) of 15 kHz or 30 kHz, or a value of two for an SCS of 60 kHz.

36. The method of 1, further comprising: randomly selecting, by the first wireless communications device, a time offset for applying a first cyclic prefix (CP) extension in response to the transmitting the first subset of data being according to a configured grant communications scheme; applying, by the first wireless communications device, the first cyclic prefix (CP) extension with the randomly selected time offset before the transmitting the first subset of data; and applying, by the first wireless communications device, a second CP extension after the LBT gap and before the transmitting the second subset of data based on a radio resource control (RRC) configuration.

37. A method of wireless communication, comprising: receiving, by a first wireless communications device from a second wireless communications device, a first subset of data on a first frequency sub-band over a first set of symbols in a time domain; waiting, by the first wireless communications device, for a time duration corresponding to a length of a second set of symbols in the time domain as a listen-before-talk (LBT) gap on a second frequency sub-band; and receiving, by the first wireless communications device from the second wireless communications device after the waiting, a second subset of data on the second frequency sub-band over a third set of symbols in the time domain, the first frequency sub-band being different than the second frequency sub-band.

38. The method of 37, wherein the second subset of data is a repetition of the first subset of data, the method further comprising: soft-combining, by the first wireless communications device, the first subset of data and the second subset of data; and decoding, by the first wireless communications device, the soft-combined data. 39. The method of 37, wherein the first set of symbols is received in a first time slot, and the third set of symbols is received in a second time slot adjacent to the first time slot, the method further comprising: determining, by the first wireless communications device, the LBT gap; and transmitting, by the first wireless communications device to the second wireless communications device, identification of the determined LBT gap.

40. The method of 37, wherein the second set of symbols comprises a beginning of the third set of symbols in the time domain. 41. The method of 40, further comprising: transmitting, by the first wireless communications device to the second wireless communications device, a start and length indicator value (SLIV) including an allocation, wherein the second set of symbols is identified from the allocation. 42. The method of 41, further comprising: transitioning, by the first wireless communications device, to monitoring the second frequency sub-band during a first time slot; receiving, by the first wireless communications device after the LBT gap, a first portion of the second subset of data in the first time slot; and receiving, by the first wireless communications device, a second portion of the second subset of data in a second time slot adjacent to the first time slot. 43. The method of 41, further comprising: transitioning, by the first wireless communications device, to monitoring the second frequency sub-band at an end of transmitting the first subset of data in a first time slot; and receiving, by the first wireless communications device after the LBT gap, the second subset of data in a second time slot adjacent to the first time slot. 44. The method of 41, wherein the first set of symbols in the time domain are in a first time slot, and the SLIV comprises a starting symbol indication and a length indication, the method further comprising: performing, by the first wireless communications device, the waiting beginning at a first time domain location within the first time slot and ending at a second time location, wherein the first time domain location is based on the starting symbol identification plus the maximum integer that is no more than the length indication divided by two, and the second time domain location is based on the starting symbol identification plus the maximum integer that is no more than length indication divided by two, plus a size of the second set of symbols less one. 45. The method of 41, wherein the first set of symbols and the third set of symbols in the time domain are in a first time slot, the method further comprising: determining, by the first wireless communications device, a first number of symbols for the first set of symbols based on a maximum integer that is no more than a combined length of the first subset of data and the second subset of data together divided by two; determining, by the first wireless communications device, a second number of symbols for the third set of symbols based on the combined length subtracted by the maximum integer that is no more than the combined length divided by two; and performing, by the first wireless communications device, the waiting beginning at a time domain location at a start of the third set of symbols based on the first and second numbers of symbols. 46. The method of 41, wherein the first set of symbols and the third set of symbols in the time domain are in a first time slot, the method further comprising: removing, by the first wireless communications device, a length of the second set of symbols from a combined length of the first subset of data and the second subset of data to determine a modified length; determining, by the first wireless communications device, a first number of symbols for the first set of symbols based on the maximum integer that is no more than the modified length divided by two; determining, by the first wireless communications device, a second number of symbols for the third set of symbols based on the modified length subtracted by the length of the second set of symbols, further subtracted by the maximum integer that is no more than the modified length divided by two; and performing, by the first wireless communications device, the waiting beginning at a time domain location between the first set of symbols and the third set of symbols based on the first and second numbers of symbols. 47. The method of 40, further comprising: determining, by the first wireless communications device, a hopping boundary between the first frequency sub-band and the second frequency sub-band; and transitioning, by the first wireless communications device, to monitoring the second frequency sub-band. 48. The method of 47, wherein the hopping boundary comprises an end of a time slot, the method further comprising: performing, by the first wireless communications device, the waiting for the second set of symbols at the beginning of the third set of symbols after the hopping boundary. 49. The method of 47, wherein the hopping boundary comprises a time location before a boundary of a time slot, the method further comprising: performing, by the first wireless communications device, the waiting for the second set of symbols at the beginning of the third set of symbols after the hopping boundary. 50. The method of 47, wherein the hopping boundary comprises an end of a first time slot, the method further comprising: receiving, by the first wireless communications device, a first portion of the second subset of data in the first time slot; performing, by the first wireless communications device, the waiting for the second set of symbols at the beginning of the second time slot after the hopping boundary; and receiving, by the first wireless communications device, a second portion of the second subset of data in the second time slot.

51. The method of 37, wherein the second set of symbols comprises an end of the first set of symbols in the time domain. 52. The method of 51, wherein the second set symbol is identified from an allocation from a start and length indicator value (SLIV) from the second wireless communications device. 53. The method of 52, further comprising: transitioning, by the first wireless communications device, to monitoring the second frequency sub-band at an end of transmitting the first subset of data in a first time slot; receiving, by the first wireless communications device after the LBT gap, a first portion of the second subset of data in the first time slot; and receiving, by the first wireless communications device, a second portion of the second subset of data in a second time slot adjacent to the first time slot. 54. The method of 52, further comprising: transitioning, by the first wireless communications device after the LBT gap, to monitoring the second frequency sub-band at an end of a first time slot; and receiving, by the first wireless communications device after the LBT gap at a start of a second time slot adjacent to the first time slot, the second subset of data. 55. The method of 52, wherein the first set of symbols in the time domain are in a first time slot, and the SLIV comprises a starting symbol indication and a length indication, the method further comprising: performing, by the first wireless communications device, the waiting beginning at a first time domain location within the first time slot and ending at a second time location, wherein the first time domain location is based on the starting symbol identification plus the maximum integer that is no more than the length indication divided by two, less a size of the second set of symbols, and the second time domain location is based on the starting symbol identification plus the maximum integer that is no more than the length indication divided by two, less one. 56. The method of 52, wherein the first set of symbols and the third set of symbols in the time domain are in a first time slot, the method further comprising: determining, by the first wireless communications device, a first number of symbols for the first set of symbols based on a maximum integer that is no more than a combined length of the first subset of data and the second subset of data together divided by two; determining, by the first wireless communications device, a second number of symbols for the third set of symbols based on the combined length subtracted by the maximum integer that is no more than the combined length divided by two; and performing, by the first wireless communications device, the waiting beginning at a time domain location at the end of the first set of symbols based on the first and second numbers of symbols. 57. The method of 51, further comprising: determining, by the first wireless communications device, a hopping boundary between the first frequency sub-band and the second frequency sub-band; and transitioning, by the first wireless communications device, to monitoring the second frequency sub-band at the hopping boundary. 58. The method of 57, wherein the hopping boundary comprises an end of a time slot, the method further comprising: performing, by the first wireless communications device, the waiting for the second set of symbols at the end of the first set of symbols before the hopping boundary. 59. The method of 57, wherein the hopping boundary comprises a time location before a boundary of a time slot, the method further comprising: performing, by the first wireless communications device, the waiting for the second set of symbols at the end of the first set of symbols before the hopping boundary. 60. The method of 57, wherein the hopping boundary comprises an end of a first time slot, the method further comprising: receiving, by the first wireless communications device, a first portion of the second subset of data in the first time slot; performing, by the first wireless communications device, the waiting for the second set of symbols at an end of the first time slot before the hopping boundary; and receiving, by the first wireless communications device, a second portion of the second subset of data in the second time slot.

61. The method of 37, wherein the receiving the second subset of data further comprises: determining, by the first wireless communications device, whether a length of the third set of symbols after the LBT gap before a slot boundary is greater than two symbols for a subcarrier spacing (SCS) of 15 kHz or 30 kHz, or greater than three symbols for an SCS of 60 kHz. 62. The method of 61, wherein the receiving further comprises: receiving, by the first wireless communications device, an error message as the second subset of data to indicate an error condition in response to the length of the third set of symbols being equal to or less than two symbols for the 15 kHz or 30 kHz SCSs, or three symbols for the 60 kHz SCS. 63. The method of 61, further comprising: locating, by the first wireless communication device, a cyclic prefix (CP) extension before the hopping boundary in response to the length of the third set of symbols being equal to or less than two symbols for the 15 kHz or 30 kHz SCSs, or three symbols for the 60 kHz SCS. 64. The method of 61, further comprising: maintaining, by the first wireless communication device, monitoring of the frequency sub-band instead of the second frequency sub-band for receipt of the second subset of data in response to the length of the third set of symbols being equal to or less than two symbols for the 15 kHz or 30 kHz SCSs, or three symbols for the 60 kHz SCS; and transitioning, by the first wireless communications device, with monitoring for the second subset of data on the second frequency sub-band in response to the length of the third set of symbols being greater than two symbols for the 15 kHz or 30 kHz SCSs, or three symbols for the 60 kHz SCS.

65. The method of 37, further comprising: transmitting, by the first wireless communications device to the second wireless communications device, a dynamic grant of uplink (UL) resources for the transmission of the first and second subsets of data; locating, by the first wireless communications device, a first cyclic prefix (CP) extension before the receiving the first subset of data based on the dynamic grant of UL resources; and locating, by the first wireless communications device, a second CP extension after the LBT gap and before the receiving the second subset of data based on a default configuration. 66. The method of 65, wherein the default configuration comprises a default value multiplied by a symbol length, less a time duration of the LBT gap. 67. The method of 66, wherein the default value comprises a value of one for a subcarrier spacing (SCS) of 15 kHz or 30 kHz, or a value of two for an SCS of 60 kHz.

68. The method of 37, further comprising: transmitting, by the first wireless communications device to the second wireless communications device, a dynamic grant of uplink (UL) resources for the transmission of the first and second subsets of data; locating, by the first wireless communications device, a first cyclic prefix (CP) extension before the receiving the first subset of data based on the dynamic grant of UL resources; and locating, by the first wireless communications device, a second CP extension after the LBT gap and before the receiving the second subset of data based on a radio resource control (RRC) configuration.

69. The method of 37, further comprising: monitoring, by the first wireless communications device, for the first subset of data according to a randomly selected time offset for applying a first cyclic prefix (CP) extension in response to the transmission of the first subset of data being according to a configured grant communications scheme; locating, by the first wireless communications device, the first cyclic prefix (CP) extension with the randomly selected time offset before the receiving the first subset of data; and locating, by the first wireless communications device, a second CP extension after the LBT gap and before the receiving the second subset of data based on a default configuration. 70. The method of 69, wherein the default configuration comprises a default value multiplied by a symbol length, less a time duration of the LBT gap. 71. The method of 70, wherein the default value comprises a value of one for a subcarrier spacing (SCS) of 15 kHz or 30 kHz, or a value of two for an SCS of 60 kHz.

72. The method of 37, further comprising: monitoring, by the first wireless communications device, for the first subset of data according to a randomly selected time offset for applying a first cyclic prefix (CP) extension in response to the receiving the first subset of data being according to a configured grant communications scheme; locating, by the first wireless communications device, the first cyclic prefix (CP) extension with the randomly selected time offset before the receiving the first subset of data; and locating, by the first wireless communications device, a second CP extension after the LBT gap and before the receiving the second subset of data based on a radio resource control (RRC) configuration.

147. A non-transitory computer-readable medium having program code recorded thereon, the program code comprising: code for causing a first wireless communications device to transmit, to a second wireless communications device, a first subset of data on a first frequency sub-band over a first set of symbols in a time domain; code for causing the first wireless communications device to wait for a time duration corresponding to a length of a second set of symbols in the time domain as a listen-before-talk (LBT) gap on the second frequency sub-band before transmitting a second subset of data; and code for causing the first wireless communications device to transmit, to the second wireless communications device after the wait, the second subset of data on a second frequency sub-band over a third set of symbols in the time domain, the first frequency sub-band being different than the second frequency sub-band.

148. The non-transitory computer-readable medium of 147, wherein the second subset of data is a repetition of the first subset of data. 149. The non-transitory computer-readable medium of 147, wherein the first set of symbols is transmitted in a first time slot, and the third set of symbols is transmitted in a second time slot adjacent to the first time slot, the program code further comprising: code for causing the first wireless communications device to receive, from the second wireless communications device, identification of the LBT gap.

150. The non-transitory computer-readable medium of 147, wherein the second set of symbols comprises a beginning of the third set of symbols in the time domain. 151. The non-transitory computer-readable medium of 150, wherein the second set of symbols is identified from an allocation from a start and length indicator value (SLIV) from the second wireless communications device. 152. The non-transitory computer-readable medium of 151, the program code further comprising: code for causing the first wireless communications device to hop to the second frequency sub-band during a first time slot; code for causing the first wireless communications device to transmit, after the LBT gap, a first portion of the second subset of data in the first time slot; and code for causing the first wireless communications device to transmit a second portion of the second subset of data in a second time slot adjacent to the first time slot. 153. The non-transitory computer-readable medium of 151, the program code further comprising: code for causing the first wireless communications device to hop to the second frequency sub-band at an end of transmitting the first subset of data in a first time slot; and code for causing the first wireless communications device to transmit, after the LBT gap, the second subset of data in a second time slot adjacent to the first time slot. 154. The non-transitory computer-readable medium of 151, wherein the first set of symbols in the time domain are in a first time slot, and the SLIV comprises a starting symbol indication and a length indication, the program code further comprising: code for causing the first wireless communications device to perform the wait beginning at a first time domain location within the first time slot and ending at a second time location, wherein the first time domain location is based on the starting symbol identification plus the maximum integer that is no more than the length indication divided by two, and the second time domain location is based on the starting symbol identification plus the maximum integer that is no more than length indication divided by two, plus a size of the second set of symbols less one. 155. The non-transitory computer-readable medium of 151, wherein the first set of symbols and the third set of symbols in the time domain are in a first time slot, the program code further comprising: code for causing the first wireless communications device to determine a first number of symbols for the first set of symbols based on a maximum integer that is no more than a combined length of the first subset of data and the second subset of data together divided by two; code for causing the first wireless communications device to determine a second number of symbols for the third set of symbols based on the combined length subtracted by the maximum integer that is no more than the combined length divided by two; and code for causing the first wireless communications device to perform the wait beginning at a time domain location at a start of the third set of symbols based on the first and second numbers of symbols. 156. The non-transitory computer-readable medium of 151, wherein the first set of symbols and the third set of symbols in the time domain are in a first time slot, the program code further comprising: code for causing the first wireless communications device to remove a length of the second set of symbols from a combined length of the first subset of data and the second subset of data to determine a modified length; code for causing the first wireless communications device to determine a first number of symbols for the first set of symbols based on the maximum integer that is no more than the modified length divided by two; code for causing the first wireless communications device to determine a second number of symbols for the third set of symbols based on the modified length subtracted by the length of the second set of symbols, further subtracted by the maximum integer that is no more than the modified length divided by two; and code for causing the first wireless communications device to perform the wait beginning at a time domain location between the first set of symbols and the third set of symbols based on the first and second numbers of symbols. 157. The non-transitory computer-readable medium of 150, the program code further comprising: code for causing the first wireless communications device to determine a hopping boundary between the first frequency sub-band and the second frequency sub-band; and code for causing the first wireless communications device to hop to the second frequency sub-band. 158. The non-transitory computer-readable medium of 157, wherein the hopping boundary comprises an end of a time slot, the program code further comprising: code for causing the first wireless communications device to perform the wait for the second set of symbols at a beginning of the third set of symbols after the hopping boundary. 159. The non-transitory computer-readable medium of 157, wherein the hopping boundary comprises a time location before a boundary of a time slot, the program code further comprising: code for causing the first wireless communications device to perform the wait for the second set of symbols at a beginning of the third set of symbols after the hopping boundary. 160. The non-transitory computer-readable medium of 157, wherein the hopping boundary comprises an end of a first time slot, the program code further comprising: code for causing the first wireless communications device to transmit a first portion of the second subset of data in the first time slot; code for causing the first wireless communications device to perform the wait for the second set of symbols at a beginning of the second time slot after the hopping boundary; and code for causing the first wireless communications device to transmit a second portion of the second subset of data in the second time slot.

161. The non-transitory computer-readable medium of 147, wherein the second set of symbols comprises an end of the first set of symbols in the time domain. 162. The non-transitory computer-readable medium of 161, wherein the second set symbol is identified from an allocation from a start and length indicator value (SLIV) from the second wireless communications device. 163. The non-transitory computer-readable medium of 162, the program code further comprising: code for causing the first wireless communications device to hop to the second frequency sub-band at an end of transmitting the first subset of data in a first time slot; code for causing the first wireless communications device to transmit, after the LBT gap, a first portion of the second subset of data in the first time slot; and code for causing the first wireless communications device to transmit a second portion of the second subset of data in a second time slot adjacent to the first time slot. 164. The non-transitory computer-readable medium of 162, the program code further comprising: code for causing the first wireless communications device to hop, after the LBT gap, to the second frequency sub-band at an end of a first time slot; and code for causing the first wireless communications device to transmit, after the LBT gap at a start of a second time slot adjacent to the first time slot, the second subset of data. 165. The non-transitory computer-readable medium of 162, wherein the first set of symbols in the time domain are in a first time slot, and the SLIV comprises a starting symbol indication and a length indication, the program code further comprising: code for causing the first wireless communications device to perform the wait beginning at a first time domain location within the first time slot and ending at a second time location, wherein the first time domain location is based on the starting symbol identification plus the maximum integer that is no more than the length indication divided by two, less a size of the second set of symbols, and the second time domain location is based on the starting symbol identification plus the maximum integer that is no more than the length indication divided by two, less one. 166. The non-transitory computer-readable medium of 162, wherein the first set of symbols and the third set of symbols in the time domain are in a first time slot, the program code further comprising: code for causing the first wireless communications device to determine a first number of symbols for the first set of symbols based on a maximum integer that is no more than a combined length of the first subset of data and the second subset of data together divided by two; code for causing the first wireless communications device to determine a second number of symbols for the third set of symbols based on the combined length subtracted by the maximum integer that is no more than the combined length divided by two; and code for causing the first wireless communications device to perform the wait beginning at a time domain location at the end of the first set of symbols based on the first and second numbers of symbols. 167. The non-transitory computer-readable medium of 161, the program code further comprising: code for causing the first wireless communications device to determine a hopping boundary between the first frequency sub-band and the second frequency sub-band; and code for causing the first wireless communications device to hop to the second frequency sub-band at the hopping boundary. 168. The non-transitory computer-readable medium of 167, wherein the hopping boundary comprises an end of a time slot, the program code further comprising: code for causing the first wireless communications device to perform the wait for the second set of symbols at the end of the first set of symbols before the hopping boundary. 169. The non-transitory computer-readable medium of 167, wherein the hopping boundary comprises a time location before a boundary of a time slot, the program code further comprising: code for causing the first wireless communications device to perform the wait for the second set of symbols at the end of the first set of symbols before the hopping boundary. 170. The non-transitory computer-readable medium of 167, wherein the hopping boundary comprises an end of a first time slot, the program code further comprising: code for causing the first wireless communications device to transmit a first portion of the second subset of data in the first time slot; code for causing the first wireless communications device to perform the wait for the second set of symbols at an end of the first time slot before the hopping boundary; and code for causing the first wireless communications device to transmit a second portion of the second subset of data in the second time slot.

171. The non-transitory computer-readable medium of 147, wherein the code for causing the first wireless communications device to transmit the second subset of data further comprises: code for causing the first wireless communications device to determine whether a length of the third set of symbols after the LBT gap before a slot boundary is greater than two symbols for a subcarrier spacing (SCS) of 15 kHz or 30 kHz, or greater than three symbols for an SCS of 60 kHz. 172. The non-transitory computer-readable medium of 171, wherein the code for causing the first wireless communications device to transmit the second subset of data further comprises: code for causing the first wireless communications device to substitute an error message as the second subset of data to indicate an error condition in response to the length of the third set of symbols being equal to or less than two symbols for the 15 kHz or 30 kHz SCSs, or three symbols for the 60 kHz SCS. 173. The non-transitory computer-readable medium of 171, the program code further comprising: code for causing the first wireless communications device to introduce a cyclic prefix (CP) extension before the hopping boundary in response to the length of the third set of symbols being equal to or less than two symbols for the 15 kHz or 30 kHz SCSs, or three symbols for the 60 kHz SCS. 174. The non-transitory computer-readable medium of 171, the program further comprising: code for causing the first wireless communications device to revert back to the frequency sub-band instead of the second frequency sub-band for transmitting the second subset of data in response to the length of the third set of symbols being equal to or less than two symbols for the 15 kHz or 30 kHz SCSs, or three symbols for the 60 kHz SCS; and code for causing the first wireless communications device to continue with the transmitting the second subset of data on the second frequency sub-band in response to the length of the third set of symbols being greater than two symbols for the 15 kHz or 30 kHz SCSs, or three symbols for the 60 kHz SCS.

175. The non-transitory computer-readable medium of 147, the program code further comprising: code for causing the first wireless communications device to receive, from the second wireless communications device, a dynamic grant of uplink (UL) resources for the transmitting the first and second subsets of data; code for causing the first wireless communications device to apply a first cyclic prefix (CP) extension before the transmitting the first subset of data based on the dynamic grant of UL resources; and code for causing the first wireless communications device to apply a second CP extension after the LBT gap and before the transmitting the second subset of data based on a default configuration. 176. The non-transitory computer-readable medium of 175, wherein the default configuration comprises a default value multiplied by a symbol length, less a time duration of the LBT gap. 177. The non-transitory computer-readable medium of 176, wherein the default value comprises a value of one for a subcarrier spacing (SCS) of 15 kHz or 30 kHz, or a value of two for an SCS of 60 kHz.

178. The non-transitory computer-readable medium of 147, the program code further comprising: code for causing the first wireless communications device to receive, from the second wireless communications device, a dynamic grant of uplink (UL) resources for the transmitting the first and second subsets of data; code for causing the first wireless communications device to apply a first cyclic prefix (CP) extension before the transmitting the first subset of data based on the dynamic grant of UL resources; and code for causing the first wireless communications device to apply a second CP extension after the LBT gap and before the transmitting the second subset of data based on a radio resource control (RRC) configuration.

179. The non-transitory computer-readable medium of 147, the program code further comprising: code for causing the first wireless communications device to randomly select a time offset for applying a first cyclic prefix (CP) extension in response to the transmitting the first subset of data being according to a configured grant communications scheme; code for causing the first wireless communications device to apply the first cyclic prefix (CP) extension with the randomly selected time offset before the transmitting the first subset of data; and code for causing the first wireless communications device to apply a second CP extension after the LBT gap and before the transmitting the second subset of data based on a default configuration. 180. The non-transitory computer-readable medium of 179, wherein the default configuration comprises a default value multiplied by a symbol length, less a time duration of the LBT gap. 181. The non-transitory computer-readable medium of 180, wherein the default value comprises a value of one for a subcarrier spacing (SCS) of 15 kHz or 30 kHz, or a value of two for an SCS of 60 kHz.

182. The non-transitory computer-readable medium of 147, the program code further comprising: code for causing the first wireless communications device to randomly select a time offset for applying a first cyclic prefix (CP) extension in response to the transmitting the first subset of data being according to a configured grant communications scheme; code for causing the first wireless communications device to apply the first cyclic prefix (CP) extension with the randomly selected time offset before the transmitting the first subset of data; and code for causing the first wireless communications device to apply a second CP extension after the LBT gap and before the transmitting the second subset of data based on a radio resource control (RRC) configuration.

183. A non-transitory computer-readable medium having program code recorded thereon, the program code comprising: code for causing a first wireless communications device to receive, from a second wireless communications device, a first subset of data on a first frequency sub-band over a first set of symbols in a time domain; code for causing the first wireless communications device to wait for a time duration corresponding to a length of a second set of symbols in the time domain as a listen-before-talk (LBT) gap on a second frequency sub-band; and code for causing the first wireless communications device to receive, from the second wireless communications device after the wait, a second subset of data on the second frequency sub-band over a third set of symbols in the time domain, the first frequency sub-band being different than the second frequency sub-band.

184. The non-transitory computer-readable medium of 183, wherein the second subset of data is a repetition of the first subset of data, the program code further comprising: code for causing the first wireless communications device to soft-combine the first subset of data and the second subset of data; and code for causing the first wireless communications device to decode the soft-combined data. 185. The non-transitory computer-readable medium of 183, wherein the first set of symbols is received in a first time slot, and the third set of symbols is received in a second time slot adjacent to the first time slot, the program code further comprising: code for causing the first wireless communications device to determine the LBT gap; and code for causing the first wireless communications device to transmit, to the second wireless communications device, identification of the determined LBT gap.

186. The non-transitory computer-readable medium of 183, wherein the second set of symbols comprises a beginning of the third set of symbols in the time domain. 187. The non-transitory computer-readable medium of 186, the program code further comprising: code for causing the first wireless communications device to transmit, to the second wireless communications device, a start and length indicator value (SLIV) including an allocation, wherein the second set of symbols is identified from the allocation. 188. The non-transitory computer-readable medium of 187, the program code further comprising: code for causing the first wireless communications device to transition to monitor the second frequency sub-band during a first time slot; code for causing the first wireless communications device to receive, after the LBT gap, a first portion of the second subset of data in the first time slot; and code for causing the first wireless communications device to receive a second portion of the second subset of data in a second time slot adjacent to the first time slot. 189. The non-transitory computer-readable medium of 187, the program code further comprising: code for causing the first wireless communications device to transition to monitor the second frequency sub-band at an end of transmitting the first subset of data in a first time slot; and code for causing the first wireless communications device to receive, after the LBT gap, the second subset of data in a second time slot adjacent to the first time slot. 190. The non-transitory computer-readable medium of 187, wherein the first set of symbols in the time domain are in a first time slot, and the SLIV comprises a starting symbol indication and a length indication, the program code further comprising: code for causing the first wireless communications device to perform the wait beginning at a first time domain location within the first time slot and ending at a second time location, wherein the first time domain location is based on the starting symbol identification plus the maximum integer that is no more than the length indication divided by two, and the second time domain location is based on the starting symbol identification plus the maximum integer that is no more than length indication divided by two, plus a size of the second set of symbols less one. 191. The non-transitory computer-readable medium of 187, wherein the first set of symbols and the third set of symbols in the time domain are in a first time slot, the program code further comprising: code for causing the first wireless communications device to determine a first number of symbols for the first set of symbols based on a maximum integer that is no more than a combined length of the first subset of data and the second subset of data together divided by two; code for causing the first wireless communications device to determine a second number of symbols for the third set of symbols based on the combined length subtracted by the maximum integer that is no more than the combined length divided by two; and code for causing the first wireless communications device to perform the waiting beginning at a time domain location at a start of the third set of symbols based on the first and second numbers of symbols. 192. The non-transitory computer-readable medium of 187, wherein the first set of symbols and the third set of symbols in the time domain are in a first time slot, the program code further comprising: code for causing the first wireless communications device to remove a length of the second set of symbols from a combined length of the first subset of data and the second subset of data to determine a modified length; code for causing the first wireless communications device to determine a first number of symbols for the first set of symbols based on the maximum integer that is no more than the modified length divided by two; code for causing the first wireless communications device to determine a second number of symbols for the third set of symbols based on the modified length subtracted by the length of the second set of symbols, further subtracted by the maximum integer that is no more than the modified length divided by two; and code for causing the first wireless communications device to perform the wait beginning at a time domain location between the first set of symbols and the third set of symbols based on the first and second numbers of symbols. 193. The non-transitory computer-readable medium of 186, the program code further comprising: code for causing the first wireless communications device to determine a hopping boundary between the first frequency sub-band and the second frequency sub-band; and code for causing the first wireless communications device to transition to monitor the second frequency sub-band. 194. The non-transitory computer-readable medium of 193, wherein the hopping boundary comprises an end of a time slot, the program code further comprising: code for causing the first wireless communications device to perform the wait for the second set of symbols at the beginning of the third set of symbols after the hopping boundary. 195. The non-transitory computer-readable medium of 193, wherein the hopping boundary comprises a time location before a boundary of a time slot, the program code further comprising: code for causing the first wireless communications device to perform the wait for the second set of symbols at the beginning of the third set of symbols after the hopping boundary. 196. The non-transitory computer-readable medium of 193, wherein the hopping boundary comprises an end of a first time slot, the program code further comprising: code for causing the first wireless communications device to receive a first portion of the second subset of data in the first time slot; code for causing the first wireless communications device to perform the wait for the second set of symbols at the beginning of the second time slot after the hopping boundary; and code for causing the first wireless communications device to receive a second portion of the second subset of data in the second time slot.

197. The non-transitory computer-readable medium of 183, wherein the second set of symbols comprises an end of the first set of symbols in the time domain. 198. The non-transitory computer-readable medium of 197, wherein the second set symbol is identified from an allocation from a start and length indicator value (SLIV) from the second wireless communications device. 199. The non-transitory computer-readable medium of 198, the program code further comprising: code for causing the first wireless communications device to transition to monitor the second frequency sub-band at an end of transmitting the first subset of data in a first time slot; code for causing the first wireless communications device to receive, after the LBT gap, a first portion of the second subset of data in the first time slot; and code for causing the first wireless communications device to receive a second portion of the second subset of data in a second time slot adjacent to the first time slot. 200. The non-transitory computer-readable medium of 198, the program code further comprising: code for causing the first wireless communications device to transition, after the LBT gap, to monitor the second frequency sub-band at an end of a first time slot; and code for causing the first wireless communications device to receive, after the LBT gap at a start of a second time slot adjacent to the first time slot, the second subset of data. 201. The non-transitory computer-readable medium of 198, wherein the first set of symbols in the time domain are in a first time slot, and the SLIV comprises a starting symbol indication and a length indication, the program code further comprising: code for causing the first wireless communications device to perform the wait beginning at a first time domain location within the first time slot and ending at a second time location, wherein the first time domain location is based on the starting symbol identification plus the maximum integer that is no more than the length indication divided by two, less a size of the second set of symbols, and the second time domain location is based on the starting symbol identification plus the maximum integer that is no more than the length indication divided by two, less one. 202. The non-transitory computer-readable medium of 198, wherein the first set of symbols and the third set of symbols in the time domain are in a first time slot, the program code further comprising: code for causing the first wireless communications device to determine a first number of symbols for the first set of symbols based on a maximum integer that is no more than a combined length of the first subset of data and the second subset of data together divided by two; code for causing the first wireless communications device to determine a second number of symbols for the third set of symbols based on the combined length subtracted by the maximum integer that is no more than the combined length divided by two; and code for causing the first wireless communications device to perform the wait beginning at a time domain location at the end of the first set of symbols based on the first and second numbers of symbols. 203. The non-transitory computer-readable medium of 197, the program code further comprising: code for causing the first wireless communications device to determine a hopping boundary between the first frequency sub-band and the second frequency sub-band; and code for causing the first wireless communications device to transition to monitor the second frequency sub-band at the hopping boundary. 204. The non-transitory computer-readable medium of 203, wherein the hopping boundary comprises an end of a time slot, the program code further comprising: code for causing the first wireless communications device to perform the wait for the second set of symbols at the end of the first set of symbols before the hopping boundary. 205. The non-transitory computer-readable medium of 203, wherein the hopping boundary comprises a time location before a boundary of a time slot, the program code further comprising: code for causing the first wireless communications device to perform the wait for the second set of symbols at the end of the first set of symbols before the hopping boundary. 206. The non-transitory computer-readable medium of 203, wherein the hopping boundary comprises an end of a first time slot, the program code further comprising: code for causing the first wireless communications device to receive a first portion of the second subset of data in the first time slot; code for causing the first wireless communications device to perform the wait for the second set of symbols at an end of the first time slot before the hopping boundary; and code for causing the first wireless communications device to receive a second portion of the second subset of data in the second time slot.

207. The non-transitory computer-readable medium of 183, wherein the code for causing the first wireless communications device to receive the second subset of data further comprises: code for causing the first wireless communications device to determine whether a length of the third set of symbols after the LBT gap before a slot boundary is greater than two symbols for a subcarrier spacing (SCS) of 15 kHz or 30 kHz, or greater than three symbols for an SCS of 60 kHz. 208. The non-transitory computer-readable medium of 207, wherein the code for causing the first wireless communications device to receive the second subset of data further comprises: code for causing the first wireless communications device to receive an error message as the second subset of data to indicate an error condition in response to the length of the third set of symbols being equal to or less than two symbols for the 15 kHz or 30 kHz SCSs, or three symbols for the 60 kHz SCS. 209. The non-transitory computer-readable medium of 207, the program code further comprising: code for causing the first wireless communications device to locate a cyclic prefix (CP) extension before the hopping boundary in response to the length of the third set of symbols being equal to or less than two symbols for the 15 kHz or 30 kHz SCSs, or three symbols for the 60 kHz SCS. 210. The non-transitory computer-readable medium of 207, the program code further comprising: code for causing the first wireless communications device to maintain to monitor of the frequency sub-band instead of the second frequency sub-band for receipt of the second subset of data in response to the length of the third set of symbols being equal to or less than two symbols for the 15 kHz or 30 kHz SCSs, or three symbols for the 60 kHz SCS; and code for causing the first wireless communications device to transition to monitor for the second subset of data on the second frequency sub-band in response to the length of the third set of symbols being greater than two symbols for the 15 kHz or 30 kHz SCSs, or three symbols for the 60 kHz SCS.

211. The non-transitory computer-readable medium of 183, the program code further comprising: code for causing the first wireless communications device to transmit, to the second wireless communications device, a dynamic grant of uplink (UL) resources for the transmission of the first and second subsets of data; code for causing the first wireless communications device to locate a first cyclic prefix (CP) extension before the receiving the first subset of data based on the dynamic grant of UL resources; and code for causing the first wireless communications device to locate a second CP extension after the LBT gap and before the receiving the second subset of data based on a default configuration. 212. The non-transitory computer-readable medium of 211, wherein the default configuration comprises a default value multiplied by a symbol length, less a time duration of the LBT gap. 213. The non-transitory computer-readable medium of 212, wherein the default value comprises a value of one for a subcarrier spacing (SCS) of 15 kHz or 30 kHz, or a value of two for an SCS of 60 kHz.

214. The non-transitory computer-readable medium of 183, the program code further comprising: code for causing the first wireless communications device to transmit, to the second wireless communications device, a dynamic grant of uplink (UL) resources for the transmission of the first and second subsets of data; code for causing the first wireless communications device to locate a first cyclic prefix (CP) extension before the receiving the first subset of data based on the dynamic grant of UL resources; and code for causing the first wireless communications device to locate a second CP extension after the LBT gap and before the receiving the second subset of data based on a radio resource control (RRC) configuration.

215. The non-transitory computer-readable medium of 183, the program code further comprising: code for causing the first wireless communications device to monitor for the first subset of data according to a randomly selected time offset for applying a first cyclic prefix (CP) extension in response to the transmission of the first subset of data being according to a configured grant communications scheme; code for causing the first wireless communications device to locate the first cyclic prefix (CP) extension with the randomly selected time offset before the receiving the first subset of data; and code for causing the first wireless communications device to locate a second CP extension after the LBT gap and before the receiving the second subset of data based on a default configuration. 216. The non-transitory computer-readable medium of 215, wherein the default configuration comprises a default value multiplied by a symbol length, less a time duration of the LBT gap. 217. The non-transitory computer-readable medium of 216, wherein the default value comprises a value of one for a subcarrier spacing (SCS) of 15 kHz or 30 kHz, or a value of two for an SCS of 60 kHz.

218. The non-transitory computer-readable medium of 183, the program code further comprising: code for causing the first wireless communications device to monitor for the first subset of data according to a randomly selected time offset for applying a first cyclic prefix (CP) extension in response to the receiving the first subset of data being according to a configured grant communications scheme; code for causing the first wireless communications device to locate the first cyclic prefix (CP) extension with the randomly selected time offset before the receiving the first subset of data; and code for causing the first wireless communications device to locate a second CP extension after the LBT gap and before the receiving the second subset of data based on a radio resource control (RRC) configuration.

219. A first wireless communications device, comprising: means for transmitting, to a second wireless communications device, a first subset of data on a first frequency sub-band over a first set of symbols in a time domain; means for waiting for a time duration corresponding to a length of a second set of symbols in the time domain as a listen-before-talk (LBT) gap on the second frequency sub-band before transmitting a second subset of data; and means for transmitting, to the second wireless communications device after the waiting, the second subset of data on a second frequency sub-band over a third set of symbols in the time domain, the first frequency sub-band being different than the second frequency sub-band.

220. The first wireless communications device of 219, wherein the second subset of data is a repetition of the first subset of data. 221. The first wireless communications device of 219, wherein the first set of symbols is transmitted in a first time slot, and the third set of symbols is transmitted in a second time slot adjacent to the first time slot, further comprising: means for receiving, from the second wireless communications device, identification of the LBT gap.

222. The first wireless communications device of 219, wherein the second set of symbols comprises a beginning of the third set of symbols in the time domain. 223. The first wireless communications device of 222, wherein the second set of symbols is identified from an allocation from a start and length indicator value (SLIV) from the second wireless communications device. 224. The first wireless communications device of 223, further comprising: means for hopping to the second frequency sub-band during a first time slot; means for transmitting, after the LBT gap, a first portion of the second subset of data in the first time slot; and means for transmitting a second portion of the second subset of data in a second time slot adjacent to the first time slot. 225. The first wireless communications device of 223, further comprising: means for hopping to the second frequency sub-band at an end of transmitting the first subset of data in a first time slot; and means for transmitting, after the LBT gap, the second subset of data in a second time slot adjacent to the first time slot. 226. The first wireless communications device of 223, wherein the first set of symbols in the time domain are in a first time slot, and the SLIV comprises a starting symbol indication and a length indication, further comprising: means for performing the wait beginning at a first time domain location within the first time slot and ending at a second time location, wherein the first time domain location is based on the starting symbol identification plus the maximum integer that is no more than the length indication divided by two, and the second time domain location is based on the starting symbol identification plus the maximum integer that is no more than length indication divided by two, plus a size of the second set of symbols less one. 227. The first wireless communications device of 223, wherein the first set of symbols and the third set of symbols in the time domain are in a first time slot, further comprising: means for determining a first number of symbols for the first set of symbols based on a maximum integer that is no more than a combined length of the first subset of data and the second subset of data together divided by two; means for determining a second number of symbols for the third set of symbols based on the combined length subtracted by the maximum integer that is no more than the combined length divided by two; and means for performing the wait beginning at a time domain location at a start of the third set of symbols based on the first and second numbers of symbols. 228. The first wireless communications device of 223, wherein the first set of symbols and the third set of symbols in the time domain are in a first time slot, further comprising: means for removing a length of the second set of symbols from a combined length of the first subset of data and the second subset of data to determine a modified length; means for determining a first number of symbols for the first set of symbols based on the maximum integer that is no more than the modified length divided by two; means for determining a second number of symbols for the third set of symbols based on the modified length subtracted by the length of the second set of symbols, further subtracted by the maximum integer that is no more than the modified length divided by two; and means for performing the wait beginning at a time domain location between the first set of symbols and the third set of symbols based on the first and second numbers of symbols. 229. The first wireless communications device of 222, further comprising: means for determining a hopping boundary between the first frequency sub-band and the second frequency sub-band; and means for hopping to the second frequency sub-band. 230. The first wireless communications device of 229, wherein the hopping boundary comprises an end of a time slot, further comprising: means for performing the wait for the second set of symbols at a beginning of the third set of symbols after the hopping boundary. 231. The first wireless communications device of 229, wherein the hopping boundary comprises a time location before a boundary of a time slot, further comprising: means for performing the wait for the second set of symbols at a beginning of the third set of symbols after the hopping boundary. 232. The first wireless communications device of 229, wherein the hopping boundary comprises an end of a first time slot, further comprising: means for transmitting a first portion of the second subset of data in the first time slot; means for performing the wait for the second set of symbols at a beginning of the second time slot after the hopping boundary; and means for transmitting a second portion of the second subset of data in the second time slot.

233. The first wireless communications device of 219, wherein the second set of symbols comprises an end of the first set of symbols in the time domain. 234. The first wireless communications device of 233, wherein the second set symbol is identified from an allocation from a start and length indicator value (SLIV) from the second wireless communications device. 235. The first wireless communications device of 234, further comprising: means for hopping to the second frequency sub-band at an end of transmitting the first subset of data in a first time slot; means for transmitting, after the LBT gap, a first portion of the second subset of data in the first time slot; and means for transmitting a second portion of the second subset of data in a second time slot adjacent to the first time slot. 236. The first wireless communications device of 234, further comprising: means for hopping, after the LBT gap, to the second frequency sub-band at an end of a first time slot; and means for transmitting, after the LBT gap at a start of a second time slot adjacent to the first time slot, the second subset of data. 237. The first wireless communications device of 234, wherein the first set of symbols in the time domain are in a first time slot, and the SLIV comprises a starting symbol indication and a length indication, further comprising: means for performing the wait beginning at a first time domain location within the first time slot and ending at a second time location, wherein the first time domain location is based on the starting symbol identification plus the maximum integer that is no more than the length indication divided by two, less a size of the second set of symbols, and the second time domain location is based on the starting symbol identification plus the maximum integer that is no more than the length indication divided by two, less one. 238. The first wireless communications device of 234, wherein the first set of symbols and the third set of symbols in the time domain are in a first time slot, further comprising: means for determining a first number of symbols for the first set of symbols based on a maximum integer that is no more than a combined length of the first subset of data and the second subset of data together divided by two; means for determining a second number of symbols for the third set of symbols based on the combined length subtracted by the maximum integer that is no more than the combined length divided by two; and means for performing the wait beginning at a time domain location at the end of the first set of symbols based on the first and second numbers of symbols. 239. The first wireless communications device of 233, further comprising: means for determining a hopping boundary between the first frequency sub-band and the second frequency sub-band; and means for hopping to the second frequency sub-band at the hopping boundary. 240. The first wireless communications device of 239, wherein the hopping boundary comprises an end of a time slot, further comprising: means for performing the wait for the second set of symbols at the end of the first set of symbols before the hopping boundary. 241. The first wireless communications device of 239, wherein the hopping boundary comprises a time location before a boundary of a time slot, further comprising: means for performing the wait for the second set of symbols at the end of the first set of symbols before the hopping boundary. 242. The first wireless communications device of 239, wherein the hopping boundary comprises an end of a first time slot, further comprising: means for transmitting a first portion of the second subset of data in the first time slot; means for performing the wait for the second set of symbols at an end of the first time slot before the hopping boundary; and means for transmitting a second portion of the second subset of data in the second time slot.

243. The first wireless communications device of 219, wherein the means for transmitting the second subset of data further comprises: means for determining whether a length of the third set of symbols after the LBT gap before a slot boundary is greater than two symbols for a subcarrier spacing (SCS) of 15 kHz or 30 kHz, or greater than three symbols for an SCS of 60 kHz. 244. The first wireless communications device of 243, wherein the means for transmitting further comprises: means for substituting an error message as the second subset of data to indicate an error condition in response to the length of the third set of symbols being equal to or less than two symbols for the 15 kHz or 30 kHz SCSs, or three symbols for the 60 kHz SCS. 245. The first wireless communications device of 243, further comprising: means for introducing a cyclic prefix (CP) extension before the hopping boundary in response to the length of the third set of symbols being equal to or less than two symbols for the 15 kHz or 30 kHz SCSs, or three symbols for the 60 kHz SCS. 246. The first wireless communications device of 243, further comprising: means for reverting back to the frequency sub-band instead of the second frequency sub-band for transmitting the second subset of data in response to the length of the third set of symbols being equal to or less than two symbols for the 15 kHz or 30 kHz SCSs, or three symbols for the 60 kHz SCS; and means for continuing with the transmitting the second subset of data on the second frequency sub-band in response to the length of the third set of symbols being greater than two symbols for the 15 kHz or 30 kHz SCSs, or three symbols for the 60 kHz SCS.

247. The first wireless communications device of 219, further comprising: means for receiving, from the second wireless communications device, a dynamic grant of uplink (UL) resources for the transmitting the first and second subsets of data; means for applying a first cyclic prefix (CP) extension before the transmitting the first subset of data based on the dynamic grant of UL resources; and means for applying a second CP extension after the LBT gap and before the transmitting the second subset of data based on a default configuration. 248. The first wireless communications device of 247, wherein the default configuration comprises a default value multiplied by a symbol length, less a time duration of the LBT gap. 249. The first wireless communications device of 248, wherein the default value comprises a value of one for a subcarrier spacing (SCS) of 15 kHz or 30 kHz, or a value of two for an SCS of 60 kHz.

250. The first wireless communications device of 219, further comprising: means for receiving, from the second wireless communications device, a dynamic grant of uplink (UL) resources for the transmitting the first and second subsets of data; means for applying a first cyclic prefix (CP) extension before the transmitting the first subset of data based on the dynamic grant of UL resources; and means for applying a second CP extension after the LBT gap and before the transmitting the second subset of data based on a radio resource control (RRC) configuration.

251. The first wireless communications device of 219, further comprising: means for randomly selecting a time offset for applying a first cyclic prefix (CP) extension in response to the transmitting the first subset of data being according to a configured grant communications scheme; means for applying the first cyclic prefix (CP) extension with the randomly selected time offset before the transmitting the first subset of data; and means for applying a second CP extension after the LBT gap and before the transmitting the second subset of data based on a default configuration. 252. The first wireless communications device of 251, wherein the default configuration comprises a default value multiplied by a symbol length, less a time duration of the LBT gap. 253. The first wireless communications device of 252, wherein the default value comprises a value of one for a subcarrier spacing (SCS) of 15 kHz or 30 kHz, or a value of two for an SCS of 60 kHz.

254. The first wireless communications device of 219, further comprising: means for randomly selecting a time offset for applying a first cyclic prefix (CP) extension in response to the transmitting the first subset of data being according to a configured grant communications scheme; means for applying the first cyclic prefix (CP) extension with the randomly selected time offset before the transmitting the first subset of data; and applying, by the first wireless communications device, a second CP extension after the LBT gap and before the transmitting the second subset of data based on a radio resource control (RRC) configuration.

255. A first wireless communications device, comprising: means for receiving, from a second wireless communications device, a first subset of data on a first frequency sub-band over a first set of symbols in a time domain; means for waiting for a time duration corresponding to a length of a second set of symbols in the time domain as a listen-before-talk (LBT) gap on a second frequency sub-band; and means for receiving, from the second wireless communications device after the waiting, a second subset of data on the second frequency sub-band over a third set of symbols in the time domain, the first frequency sub-band being different than the second frequency sub-band. 256. The first wireless communications device of 255, wherein the second subset of data is a repetition of the first subset of data, further comprising: means for soft-combining the first subset of data and the second subset of data; and means for decoding the soft-combined data. 257. The first wireless communications device of 255, wherein the first set of symbols is received in a first time slot, and the third set of symbols is received in a second time slot adjacent to the first time slot, further comprising: means for determining the LBT gap; and means for transmitting, to the second wireless communications device, identification of the determined LBT gap. 258. The first wireless communications device of 255, wherein the second set of symbols comprises a beginning of the third set of symbols in the time domain. 259. The first wireless communications device of 258, further comprising: means for transmitting, to the second wireless communications device, a start and length indicator value (SLIV) including an allocation, wherein the second set of symbols is identified from the allocation. 260. The first wireless communications device of 259, further comprising: means for transitioning to monitoring the second frequency sub-band during a first time slot; means for receiving, after the LBT gap, a first portion of the second subset of data in the first time slot; and means for receiving a second portion of the second subset of data in a second time slot adjacent to the first time slot. 261. The first wireless communications device of 259, further comprising: means for transitioning to monitoring the second frequency sub-band at an end of transmitting the first subset of data in a first time slot; and means for receiving, after the LBT gap, the second subset of data in a second time slot adjacent to the first time slot. 262. The first wireless communications device of 259, wherein the first set of symbols in the time domain are in a first time slot, and the SLIV comprises a starting symbol indication and a length indication, further comprising: means for performing the wait beginning at a first time domain location within the first time slot and ending at a second time location, wherein the first time domain location is based on the starting symbol identification plus the maximum integer that is no more than the length indication divided by two, and the second time domain location is based on the starting symbol identification plus the maximum integer that is no more than length indication divided by two, plus a size of the second set of symbols less one. 263. The first wireless communications device of 259, wherein the first set of symbols and the third set of symbols in the time domain are in a first time slot, further comprising: means for determining a first number of symbols for the first set of symbols based on a maximum integer that is no more than a combined length of the first subset of data and the second subset of data together divided by two; means for determining a second number of symbols for the third set of symbols based on the combined length subtracted by the maximum integer that is no more than the combined length divided by two; and means for performing the wait beginning at a time domain location at a start of the third set of symbols based on the first and second numbers of symbols. 264. The first wireless communications device of 259, wherein the first set of symbols and the third set of symbols in the time domain are in a first time slot, further comprising: means for removing a length of the second set of symbols from a combined length of the first subset of data and the second subset of data to determine a modified length; means for determining a first number of symbols for the first set of symbols based on the maximum integer that is no more than the modified length divided by two; means for determining a second number of symbols for the third set of symbols based on the modified length subtracted by the length of the second set of symbols, further subtracted by the maximum integer that is no more than the modified length divided by two; and means for performing the wait beginning at a time domain location between the first set of symbols and the third set of symbols based on the first and second numbers of symbols. 265. The first wireless communications device of 258, further comprising: means for determining a hopping boundary between the first frequency sub-band and the second frequency sub-band; and means for transitioning to monitor the second frequency sub-band. 266. The first wireless communications device of 265, wherein the hopping boundary comprises an end of a time slot, further comprising: means for performing the wait for the second set of symbols at the beginning of the third set of symbols after the hopping boundary. 267. The first wireless communications device of 265, wherein the hopping boundary comprises a time location before a boundary of a time slot, further comprising: means for performing the wait for the second set of symbols at the beginning of the third set of symbols after the hopping boundary. 268. The first wireless communications device of 265, wherein the hopping boundary comprises an end of a first time slot, further comprising: means for receiving a first portion of the second subset of data in the first time slot; means for performing the wait for the second set of symbols at the beginning of the second time slot after the hopping boundary; and means for receiving a second portion of the second subset of data in the second time slot.

269. The first wireless communications device of 255, wherein the second set of symbols comprises an end of the first set of symbols in the time domain. 270. The first wireless communications device of 269, wherein the second set symbol is identified from an allocation from a start and length indicator value (SLIV) from the second wireless communications device. 271. The first wireless communications device of 270, further comprising: means for transitioning to monitor the second frequency sub-band at an end of transmitting the first subset of data in a first time slot; means for receiving, after the LBT gap, a first portion of the second subset of data in the first time slot; and means for receiving a second portion of the second subset of data in a second time slot adjacent to the first time slot. 272. The first wireless communications device of 270, further comprising: means for transitioning, after the LBT gap, to monitor the second frequency sub-band at an end of a first time slot; and means for receiving, after the LBT gap at a start of a second time slot adjacent to the first time slot, the second subset of data. 273. The first wireless communications device of 270, wherein the first set of symbols in the time domain are in a first time slot, and the SLIV comprises a starting symbol indication and a length indication, further comprising: means for performing the wait beginning at a first time domain location within the first time slot and ending at a second time location, wherein the first time domain location is based on the starting symbol identification plus the maximum integer that is no more than the length indication divided by two, less a size of the second set of symbols, and the second time domain location is based on the starting symbol identification plus the maximum integer that is no more than the length indication divided by two, less one. 274. The first wireless communications device of 270, wherein the first set of symbols and the third set of symbols in the time domain are in a first time slot, further comprising: means for determining a first number of symbols for the first set of symbols based on a maximum integer that is no more than a combined length of the first subset of data and the second subset of data together divided by two; means for determining a second number of symbols for the third set of symbols based on the combined length subtracted by the maximum integer that is no more than the combined length divided by two; and means for performing the wait beginning at a time domain location at the end of the first set of symbols based on the first and second numbers of symbols. 275. The first wireless communications device of 269, further comprising: means for determining a hopping boundary between the first frequency sub-band and the second frequency sub-band; and means for transitioning to monitor the second frequency sub-band at the hopping boundary. 276. The first wireless communications device of 275, wherein the hopping boundary comprises an end of a time slot, further comprising: means for performing the wait for the second set of symbols at the end of the first set of symbols before the hopping boundary. 277. The first wireless communications device of 275, wherein the hopping boundary comprises a time location before a boundary of a time slot, further comprising: means for performing the wait for the second set of symbols at the end of the first set of symbols before the hopping boundary. 278. The first wireless communications device of 275, wherein the hopping boundary comprises an end of a first time slot, further comprising: means for receiving a first portion of the second subset of data in the first time slot; means for performing the wait for the second set of symbols at an end of the first time slot before the hopping boundary; and means for receiving a second portion of the second subset of data in the second time slot.

279. The first wireless communications device of 255, wherein the means for receiving the second subset of data further comprises: means for determining whether a length of the third set of symbols after the LBT gap before a slot boundary is greater than two symbols for a subcarrier spacing (SCS) of 15 kHz or 30 kHz, or greater than three symbols for an SCS of 60 kHz. 280. The first wireless communications device of 279, wherein the means for receiving further comprises: means for receiving an error message as the second subset of data to indicate an error condition in response to the length of the third set of symbols being equal to or less than two symbols for the 15 kHz or 30 kHz SCSs, or three symbols for the 60 kHz SCS. 281. The first wireless communications device of 279, further comprising: means for locating a cyclic prefix (CP) extension before the hopping boundary in response to the length of the third set of symbols being equal to or less than two symbols for the 15 kHz or 30 kHz SCSs, or three symbols for the 60 kHz SCS. 282. The first wireless communications device of 279, further comprising: means for maintaining to monitor of the frequency sub-band instead of the second frequency sub-band for receipt of the second subset of data in response to the length of the third set of symbols being equal to or less than two symbols for the 15 kHz or 30 kHz SCSs, or three symbols for the 60 kHz SCS; and means for transitioning to monitor for the second subset of data on the second frequency sub-band in response to the length of the third set of symbols being greater than two symbols for the 15 kHz or 30 kHz SCSs, or three symbols for the 60 kHz SCS. 283. The first wireless communications device of 255, further comprising: means for transmitting, to the second wireless communications device, a dynamic grant of uplink (UL) resources for the transmission of the first and second subsets of data; means for locating a first cyclic prefix (CP) extension before the receiving the first subset of data based on the dynamic grant of UL resources; and means for locating a second CP extension after the LBT gap and before the receiving the second subset of data based on a default configuration. 284. The first wireless communications device of 283, wherein the default configuration comprises a default value multiplied by a symbol length, less a time duration of the LBT gap. 285. The first wireless communications device of 284, wherein the default value comprises a value of one for a subcarrier spacing (SCS) of 15 kHz or 30 kHz, or a value of two for an SCS of 60 kHz.

286. The first wireless communications device of 255, further comprising: means for transmitting, to the second wireless communications device, a dynamic grant of uplink (UL) resources for the transmission of the first and second subsets of data; means for locating a first cyclic prefix (CP) extension before the receiving the first subset of data based on the dynamic grant of UL resources; and means for locating a second CP extension after the LBT gap and before the receiving the second subset of data based on a radio resource control (RRC) configuration.

287. The first wireless communications device of 255, further comprising: means for monitoring for the first subset of data according to a randomly selected time offset for applying a first cyclic prefix (CP) extension in response to the transmission of the first subset of data being according to a configured grant communications scheme; means for locating the first cyclic prefix (CP) extension with the randomly selected time offset before the receiving the first subset of data; and means for locating a second CP extension after the LBT gap and before the receiving the second subset of data based on a default configuration. 288. The first wireless communications device of 287, wherein the default configuration comprises a default value multiplied by a symbol length, less a time duration of the LBT gap. 289. The first wireless communications device of 288, wherein the default value comprises a value of one for a subcarrier spacing (SCS) of 15 kHz or 30 kHz, or a value of two for an SCS of 60 kHz.

290. The first wireless communications device of 255, further comprising: means for monitoring for the first subset of data according to a randomly selected time offset for applying a first cyclic prefix (CP) extension in response to the receiving the first subset of data being according to a configured grant communications scheme; means for locating the first cyclic prefix (CP) extension with the randomly selected time offset before the receiving the first subset of data; and means for locating a second CP extension after the LBT gap and before the receiving the second subset of data based on a radio resource control (RRC) configuration.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A first wireless communications device, comprising:
a transceiver;
one or more memories; and
one or more processors coupled to the transceiver and the one or more memories, the one or more memories storing instructions that are executable by the one or more processors, configured individually or in any combination, to cause the first wireless communication device to:
    receive, from a second wireless communication device, a configuration indicating a first set of symbols in a first slot for a first physical uplink shared channel (PUSCH) repetition, and a second set of symbols at least partially in a second slot adjacent to the first slot for a second PUSCH repetition;
    transmit, to the second wireless communications device, a first subset of data on a first frequency sub-band over the first set of symbols;
    wait for a time duration corresponding to a length of a third set of symbols as a listen-before-talk (LBT) gap on a second frequency sub-band before transmitting a second subset of data,
        wherein the LBT gap coincides with one or more last symbols of the first set of symbols; and
    transmit, to the second wireless communications device after the time duration, the second subset of data on the second frequency sub-band over the second set of symbols, the first frequency sub-band being different than the second frequency sub-band.

2. The first wireless communications device of claim 1, wherein the second subset of data is a repetition of the first subset of data.

3. The first wireless communications device of claim 1, wherein the one or more processors, to transmit the first set of symbols, are configured individually or in any combination to cause the first wireless communication device to transmit the first set of symbols in a first time slot;
    wherein the one or more processors, to transmit the second set of symbols, are configured individually or in any combination to cause the first wireless communication device to transmit the second set of symbols, in a second time slot adjacent to the first time slot; and
    wherein the one or more processors are further configured individually or in any combination to cause the first wireless communication device to:
        receive, from the second wireless communications device, identification of the LBT gap.

4. The first wireless communications device of claim 1, wherein the third set of symbols comprises a beginning of the second set of symbols.

5. The first wireless communications device of claim 4, wherein the third set of symbols is identified from an allocation from a start and length indicator value (SLIV) from the second wireless communications device.

6. The first wireless communications device of claim 4, wherein the one or more processors are further configured individually or in any combination to cause the first wireless communication device to:
    determine a hopping boundary between the first frequency sub-band and the second frequency sub-band,
        wherein the transceiver is further configured to hop to the second frequency sub-band.

7. The first wireless communications device of claim 1, wherein the third set of symbols comprises an end of the first set of symbols.

8. The first wireless communications device of claim 1, wherein the one or more processors are further configured individually or in any combination to cause the first wireless communication device to:
    determine, for the transmission of the second subset of data, whether a length of the second set of symbols after the LBT gap before a slot boundary is greater than two symbols for a subcarrier spacing (SCS) of 15 kHz or 30 kHz, or greater than three symbols for an SCS of 60 kHz.

9. The first wireless communications device of claim 1, wherein the one or more processors are further configured individually or in any combination to cause the first wireless communication device to:
    receive, from the second wireless communications device, a dynamic grant of uplink (UL) resources for the transmitting the first subset of data and the second subset of data;
    apply a first cyclic prefix (CP) extension before the transmission of the first subset of data based on the dynamic grant of UL resources, and
    apply a second CP extension after the LBT gap and before the transmission of the second subset of data based on a default configuration.

10. The first wireless communications device of claim 1, wherein the one or more processors are further configured individually or in any combination to cause the first wireless communication device to:
    randomly select a time offset for applying a first cyclic prefix (CP) extension in response to the transmission of the first subset of data being according to a configured grant communications scheme;
    apply the first cyclic prefix (CP) extension with the randomly selected time offset before the transmission of the first subset of data; and apply a second CP extension after the LBT gap and before the transmission of the second subset of data based on a default configuration.

11. A first wireless communications device, comprising:

a transceiver;

one or more memories; and one or more processors coupled to the transceiver and the one or more memories, the one or more memories storing instructions that are executable by the one or more processors, configured individually or in any combination, to cause the first wireless communication device to:

transmit, to a second wireless communication device, a configuration indicating a first set of symbols in a first slot for a first physical uplink shared channel (PUSCH) repetition, and a second set of symbols at least partially in a second slot adjacent to the first slot for a second PUSCH repetition;

receive, from the second wireless communications device, a first subset of data on a first frequency sub-band over the first set of symbols;

wait for a time duration corresponding to a length of a third set of symbols as a listen-before-talk (LBT) gap on a second frequency sub-band, wherein the LBT gap coincides with one or more last symbols of the first set of symbols; and receive, from the second wireless communications device after the time duration, a second subset of data on the second frequency sub-band over the second set of symbols, the first frequency sub-band being different than the second frequency sub-band.

12. The first wireless communications device of claim 11, wherein the second subset of data is a repetition of the first subset of data, and wherein the one or more processors are further configured individually or in any combination to cause the first wireless communication device to:

soft-combine the first subset of data and the second subset of data to generate soft-combined data; and decode the soft-combined data.

13. The first wireless communications device of claim 11, wherein the first set of symbols is received in a first time slot, wherein the second set of symbols is received in a second time slot adjacent to the first time slot, and wherein the one or more processors are further configured individually or in any combination to cause the first wireless communication device to:

determine the LBT gap; and transmit, to the second wireless communications device, identification of the determined LBT gap.

14. The first wireless communications device of claim 11, wherein the third set of symbols comprises a beginning of the second set of symbols.

15. The first wireless communications device of claim 14, wherein the one or more processors are further configured individually or in any combination to cause the first wireless communication device to:

transmit, to the second wireless communications device, a start and length indicator value (SLIV) including an allocation, wherein the third set of symbols is identified from the allocation.

16. The first wireless communications device of claim 14, wherein the one or more processors are further configured individually or in any combination to cause the first wireless communication device to:

determine a hopping boundary between the first frequency sub-band and the second frequency sub-band; and transition to monitor the second frequency sub-band.

17. The first wireless communications device of claim 11, wherein the third set of symbols comprises an end of the first set of symbols.

18. The first wireless communications device of claim 11, wherein the one or more processors are further configured individually or in any combination to cause the first wireless communication device to:

determine, as part of the receipt of the second subset of data, whether a length of the second set of symbols after the LBT gap before a slot boundary is greater than two symbols for a subcarrier spacing (SCS) of 15 kHz or 30 kHz, or greater than three symbols for an SCS of 60 kHz.

19. The first wireless communications device of claim 11, wherein the one or more processors are further configured individually or in any combination to cause the first wireless communication device to:

transmit, to the second wireless communications device, a dynamic grant of uplink (UL) resources for the transmission of the first subset of data and the second subset of data;

locate a first cyclic prefix (CP) extension before receipt of the first subset of data based on the dynamic grant of UL resources; and locate a second CP extension after the LBT gap and before receipt of the second subset of data based on a default configuration.

20. The first wireless communications device of claim 11, wherein the one or more processors are further configured individually or in any combination to cause the first wireless communication device to:

monitor for the first subset of data according to a randomly selected time offset for applying a first cyclic prefix (CP) extension in response to the transmission of the first subset of data being according to a configured grant communications scheme;

locate the first cyclic prefix (CP) extension with the randomly selected time offset before receipt of the first subset of data; and locate a second CP extension after the LBT gap and before receipt of the second subset of data based on a default configuration.

* * * * *